United States Patent
Ayres et al.

(10) Patent No.: US 9,891,363 B2
(45) Date of Patent: Feb. 13, 2018

(54) SKEW MIRRORS, METHODS OF USE, AND METHODS OF MANUFACTURE

(71) Applicant: AKONIA HOLOGRAPHICS LLC, Longmont, CO (US)

(72) Inventors: Mark R. Ayres, Boulder, CO (US); Kenneth Anderson, Longmont, CO (US); Adam Urness, Louisville, CO (US); Friso Schlottau, Lyons, CO (US)

(73) Assignee: AKONIA HOLOGRAPHICS LLC, Longmont, CO (US)

( * ) Notice: Subject to any disclaimer, the term of this patent is extended or adjusted under 35 U.S.C. 154(b) by 0 days.

(21) Appl. No.: 15/517,159

(22) PCT Filed: Aug. 24, 2016

(86) PCT No.: PCT/US2016/048499
§ 371 (c)(1),
(2) Date: Apr. 5, 2017

(87) PCT Pub. No.: WO2017/035283
PCT Pub. Date: Mar. 2, 2017

(65) Prior Publication Data
US 2017/0242176 A1  Aug. 24, 2017

Related U.S. Application Data

(63) Continuation-in-part of application No. 15/174,938, filed on Jun. 6, 2016.
(Continued)

(51) Int. Cl.
*G02B 5/32* (2006.01)
*G02B 5/18* (2006.01)
(Continued)

(52) U.S. Cl.
CPC ............. *G02B 5/32* (2013.01); *G02B 5/1861* (2013.01); *G02B 27/0172* (2013.01);
(Continued)

(58) Field of Classification Search
CPC .................. G02B 5/32; G02B 27/0172; G02B 2027/0174; G02B 5/1861;
(Continued)

(56) References Cited

U.S. PATENT DOCUMENTS 4,017,158 A   4/1977 Booth
6,882,452 B2  4/2005 Decker et al.
(Continued)

FOREIGN PATENT DOCUMENTS

EP        0157895 A2   10/1985
JP        02-238427 A   9/1990
JP        2000-089029 A  3/2000

OTHER PUBLICATIONS

Written Opinion of the ISA (USPTO) for international application No. PCT/US2017/020298.
(Continued)

*Primary Examiner* — Bumsuk Won
*Assistant Examiner* — Balram Parbadia

(57) ABSTRACT

An optical reflective device referred to as a skew mirror, having a reflective axis that need not be constrained to surface normal, is described. Examples of skew mirrors are configured to reflect light about substantially constant reflective axes across a relatively wide range of wavelengths. In some examples, a skew mirror has substantially constant reflective axes across a relatively wide range of angles of incidence. Exemplary methods for making and using skew mirrors are also disclosed. Skew mirrors include a grating structure, which in some examples comprises a hologram.

39 Claims, 17 Drawing Sheets

Related U.S. Application Data

(60) Provisional application No. 62/209,290, filed on Aug. 24, 2015, provisional application No. 62/318,917, filed on Apr. 6, 2016.

(51) Int. Cl.
*G03H 1/02* (2006.01)
*G03H 1/26* (2006.01)
*G02B 27/01* (2006.01)

(52) U.S. Cl.
CPC .......... *G03H 1/0248* (2013.01); *G03H 1/265* (2013.01); *G02B 2027/0174* (2013.01); *G03H 2001/2615* (2013.01)

(58) Field of Classification Search
CPC .... G02B 2027/0118; G02B 2027/0123; G02B 27/0081; G02B 27/0103; G02B 27/1086; G02B 5/203; G03H 1/0248; G03H 1/265; G03H 2001/0439; G03H 1/0236; G03H 1/04; G03H 1/0408
See application file for complete search history.

(56) References Cited

U.S. PATENT DOCUMENTS

| | | | | |
|---|---|---|---|---|
| 2002/0093701 A1* | 7/2002 | Zhang | ............... | G02B 5/32 359/15 |
| 2002/0191394 A1 | 12/2002 | Coleman et al. | | |
| 2003/0090753 A1* | 5/2003 | Takeyama | ............... | G02B 5/04 359/15 |
| 2003/0179364 A1* | 9/2003 | Steenblik | ............... | B82Y 20/00 356/71 |
| 2008/0309998 A1 | 12/2008 | Nakamura | | |
| 2009/0285528 A1 | 11/2009 | Chang et al. | | |
| 2013/0038935 A1 | 2/2013 | Moussa et al. | | |
| 2014/0104665 A1 | 4/2014 | Popovich et al. | | |
| 2014/0131586 A1 | 5/2014 | Wang et al. | | |
| 2014/0140654 A1 | 5/2014 | Brown et al. | | |
| 2014/0218801 A1* | 8/2014 | Simmonds | ............... | G02B 27/1086 359/567 |
| 2015/0255946 A1 | 9/2015 | Kitamura | | |

OTHER PUBLICATIONS

International Search Report for international application No. PCT/US2017/020298.

Beyer et al. Holographic recording of Bragg gratings for wavelength division multiplexing in doped and partially polymerized poly(methyl methacrylate). Applied Optics, vol. 42, No. 1. Jan. 1, 2003.

Written Opinion of the ISA (USPTO) for international application No. PCT/US2017/020087.

International Search Report for international application No. PCT/US2017/020087.

M. R. Ayres, "k-Space Formalism," Holographic Data Storage: From Theory to Practical Systems, 2010, pp. 26-31,John Wiley & Sons, Ltd., Chichester, GB.

H. Kogelnik, "Coupled wave theory for thick hologram gratings," Bell Sys. Tech. J. 48, 1969, 2909-2947.

F. H. Mok, G. W. Burr, D. Psaltis, "System metric for holographic memory systems," Opt. Lett. 21, 1996, 896-898.

International Search Report for PCT/US2016/048499.

Written Opinion of the International Searching Authority for PCT/US2016/048499.

* cited by examiner

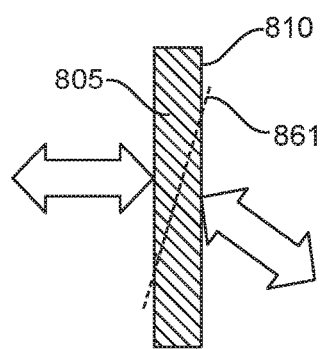
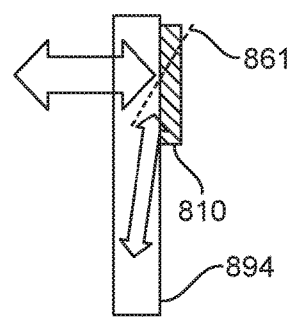
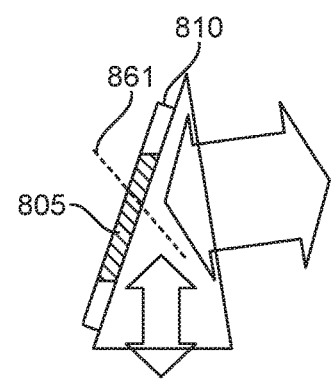
FIG. 8A    FIG. 8B    FIG. 8C
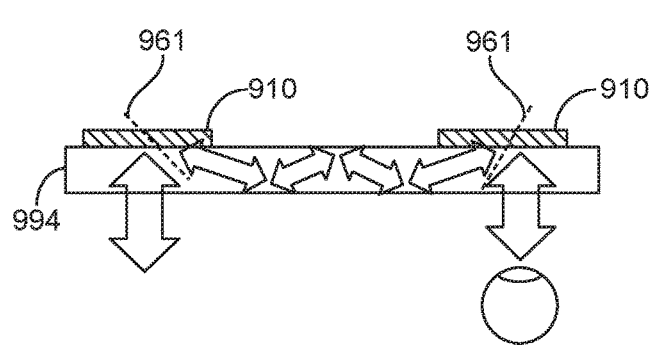
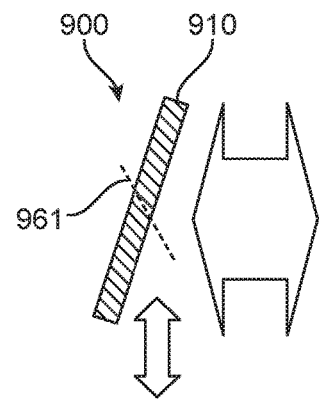
FIG. 9A
FIG. 9B

SKEW MIRRORS, METHODS OF USE, AND METHODS OF MANUFACTURE

CROSS-REFERENCE TO RELATED PATENT APPLICATIONS

This application claims priority from co-pending U.S. application Ser. No. 15/174,938, filed 6 Jun. 2016 and titled "SKEW MIRRORS, METHODS OF USE, AND METHODS OF MANUFACTURE," 62/209,290, filed 24 Aug. 2015 and titled "MULTIWAVELENGTH DIFFRACTION GRATING MIRRORS, METHODS OF USE, AND METHODS OF MANUFACTURE," and 62/318,917, filed 6 Apr. 2016 and titled "SKEW MIRRORS, METHODS OF USE, AND METHODS OF MANUFACTURE." The above applications are incorporated herein by reference, in their entireties.

BACKGROUND

Conventional dielectric mirrors are produced by coating a surface (typically glass) with layers of materials that differ from each other in their electric permittivity. The layers of materials are typically arranged so that Fresnel reflections from layer boundaries reinforce constructively, producing large net reflectivity. Broadband dielectric mirrors can be designed by ensuring that this condition obtains over a relatively broad specified range of wavelengths and incidence angles. However, because the layers are deposited on a surface, the reflective axis of a dielectric mirror is necessarily coincident with surface normal, i.e. the reflective axis is perpendicular to the mirror surface. Because of this constraint on the reflective axis, a dielectric mirror is entirely inadequate for some purposes. Moreover, glass dielectric mirrors tend to be relatively heavy, making them suboptimal or inappropriate for applications requiring a relatively lightweight reflective component.

Conversely, conventional grating structures can reflect light about a reflective axis that differs from surface normal of the medium in which the grating structure resides. However, for a given angle of incidence, angles of reflection for conventional grating structures typically co-vary with wavelength of incident light. Thus, using a conventional grating structure to reflect light avoids the constraint inherent in dielectric mirrors that reflective axes must coincide with surface normal. However, where a constant reflective axis is required, a conventional grating structure is typically limited to a single wavelength or very narrow range of wavelengths for a given angle of incidence. Similarly, a conventional grating structure is limited to a single angle of incidence or very narrow range of incidence angles in order to reflect light of a specified wavelength about a constant reflective axis. Accordingly, a conventional grating structure does not have a constant reflective axis over any significant range of wavelengths or angles of incident light.

Accordingly, requirements for a relatively simple device that reflects light about a reflective axis not constrained to surface normal, and whose angle of reflection for a given angle of incidence is substantially constant at multiple wavelengths, are not met by currently available reflective devices comprising either reflective grating structures or dielectric mirrors. A need therefore exists for such a reflective device, and such need may be acute in head mounted display devices.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 8A is a cross-section view illustrating reflective properties of a skew mirror according to an embodiment.

FIG. 8B is a cross-section view illustrating reflective properties of a skew mirror according to an embodiment.

FIG. 8C is a cross-section view illustrating reflective properties of a skew mirror according to an embodiment.

FIG. 9A is a cross-section view illustrating reflective properties of a skew mirror according to an embodiment.

FIG. 9B is a cross-section view illustrating reflective properties of a skew mirror according to an embodiment.

DETAILED DESCRIPTION

Figure 1B:
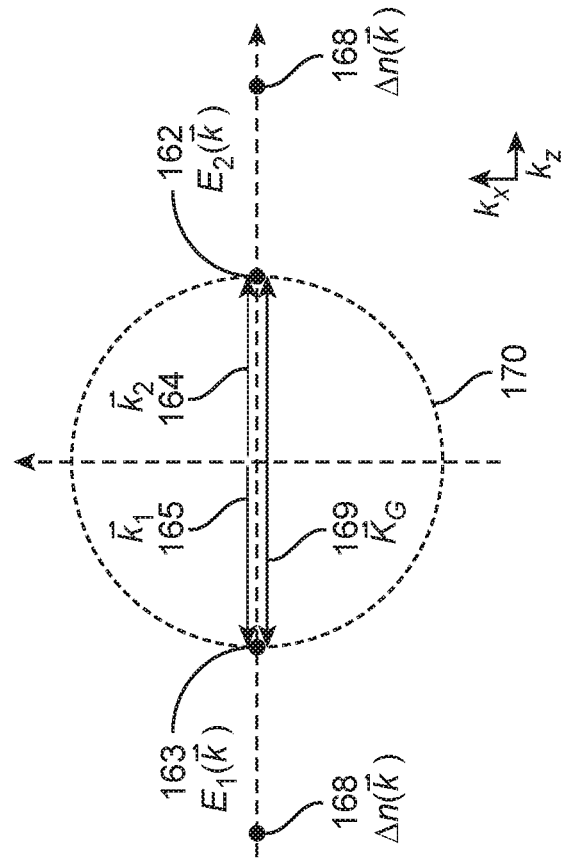
FIG. 1B is a cross-section view of a k-space representation of a single sinusoidal hologram.

Embodiments of the present invention include a reflective device comprising a grating medium within which resides a volume hologram or other grating structure. The grating medium, by virtue of the grating structure residing therein, has physical properties that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some embodiments, the above phenomenon is observed for multiple angles of incidence.

Similarly, embodiments typically have substantially constant reflective axes (i.e., reflective axes have reflective axis angles that vary by less than 1.0 degree) across a range of incidence angles for incident light of a given wavelength, and this phenomenon may be observed with incident light at various wavelengths. In some embodiments, the reflective axes remain substantially constant for every combination of a set of multiple incidence angles and a set of multiple wavelengths In some embodiments, the grating structure includes a hologram generated by interference between multiple light beams referred to as recording beams. Typically, but not necessarily, the grating structure includes multiple holograms. The multiple holograms may be recorded using recording beams incident upon the grating medium at angles that vary among the multiple holograms (i.e. angle multiplexed), and/or using recording beams whose wavelengths vary among the multiple holograms (i.e. wavelength multiplexed). In some embodiments, the grating structure includes a hologram recorded using two recording beams whose angles of incidence upon the grating medium vary while the hologram is being recorded, and/or whose wavelengths vary while the hologram is being recorded. Embodiments further include a device wherein the reflective axis differs from surface normal of the grating medium by at least 1.0 degree; or at least by 2.0 degrees; or at least by 4.0 degrees; or at least by 9.0 degrees.

k-Space Formalism for Holography

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1), $$E_r(\vec{r}) = A_r \exp(i\vec{k}_r \cdot \vec{r}) \xrightarrow{\mathcal{F}} E_r(\vec{k}) = A_r \delta(\vec{k} - \vec{k}_r), \quad (1)$$

where $E_r(\vec{r})$ is the optical scalar field distribution at all $\vec{r} = \{x, y, z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}$ is the wave vector, whose length indicates the spatial frequency of the light waves, and whose direction indicates the direction of propagation. In some embodiments, all beams are composed of light of the same wavelength, so all optical wave vectors must have the same length, i.e., $|\vec{k}| = k_n$. Thus, all optical propagation vectors must lie on a sphere of radius $k_n = 2\pi n_0/\lambda$, where $n_0$ is the average refractive index of the hologram ("bulk index"), and $\lambda$ is the vacuum wavelength of the light. This construct is known as the k-sphere. In other embodiments, light of multiple wavelengths may be decomposed into a superposition of wave vectors of differing lengths, lying on different k-spheres.

Another important k-space distribution is that of the holograms themselves. Volume phase holograms usually consist of spatial variations of the index of refraction within a grating medium. The index of refraction spatial variations, typically denoted $\Delta n(\vec{r})$, can be referred to as index modulation patterns, the k-space distributions of which are typically denoted $\Delta n(\vec{k})$. The index modulation pattern created by interference between a first recording beam and a second recording beam is typically proportional to the spatial intensity of the recording interference pattern, as shown in equation (2), $$\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r}), \quad (2)$$

where $E_1(\vec{r})$ is the spatial distribution of the signal first recording beam field and $E_2(\vec{r})$ is the spatial distribution of the second recording beam field. The unary operator * denotes complex conjugation. The final term in equation (2), $E_1(\vec{r})E_2^*(\vec{r})$, maps the incident second recording beam into the diffracted first recording beam. Thus we can write equation (3), $$E_1(\vec{r})E_2^*(\vec{r}) \xrightarrow{\mathcal{F}} E_1(\vec{k}) \otimes E_2(\vec{k}), \quad (3)$$

where $\otimes$ is the 3D cross correlation operator. This is to say, the product of one optical field and the complex conjugate of another in the spatial domain becomes a cross correlation of their respective Fourier transforms in the frequency domain.

Figure 1A:
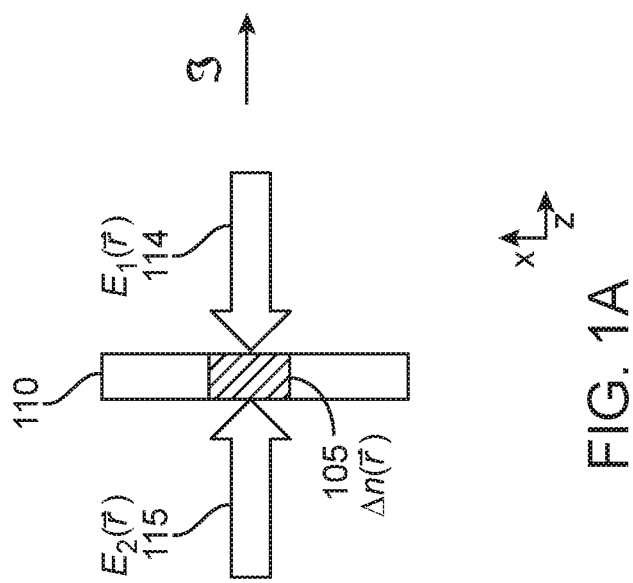
FIG. 1A is a cross-section view of a hologram recorded in a grating medium.

FIG. 1A illustrates a real space representation of recording a hologram 105 in a grating medium 110 using a second recording beam 115 and a first recording beam 114. The grating medium typically includes a recording layer configured to record interference patterns as holograms. FIG. 1A omits grating medium components other than the recording layer, such as an additional layer that might serve as a substrate or protective layer for the recording layer. The second recording beam 115 and first recording beam 114 are counter-propagating. Each of the second recording beam 115 and first recording beam 114 are typically plane wave beams having the same wavelength as each other, and the first recording beam 114 typically contains no encoded information that is not also present in the second recording beam. Thus the first and second recording beams, which can be referred to as signal and reference beams, are typically substantially identical to each other except for angles at which they are incident upon the recording medium 110.

FIG. 1B illustrates a k-space representation of the first and second recording beams, and the hologram. The hologram illustrated in FIGS. 1A and 1B is a simple Bragg reflection hologram generated with the counter-propagating first recording beam 114 and second recording beam 115, and recorded in recording medium 110. FIG. 1A shows the second recording beam 115 and the first recording beam 114 impinging on opposite sides of the grating medium 110. Optical scalar field distributions at $\vec{r} = \{x, y, z\}$ 3D spatial vector locations for each of the second recording beam 115 and the first recording beam 114 can be represented as $E_2(\vec{r})$ and $E_1(\vec{r})$, respectively. The recording beams 114, 115 form planar interference fringes, which are recorded as a hologram 105 within the grating medium 110. The hologram 105 comprises a sinusoidal refractive index modulation pattern, and can be represented as $\Delta n(\vec{r})$. In a counter-propagating configuration, the recorded planar interference fringes have a spacing exactly half that of the (internal) wavelength of the light used to record the hologram.

FIG. 1B shows a k-space representation of the situation illustrated in real space by FIG. 1A. The recording beams are represented in FIG. 1B by point-like k-space distributions lying on opposite sides of the recording k-sphere 170. As illustrated in FIG. 1B, the second recording beam has a k-space distribution 162, and the first recording beam has a k-space distribution 163. The second recording beam k-space distribution 162 can be represented as $E_2(\vec{k})$ and the first recording beam k-space distribution 163 can be represented as $E_1(\vec{k})$. Each of the second recording beam k-space distribution 162 and the first recording beam k-space distribution 163 are "point-like." Second recording beam wave vector 164 and first recording beam wave vector 165, are shown extending from the origin to the second recording beam k-space distribution 162 and first recording beam k-space distribution 163, respectively. The second recording beam wave vector 164 can be represented as $E_2(\vec{k})$ and the first recording beam wave vector 165 can be represented as $E_1(\vec{k})$. The hologram itself is represented in FIG. 1B by two conjugate sideband k-space distributions 168, each of which can be represented as $\Delta n(\vec{k})$ and referred to as a $\Delta n(\vec{k})$ k-space distribution. The two $\Delta n(\vec{k})$ k-space distributions 168 have a small, finite size, but are "point-like" in the sense that they are typically several orders of magnitude smaller than their distance to the origin, or other features of FIG. 1B. For instance, if the thickness of grating medium 110 is 200 μm with refractive index 1.5 and the recording beams have a wavelength of 532 nm, then distributions 168 each resemble a sinc function along the $k_z$ dimension with size $3.14 \times 10^4$ radians per meter (rad/m) null-to-null. However, their distance from the origin is $3.56 \times 10^7$ rad/m, which is more than 1000 times as large. Unless specified otherwise, all recited wavelengths refer to vacuum wavelengths.

Typically, the hologram constitutes a refractive index distribution that is real-valued in real space. Locations of the two $\Delta n(\vec{k})$ k-space distributions 168 of the hologram may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{k}_{G+} = \vec{k}_1 - \vec{k}_2$ and $\vec{k}_{G-} = \vec{k}_2 - \vec{k}_1$, where $\vec{k}_{G+}$ and $\vec{k}_G$ are grating vectors from the respective hologram $\Delta n(\vec{k})$ k-space distributions to the origin (not shown individually). A grating vector 169, which can be represented as $\vec{k}_G$, comprising both $\vec{k}_{G+}$ and $\vec{k}_{G-}$ grating vectors, is shown in FIG. 1B as double headed arrow 169 extending between the second recording beam k-space distribution 162 and the first recording beam k-space distribution 163. Note that by convention, wave vectors are represented by a lowercase "k," and grating vectors by uppercase "K."

Once recorded, the hologram may be illuminated by a probe beam to produce a diffracted beam. For purposes of the present disclosure, the diffracted beam can be considered a reflection of the probe beam, which can be referred to as an incident light beam. The probe beam and its reflected beam are angularly bisected by a reflective axis (i.e. the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k}) \big|_{|\vec{k}|=k_n}, \quad (4)$$

where $E_d(\vec{k})$ and $E_p(\vec{k})$ are k-space distributions of the diffracted beam and the probe beam, respectively; and "*" is the 3D convolution operator. The notation $$" \big|_{|\vec{k}|=k_n} "$$

indicates that the preceding expression is evaluated only where $|\vec{k}| = \vec{k}_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

Typically, when the probe beam resembles one of the recording beams used for recording, the effect of the convolution is to reverse the cross correlation during recording, and the diffracted beam will substantially resemble the other recording beam used to record the hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multiwavelength probe beam may be analyzed as a superposition of single-wavelength beams, each obeying Equation (4) with a different k-sphere radius.

Figure 2A:
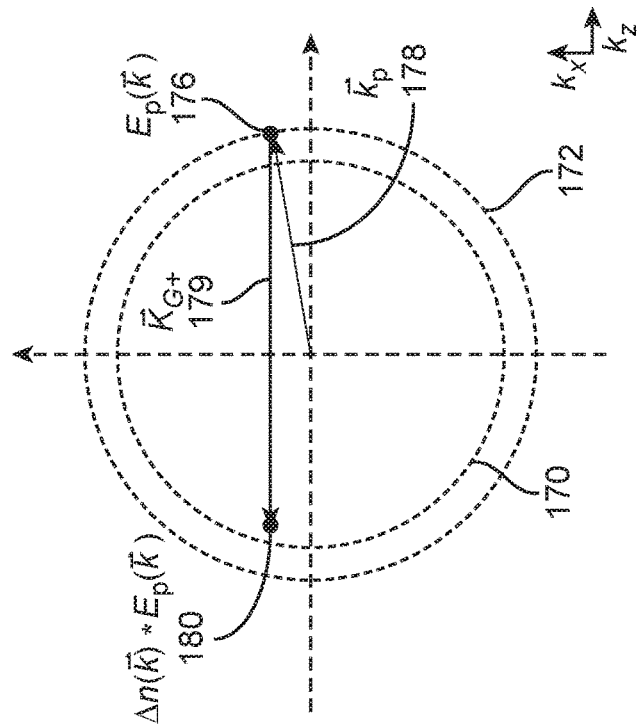
FIG. 2A is a cross-section view of a k-space representation of a single sinusoidal hologram.
Figure 2B:
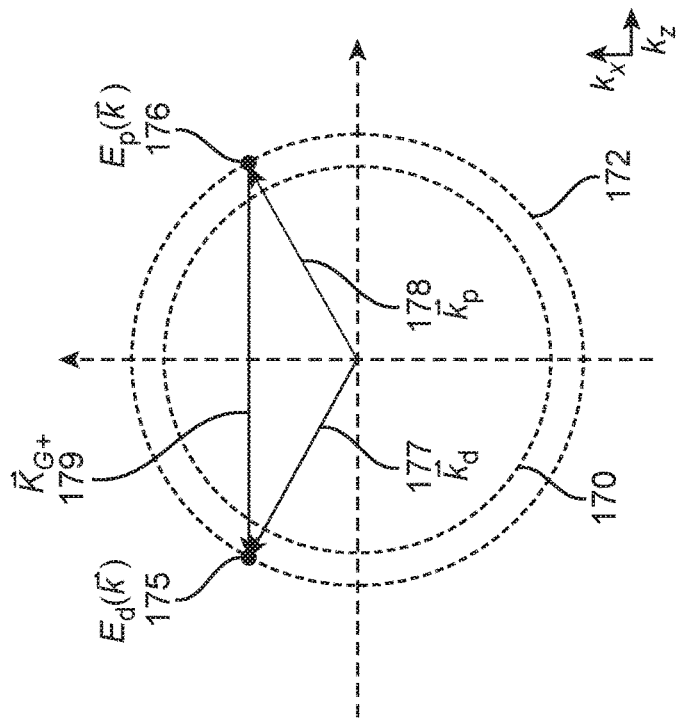
FIG. 2B cross-section view of a k-space representation of a single sinusoidal hologram.

FIGS. 2A and 2B illustrate cases of Bragg-matched and Bragg-mismatched reconstructions, respectively, generated by illuminating the hologram depicted in FIGS. 1A and 1B. In both the Bragg-matched and Bragg-mismatched cases, the hologram is illuminated with a probe beam having a shorter wavelength than the recording beams used to record the hologram. The shorter wavelength corresponds to a longer wave vector. Accordingly, a probe k-sphere 172 has a greater radius than that of the recording k-sphere 170. Both the probe k-sphere 172 and the recording k-sphere 170 are indicated in FIGS. 2A and 2.

FIG. 2A shows a case where the probe beam is designed to produce a diffracted beam k-space distribution 175 (represented as $E_d(\vec{k})$) that is point-like and lies on the probe beam k-sphere 172. The diffracted beam k-space distribution 175 is produced according to the convolution of Equation (4). The probe beam has a k-space distribution 176 (represented as $E_p(\vec{k})$) that is also point-like. In this case, the probe beam is said to be "Bragg-matched" to the hologram, and the hologram may produce significant diffraction, even though the probe beam wavelength differs from the wavelength of the recording beams used to record the hologram. As shown in FIG. 2A, the convolution operation may also be represented geometrically by the vector sum $\vec{k}_d = \vec{k}_p + \vec{K}_{G+}$, where $\vec{k}_d$ represents a diffracted beam wave vector 177, $\vec{k}_p$ represents a probe beam wave vector 178, and $\vec{K}_{G+}$ represents a sideband grating vector 179.

FIG. 2A shows a k-space representation of a mirror-like diffraction (which can be referred to as a reflection) of the probe beam by the hologram, where the probe beam angle of incidence with respect to the $k_z$ axis is equal to the diffracted beam angle of reflection with respect to the $k_z$ axis. FIG. 2B shows a k-space representation of a Bragg-mismatched case, wherein a k-space polarization density distribution 180, which can be represented as $\Delta n(\vec{k})*E_p(\vec{k})$, does not lie on the probe k-sphere 172, and thus no significant diffraction of the probe beam occurs. This non-diffracted k-space distribution 180 in the Bragg-mismatched case illustrated in FIG. 2B is somewhat analogous to the diffracted beam k-space distribution 175 in the Bragg-matched case illustrated in FIG. 2A, but k-space distribution 180 should not be referred to as a diffracted beam k-space distribution because no significant diffraction of the probe beam occurs.

Comparing the Bragg-matched and Bragg-mismatched cases, it is evident that the hologram will only produce mirror-like diffraction over a very small range of input angles for a given probe wavelength, if at all. Those skilled in the art will recognize that this range may be somewhat extended by over-modulating the hologram, or by using a very thin recording layer; but that these steps may still not lead to mirror-like behavior over a larger range of wavelengths and angles. These steps may also lead to undesired chromatic dispersion.

Skew Mirror Embodiment in k-Space

FIGS. 1A, 1B, 2A, and 2B represent a reflection hologram constituted by a single sinusoidal grating. As illustrated, this hologram exhibits mirror-like reflectivity in a narrow band of wavelengths and incidence angles. The specific properties of such a hologram may be determined by application of the well-known coupled wave theory of Kogelnik. Conversely, embodiments of the present invention exhibit novel mirror-like reflectivity across relatively broad ranges of wavelengths and angles by creating a more complex grating structure comprising multiple gratings.

Figure 3:
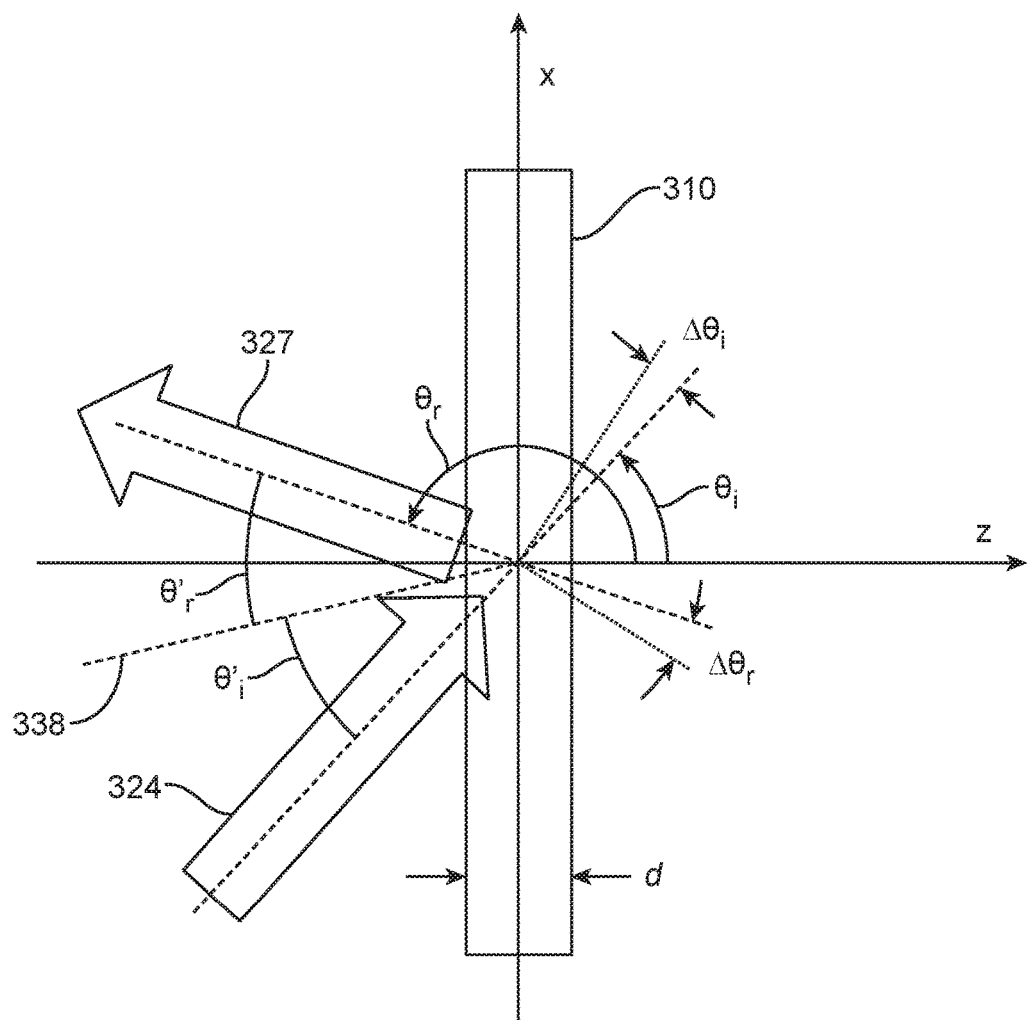
FIG. 3 is a cross-section real view illustrating reflective properties of a skew mirror in real space, according to an embodiment.

FIG. 3 shows a geometry illustrating the Bragg selectivity of a single sinusoidal grating. Grating medium 310 contains a single sinusoidal grating of thickness d which reflects incident light 324 of a single wavelength, $\lambda_0$, as principal reflected light 327. At the Bragg-matched condition, incident light 324 impinges at angle $\theta_i$, and reflects as reflected light 327 at angle $\theta_r$, both angles measured with respect to the z axis. Incident light 324 and reflected light 327 also define a reflective axis 338, about which the angular magnitudes of incidence $\theta_i'$ and reflection $\theta_r'$ are equal. Reflective axis 338 is thus an angular bisector of incident light 324 and reflected light 327.

As is known to those skilled in the art, the sinusoidal grating of FIG. 3 will exhibit both angular and wavelength Bragg selectivity. If incident light 324 impinges at non-Bragg-matched angle $\theta_i+\Delta\theta_i$, the diffraction efficiency may be diminished compared to the Bragg-matched diffraction efficiency. The selectivity of a sinusoidal grating may be characterized by its angular Bragg selectivity, $\Delta\theta_B$, given by equation (5):

$$\Delta\theta_B = \frac{\lambda\cos\theta_r}{n_0 d\sin(\theta_i - \theta_r)}. \tag{5}$$

Those skilled in the art will recognize that in a weakly-diffracting sinusoidal grating, the angle $\theta_i+\Delta\theta_B$ represents the first null in the angular diffraction efficiency plot. The quantity $\Delta\theta_B$ can thus be said to represent the angular width of the sinusoidal grating in that diffraction can be greatly diminished when the angle of incidence deviates from the Bragg-matched angle $\theta_i$ by more than several times $\Delta\theta_B$. Similarly, for a weakly-diffracting sinusoidal grating, the skilled artisan would expect a reflective axis to vary considerably for monochromatic incident light whose angle of incidence varies by more than several times $\Delta\theta_B$.

Conversely, skew mirrors according to present disclosure exhibit relatively stable diffraction and substantially constant reflective axes for incident light whose angle of incidence varies by many times $\Delta\theta_B$. Some skew mirror embodiments exhibit substantially constant reflective axes across a range of incident light angles of incidence of $20\times\Delta\theta_B$. In embodiments, reflective axis angles across a range of incident light angles of incidence of $20\times\Delta\theta_B$ change by less than 0.250 degree; or by less than 0.10 degree; or by less than 0.025 degree.

Similarly, a sinusoidal grating may be characterized by its wavelength Bragg selectivity, $\Delta\lambda_B$, given by equation (6):

$$\Delta\lambda_B = \frac{\lambda_0^2\cos\theta_r}{2n_0^2 d\sin^2(\theta_i - \theta_r)}. \tag{6}$$

Those skilled in the art will recognize that in a weakly-diffracting sinusoidal grating, the wavelength $\lambda_0+\Delta\lambda_B$ represents the first null in the wavelength diffraction efficiency plot. The quantity $\Delta\lambda_B$ can thus be said to represent the wavelength width of the sinusoidal grating in that no significant diffraction will occur when the incident wavelength deviates from the Bragg-matched wavelength $\lambda_0$ by more than several times $\Delta\lambda_B$. Those skilled in the art will also recognize that equations (5) and (6) apply to changes in angle and wavelength only, respectively, and that changing both angle and wavelength simultaneously may result in another Bragg-matched condition.

A grating may also be characterized by its diffracted angle response. For a sinusoidal grating, the diffracted angle response may be expressed by equation (7):

$$\Delta\theta_r \cos\theta_r = -\Delta\theta_i \cos\theta_i. \tag{7}$$

The diffracted angle response expresses the change in the angle of reflection, $\Delta\theta_r$, in response to small changes in the angle of incidence, $\Delta\theta_i$. In contrast, a true mirror has an angle response expressed by equation (8):

$$\Delta\theta_r = -\Delta\theta_i. \tag{8}$$

A device that has a diffracted angle response substantially characterized by equation (7) may be said to exhibit grating-like reflective behavior, whereas a device that has a diffracted angle response substantially characterized by equation (8) may be said to exhibit mirror-like reflective behavior. A device exhibiting grating-like reflective behavior will necessarily also exhibit a reflective axis that changes with angle of incidence, unless that reflective axis is normal to the device surface, in which case $\cos\theta_r=\cos\theta_i$. Accordingly, requirements for a relatively simple device that reflects light about a reflective axis not constrained to surface normal, and whose angle of reflection for angles of incidence spanning multiples of its angular Bragg selectivity is constant at wavelengths spanning multiples of its wavelength Bragg selectivity, may not be met by a single sinusoidal grating.

FIG. 3 illustrates a device geometry in a reflective configuration. Those skilled in the art will recognize that the preceding analysis also applies to device geometries in transmissive configurations and to device geometries in which one or both beams are guided by total internal reflection within the device.

Figure 4A:
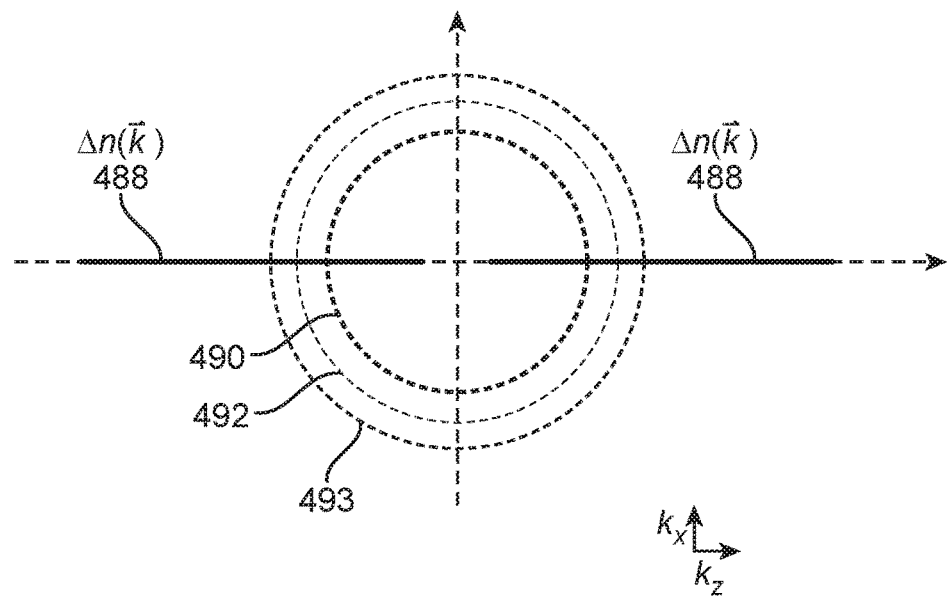
FIG. 4A is a cross-section view of a k-space representation of a skew mirror according to an embodiment.
Figure 4B:
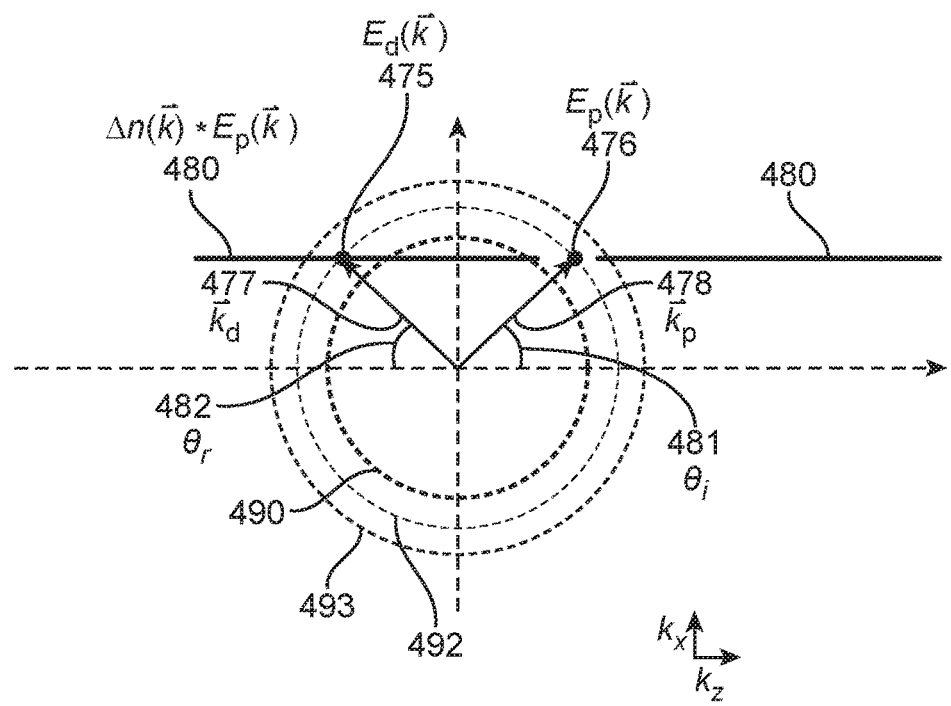
FIG. 4B is a cross-section view of a k-space representation of a skew mirror according to an embodiment.

FIGS. 4A and 4B illustrate operation of a skew mirror in k-space according to an embodiment. FIG. 4A shows two $\Delta n(\vec{k})$ k-space distributions 488 for a hologram recorded in a grating medium and configured to produce multiwavelength mirror-like diffraction according to an embodiment. A red k-sphere 490, green k-sphere 492, and blue k-sphere 493 in FIGS. 4A and 4B indicate k-spheres corresponding to wavelengths of light residing in the red, green, and blue regions of the visible spectrum, respectively.

Instead of two $\Delta n(\vec{k})$ k-space distributions constituting a single sinusoidal grating (and which therefore can be characterized as "point-like"), the $\Delta n(\vec{k})$ k-space distributions 488 shown in FIG. 4A are situated along a substantially straight line in k-space, and thus can be characterized as "line segment-like". In some embodiments, line segment-like $\Delta n(\vec{k})$ k-space distributions comprise continuously-modulated sub-segments of a substantially straight line in k-space. In some embodiments, line segment-like $\Delta n(\vec{k})$ k-space distributions substantially consist of point-like distributions situated along a substantially straight line in k-space. The line segment-like $\Delta n(\vec{k})$ k-space distributions 488 are situated symmetrically about the origin, and thus may be realized as conjugate sidebands of a real-valued refractive index distribution in real space (represented as $\Delta n(\vec{r})$). In some embodiments, the modulation may include absorptive and/or emissive components, and thus may not exhibit conjugate symmetry in k-space. The complex amplitude of the distribution may be uniform, or it may vary in amplitude and/or phase while still exhibiting substantially multiwavelength mirror-like diffraction according to embodiments of the present invention. In an embodiment, the line segment-like $\Delta n(\vec{k})$ k-space distributions are situated substantially along the $k_z$ axis, which, by convention, is the thickness direction of a grating medium.

FIG. 4B illustrates a multiwavelength mirror-like reflective property of the hologram. Illumination of the hologram by a collimated probe beam with point-like k-space distribution 476 (represented as $E_p(\vec{k})$) results in a k-space polarization density distribution 480 (represented as $\Delta n(\vec{k})*E_p(\vec{k})$) according to Equation (4). Because the probe beam k-space distribution 476 is point-like, polarization density distribution 480 resembles a simple translation of $\Delta n(\vec{k})$ k-space distribution 488 from the origin to the tip of probe beam wave vector 478 ($\vec{k}_p$). Then, also according to Equation (4), only the part of the k-space polarization density distribution 480 ($\Delta n(\vec{k})*E_p(\vec{k})$) intersecting the k-sphere 492 of the probe beam k-space distribution 476 ($E_p(\vec{k})$) contributes to diffraction. This produces the diffracted beam k-space distribution 475, ($E_d(\vec{k})$), constituting the diffracted beam. Because $\Delta n(\vec{k})$ k-space distribution 488 resembles a line segment parallel to the $k_z$ axis, it is evident that the magnitude of the angle of reflection 482 ($\theta_r$) is substantially equal to the magnitude of the angle of incidence 481 ($\theta_i$) so that the hologram exhibits mirror-like behavior. Furthermore, it is also evident that this property typically holds for any incidence angle and wavelength that produces any diffraction at all, and for any superposition of probe beams producing diffraction. A k-space polarization distribution $\Delta n(\vec{k})*E_p(\vec{k})$ will intersect the probe k-sphere at a single point with mirror-symmetry about the $k_x$ axis (or about the $k_x$, $k_y$ plane in the 3D case). Thus, the hologram of FIG. 4A is configured to exhibit mirror-like behavior at a relatively broad range of wavelengths and angles, and thus constitutes a broadband holographic mirror.

Embodiments typically, but not necessarily, exhibit a gap in $\Delta n(\vec{k})$ k-space distribution 488 near the origin, as shown in FIG. 4A. The presence of the gap can limit performance at very high $\Delta\theta$ (i.e., grazing angles of both incidence and reflection).

According to an embodiment, a skew mirror $\Delta n(\vec{k})$ k-space distribution may be rotated to an arbitrary angle with respect to the $k_x$, $k_y$, and $k_z$ axes. In some embodiments, the $\Delta n(\vec{k})$ k-space distribution is not perpendicular to the relevant reflecting surface in real space. In other words, the reflective axis of a skew mirror embodiment is not constrained to coincident with surface normal.

Figure 5B:
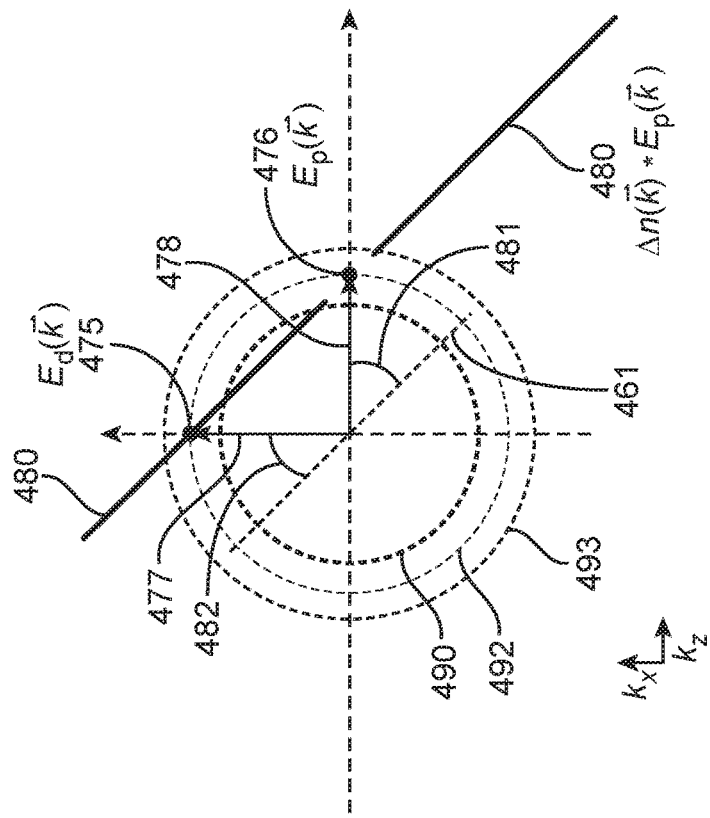
FIG. 5B is a cross-section view of a k-space representation of a skew mirror according to an embodiment.
Figure 5A:
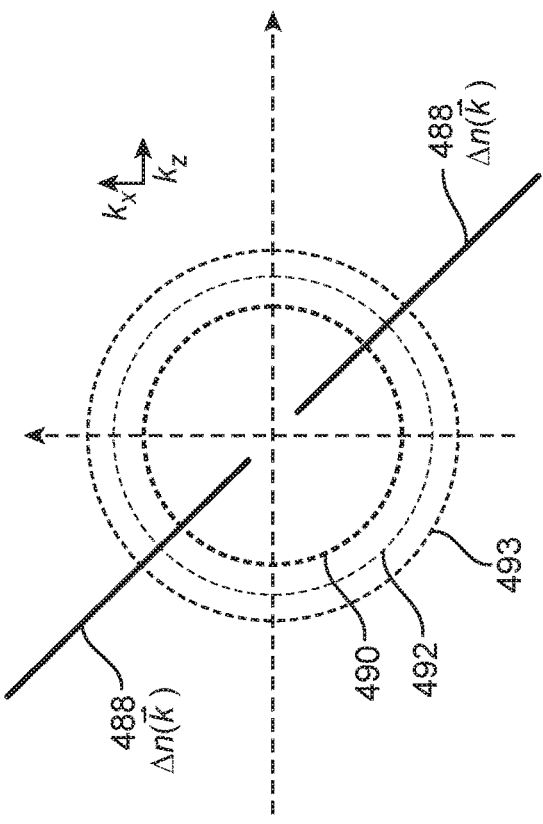
FIG. 5A is a cross-section view of a k-space representation of a skew mirror according to an embodiment.

FIGS. 5A and 5B illustrate a skew mirror in k-space. FIGS. 5A and 5B are identical to FIGS. 4A and 4B, respectively, excepting that all distributions and vectors have been rotated by approximately 45° about the origin. Following the discussion of FIG. 4B, it is evident that the skew mirror of FIG. 5B also produces mirror-like diffraction for all probe beam wavelengths and angles that produce diffraction. The diffraction is mirror-like with respect to the reflective axis 461 defined by the line segment-like $\Delta n(\vec{k})$ k-space distribution 488, i.e., the angle of incidence 481 magnitude with respect to the reflective axis 461 is equal to the angle of reflection 482 magnitude with respect to the reflective axis 461. FIG. 5B illustrates one such case.

Figure 6A:
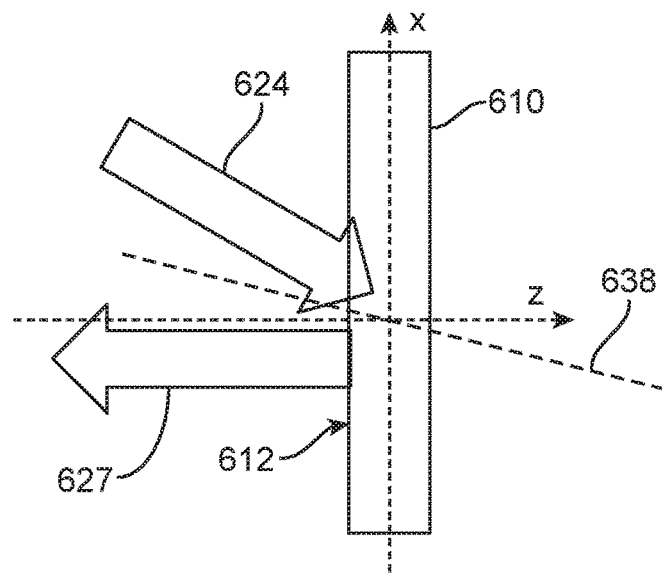
FIG. 6A is a cross-section view illustrating reflective properties of a skew mirror according to an embodiment.

FIG. 6A illustrates the operation of a skew mirror in real space. Skew mirror 610 is characterized by reflective axis 638 at angle −13° measured with respect to the z axis, which is normal to the skew mirror surface 612. Skew mirror 610 is illuminated with incident light 624 with internal incidence angle −26° measured with respect to the z axis. Principal reflected light 627 is reflected with internal reflection angle 180° measured with respect to the z axis.

Figure 6B:
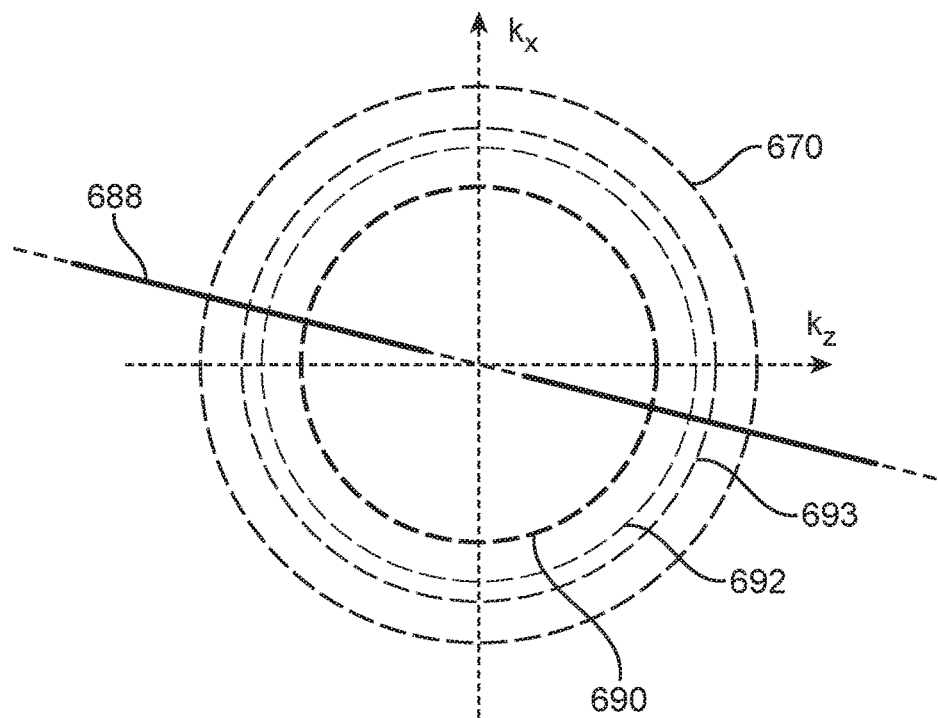
FIG. 6B is a cross-section view of a k-space representation of a skew mirror according to an embodiment.

FIG. 6B illustrates the skew mirror 610 of FIG. 6A in k-space. Line segment-like $\Delta n(\vec{k})$ k-space distribution 688 passes through the origin, and has an angle of −13° with respect to the z axis, equal to that of reflective axis 638. Recording k-sphere 670 is the k-sphere corresponding to the writing wavelength of 405 nm. A red k-sphere 690, green k-sphere 692, and blue k-sphere 693 in FIGS. 6B and 6D indicate k-spheres corresponding to wavelengths of light residing in the red, green, and blue regions of the visible spectrum, respectively.

Figure 6C:
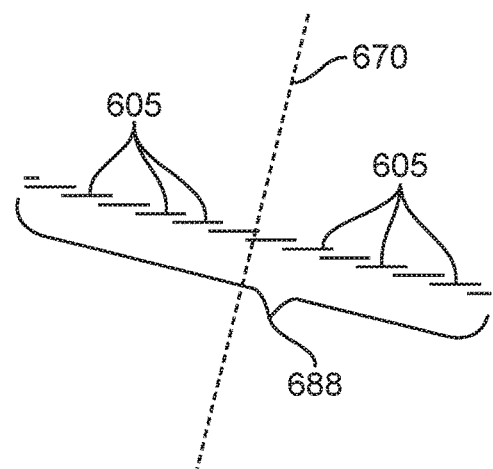
FIG. 6C is a cross-section view of a k-space representation of a skew mirror according to an embodiment.

FIG. 6C illustrates a highly magnified portion of FIG. 6B showing the left intersection between recording k-sphere 670 and line segment-like $\Delta n(\vec{k})$ k-space distribution 688 according to an embodiment. In this view, line segment-like $\Delta n(\vec{k})$ k-space distribution 688 can be seen to be include multiple discrete holograms. Each of the multiple discreet holograms 605 is represented by a horizontal line demarking the first null-to-first null spacing of the hologram in the $k_z$ direction. In some embodiments, the spacing of the discrete holograms may be higher or lower than illustrated in 6C. In some embodiments, the spacing may be low enough to create gaps in line segment-like $\Delta n(\vec{k})$ k-space distribution 688. In some embodiments with gaps, the use of broadband illumination may substantially mask any effect of the gaps upon the reflected light. In some embodiments, this approach may result in a net diffraction efficiency increase. In other embodiments, the spacing of the discrete holograms may be so dense as to approximate or be equivalent to a continuous distribution.

Figure 6D:
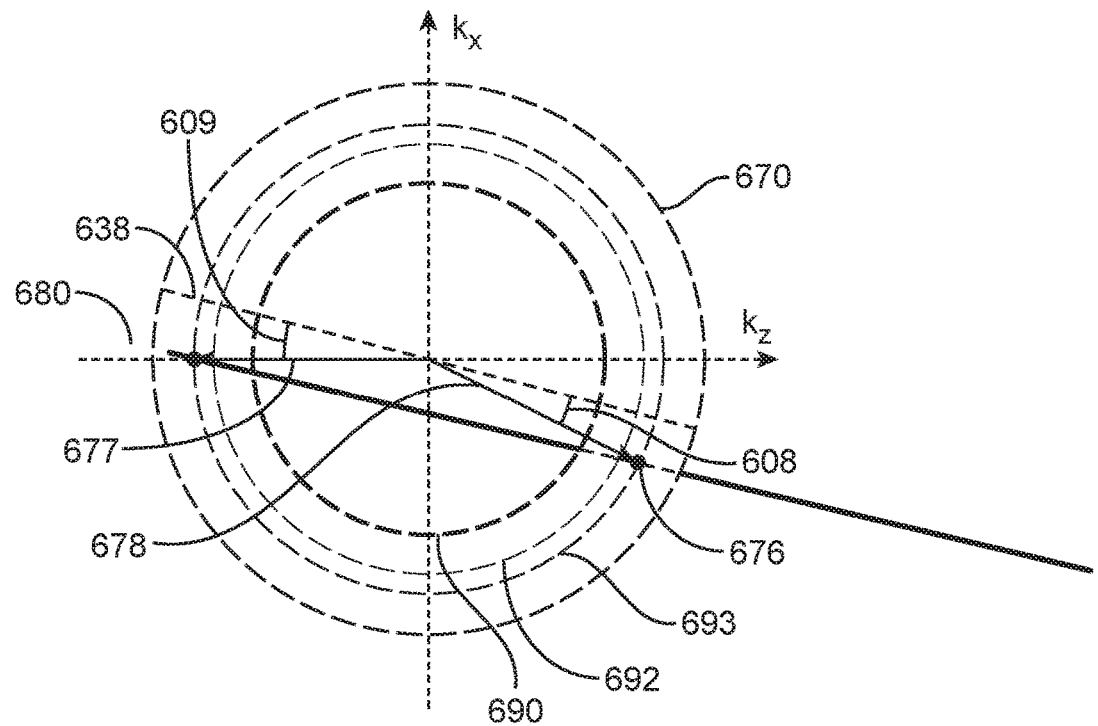
FIG. 6D is a cross-section view of a k-space representation of a skew mirror according to an embodiment.

FIG. 6D illustrates the reflection of blue incident light by the skew mirror of FIG. 6A in k-space. Incident light having a probe beam wave vector 678 impinges with an internal incidence angle of −26° measured with respect to the z axis. The tip of probe beam wave vector 678 lies on blue k-sphere 693, indicating the position of point-like probe beam k-space distribution 676 ($E_p(\vec{k})$). Polarization density distribution 680 is given by the convolution $\Delta n(\vec{k}) * E_p(\vec{k})$, which resembles line segment-like $\Delta n(\vec{k})$ k-space distribution 688 (seen in FIG. 6C) translated to the tip of probe beam wave vector 678. Principal reflected light having diffracted beam wave vector 677 is determined from equation (4) by evaluating polarization density distribution 680 at blue k-sphere 693. Principal reflected light having diffracted beam wave vector 677 is reflected with internal propagation angle 180° measured with respect to the z axis.

Persons skilled in the art will recognize that the term probe beam, typically used here when describing skew mirror properties in k-space, is analogous to the term incident light, which is typically used here when describing skew mirror reflective properties in real space. Similarly, the term diffracted beam, typically used here when describing skew mirror properties in k-space, is analogous to the term principal reflected light, typically used here when describing skew mirror properties in real space. Thus when describing reflective properties of a skew mirror in real space, it is typical to state that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of embodiments of the present invention.

As shown in FIG. 6D, probe beam wave vector 678 and diffracted beam wave vector 677 necessarily form the legs of a substantially isosceles triangle with line segment-like polarization density distribution 680 as the base. The equal angles of this triangle are necessarily congruent with the angle of incidence, 608, and angle of reflection 609, both measured with respect to reflective axis 638. Thus, skew mirror 610 reflects light in a substantially mirror-like manner about reflective axis 638.

The isosceles triangle construction of FIG. 6D obtains whenever $\Delta n(\vec{k})$ k-space distribution 688 substantially resembles a segment of a line passing through the origin, as shown in FIG. 6C. Polarization density distribution 680 hence substantially resembles the straight base of an isosceles triangle, leading to mirror-like reflection about reflective axis 638 for any incident internal wave vectors of any length that diffracts. In some embodiments, dispersion of the grating medium may cause internal wave vectors of the same direction but differing lengths to refract in different directions in an external medium according to Snell's law. Similarly, dispersion may cause external wave vectors of the same direction and differing lengths to refract in different directions in the internal grating medium. Accordingly, if it is desired to minimize the effects of dispersion in a skew mirror, it may be desirable to impart a curve to line segment-like $\Delta n(\vec{k})$ k-space distribution 688, or to otherwise deviate from a line that passes through the origin. Such an approach may reduce net angular dispersion in reflections involving external refraction according to some metric. Since the dispersion of useful grating media is typically quite low, the deviation from a straight line passing through the origin may be small.

Figure 7A:
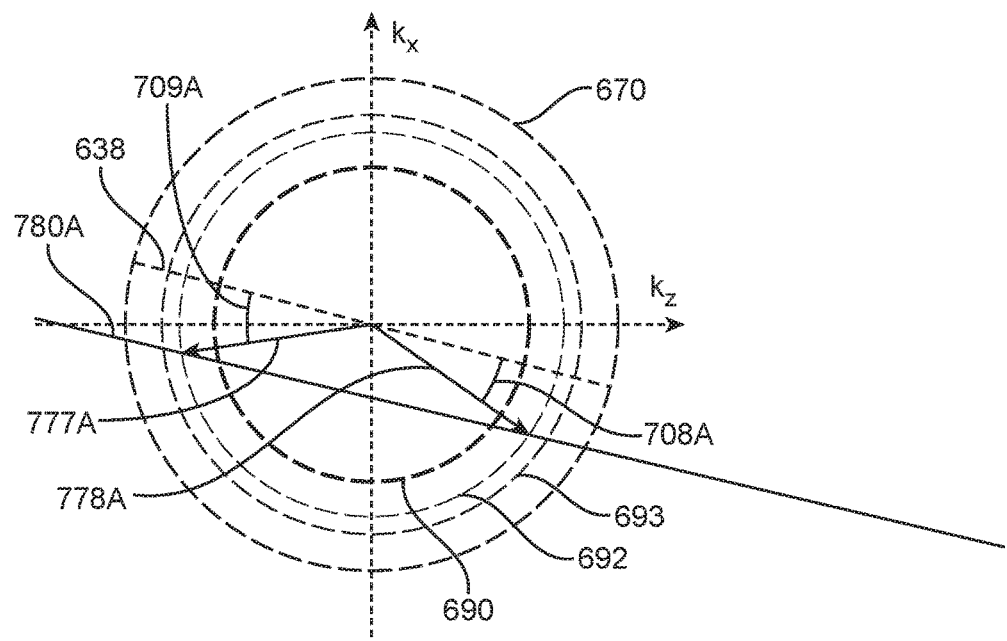
FIG. 7A is a cross-section view of a k-space representation of a skew mirror according to an embodiment.

FIG. 7A illustrates the reflection of green incident light by the skew mirror of FIG. 6A in k-space. Incident light with wave vector 778A impinges with internal propagation angle −35° measured with respect to the z axis. Principal reflected light with wave vector 777A is reflected with internal propagation angle −171° measured with respect to the z axis. The magnitudes of angle of incidence 708A and angle of reflection 709A are both substantially equal to 22 degrees measured with respect to reflective axis 638, thus constituting a mirror-like reflection about reflective axis 638. Polarization density distribution 780A is also illustrated in FIG. 7A.

Figure 7B:
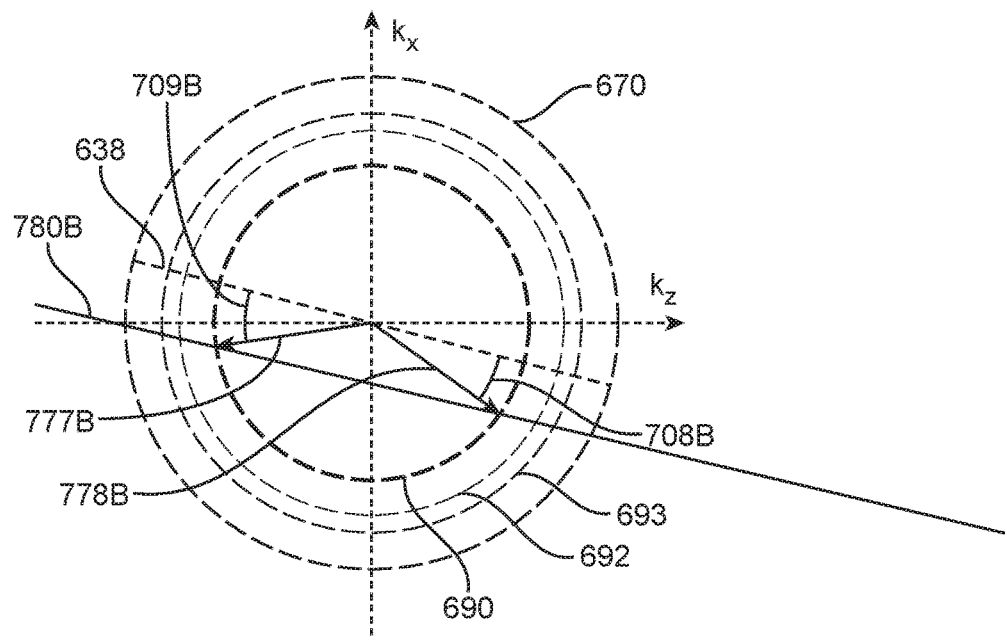
FIG. 7B is a cross-section view of a k-space representation of a skew mirror according to an embodiment.
Figure 10A:
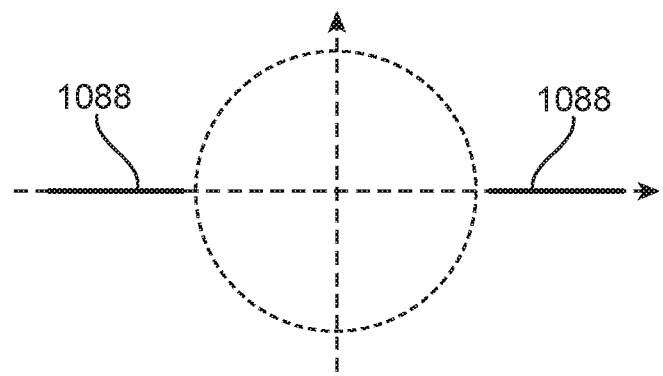
FIG. 10A is a cross-section view of a k-space representation of a skew mirror according to an embodiment.

FIG. 7B illustrates the reflection of red incident light by the skew mirror of FIG. 10A in k-space. Incident light having probe beam wave vector 778 impinges with internal propagation angle −35° measured with respect to the z axis. Principal reflected light having diffracted beam wave vector 777 is reflected with internal propagation angle −171° measured with respect to the z axis. The magnitudes of angle of incidence 708 and angle of reflection 709 are both substantially equal to 22° measured with respect to reflective axis 638, thus constituting a mirror-like reflection about reflective axis 638. Polarization density distribution 780 is also illustrated in FIG. 7B.

FIGS. 7A and 7B show the reflection of green and red light at the same angles of incidence and reflection, illustrating the achromatic reflection property of the skew mirror. Those skilled in the art will recognize that the geometrical constructions of FIGS. 6A-D and 7A-B will produce mirror-like reflection at all angle/wavelength combinations that produce reflection, including angles and wavelengths not specifically illustrated.

Skew Mirror Optical Properties

Embodiments of a skew mirror effect a mirror-like reflection with respect to internal propagation angles, external angles must be determined using Snell's law at the relevant boundaries. Because of this, a skew mirror may introduce aberrations, dispersion, and/or field distortion to external wavefronts. In some embodiments, aberrations, dispersion, and/or field distortions may be mitigated by the use of compensating optics. In some embodiments, the compensating optics may include another skew mirror in a symmetric relationship.

A relatively thin skew mirror may introduce lowered angular resolution in the reflected beam in proportion to the beam's projection onto the thin axis. In some cases it may be advantageous to increase the thickness of the recording layer in order to mitigate this effect.

Skew Mirror Reflectivity

Embodiments of a skew mirror may be either fully or partially reflective. Embodiments of a skew mirror may require relatively high dynamic range recording medium to achieve high reflectivity over a relatively wide wavelength bandwidth and angle range. In an embodiment, a skew mirror with an angular range spanning 105° at 405 nm down to 20° at 650 nm may require 183 individual holograms in a 200 μm recording layer. This configuration has a reflectivity of approximately 7.5% using a state-of-the-art photosensitive recording medium with a maximum refractive index modulation of 0.03. In some embodiments, increasing recording medium thickness may not lead to increased reflectivity since diffractive selectivity also increases with thickness.

Skew Mirror Applications

The preceding exposition pertains to internal wavelengths and propagation angles, although in one case a slab-like hologram with thickness in the z direction was described.

Many other configurations are possible within the scope of the invention. Without implying limitation, a few exemplary embodiments are illustrated here.

FIG. 8A illustrates an embodiment referred to as a skew window comprising grating structure 805 in a grating medium, and including a reflective axis 861 about which incident light is symmetrically refracted. The skew window is a transmissive analog of the skew mirror. FIG. 8B shows a skew coupler embodiment, which uses a skew mirror to couple external light into or out of a waveguide 894. Transmissive skew couplers are also possible. FIG. 8C shows a skew prism embodiment, which may fold an optical path and/or invert an image.

FIG. 9A illustrates a pupil relay embodiment formed by a slab waveguide 994 with two skew couplers, each of which comprises a grating medium 910 having a reflective axis 961 that differs from surface normal of the grating medium. Since this device is configured to relay input rays to output rays with a uniform 1:1 mapping, it can transmit an image at infinity through the waveguide 994 to the eye or other sensor. Such a configuration may be useful for head mounted displays (HMDs), among other applications. In the reverse direction, it may relay an image of the eye, possibly for the purposes of eye tracking. FIG. 9B shows a skew mirror 900 used as a concentrator/diffuser, which can transform a large dim beam into a bright small one, and/or vice-versa.

Figure 10B:
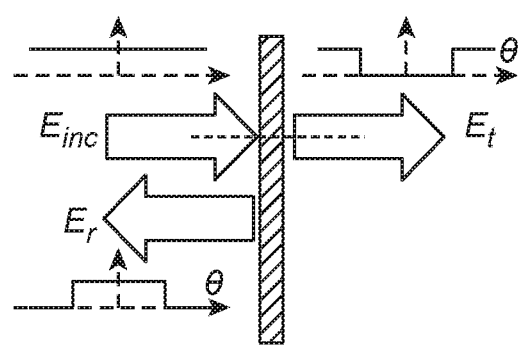
FIG. 10B is a cross-section view illustrating reflective properties of a skew mirror according to an embodiment.

FIGS. 10A and 10B illustrate an angle filter embodiment of a skew mirror. In FIG. 10A, a $\Delta n(\vec{r})$ k-space 1088 distribution is indicated with a higher low frequency cut-off (i.e., larger center gap) compared to the distribution illustrated in FIG. 8A. As a consequence, the skew mirror will reflect only the low θ (i.e., near normal incidence) angular components of narrow band incident beam $E_{inc}$, into reflected beam $E_r$, while transmitting high θ angular components in $E_t$. One skilled in the art will readily discern that an arbitrary circularly-symmetric transfer function may be so realized by modulating the amplitude and/or phase of the line segment-like $\Delta n(\vec{r})$ distribution according to an embodiment of the invention. Angular filtering may also be accomplished with skew mirrors, and in configurations involving multiple skew mirrors recorded in one or more media. These configurations may not be constrained to be circularly-symmetric, and may achieve some level of achromatic operation.

A First Embodiment Skew Mirror

Inventive aspects of a first embodiment skew mirror include the mirror being configured to reflect incident light having a wavelength of 532 nm and incident light having a wavelength of 513 nm about reflective axes that collectively have a mean reflective axis angle of +13.73 degrees relative to surface normal. In a further inventive aspect, the mean reflective axis angle (+13.759 degrees) for 532 nm light incident upon the skew mirror at internal angles of incidence ranging from −4.660 to +1.933 degrees differs by only 0.066 degree from the mean reflective axis angle (+13.693 degrees) for 513 nm light incident upon the skew mirror at the same angles of incidence as the 532 nm incident light. The reflective axes are thus substantially constant for the 532 nm to 513 nm wavelength range, a condition that obtains for internal angles of incidence (relative to surface normal) from −4.660 degrees to +1.993 degrees.

Figure 11A:
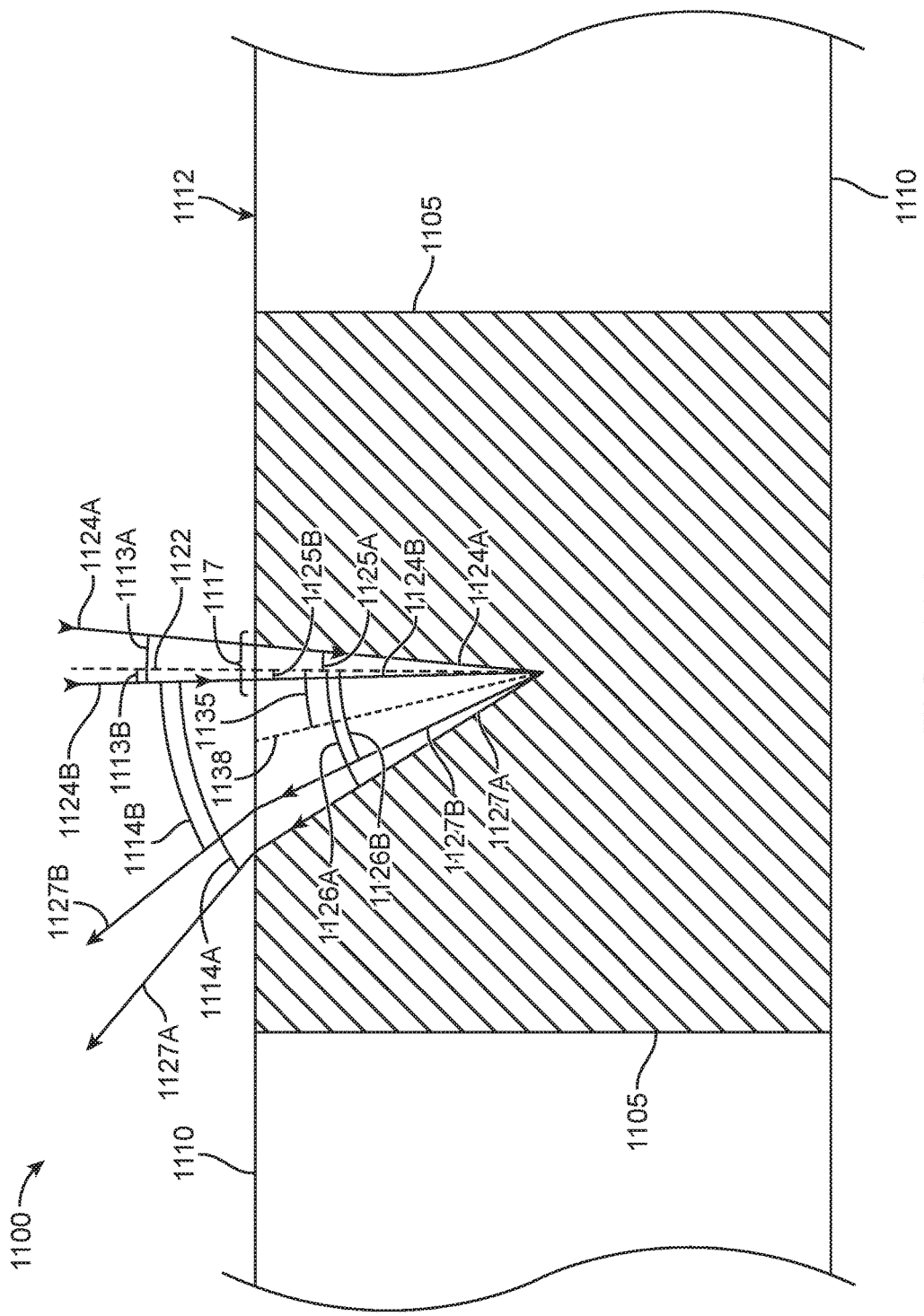
FIG. 11A is a cross-section view illustrating reflective properties of a skew mirror according to an embodiment.
Figure 11B:
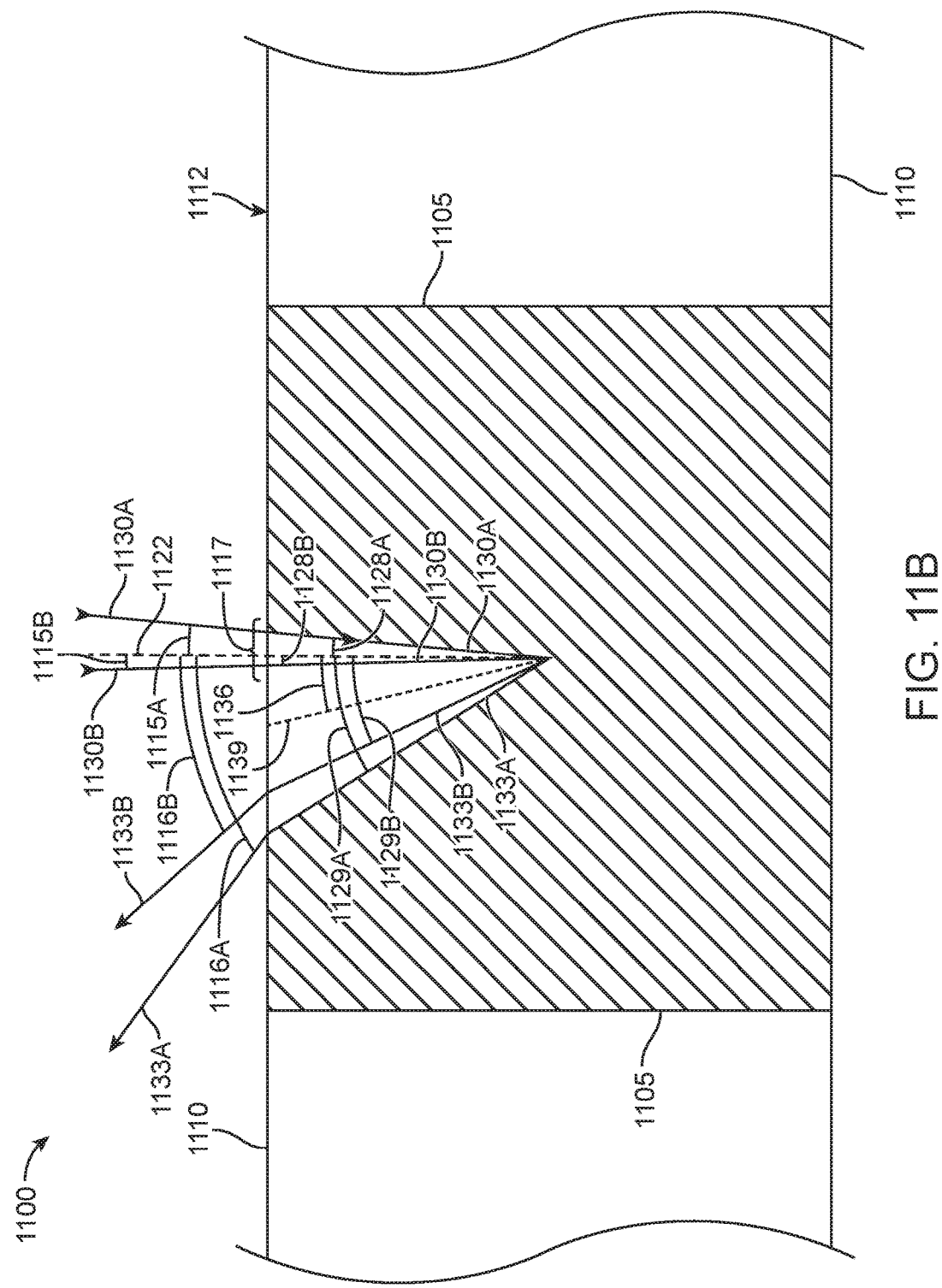
FIG. 11B is a cross-section view illustrating reflective properties of a skew mirror according to an embodiment.

The first embodiment skew mirror 1100 is illustrated in FIGS. 11A and 11B. The first embodiment skew mirror 1100 comprises a grating structure 1105 (shown by diagonal hatch lines in FIGS. 11A and 11B) residing in a grating medium 1110. For purposes of clarity, the diagonal hatch lines are omitted in a region within the grating medium 1110 proximate figure elements indicating light, axes, and angles. However, persons skilled in the art will recognize that the grating structure 1105 typically occupies the region described above. The grating structure 1105 of the first embodiment includes multiple holograms that at least partially spatially overlap with each other in the grating medium 1110.

The multiple holograms are recorded into the grating medium internal volume and thus extend below the grating medium surface 1112. Accordingly, they are sometimes referred to as volume holograms. The multiple holograms of the first embodiment comprise forty eight (48) volume holograms, recorded with recording beams having a wavelength of 405 nm. Each of the 48 volume holograms typically at least partially spatially overlaps all others of the 48 volume holograms in the grating medium 1110. In some embodiments, each of the multiple holograms at least partially spatially overlaps at least one, but not all, of the other of the multiple holograms. Recording the 48 holograms of the first embodiment skew mirror is described below in a first method of making a skew mirror. In some embodiments, the grating structure includes between 1 and 48 holograms; or between 4 and 25 holograms; or at least 5 holograms; or at least 9 holograms; or at least 11 holograms; or at least 24 holograms.

The first embodiment grating medium 1110 is a proprietary photosensitive polymeric optical recording medium, designated AK174-200, available from Akonia Holographics, LLC (Longmont, Colo.). The AK174-200 recording medium of the first embodiment is approximately 200 μm thick, has an M/# of approximately 18, and a refractive index of approximately 1.50 for 405 nm light. Optical recording mediums such as the AK174-200 medium are a type of grating medium in which grating structures can be recorded by optical means. Grating mediums are typically, but not necessarily, at least 70 μm thick to approximately 1.2 mm thick. The AK174-200 medium typically undergoes relatively little shrinkage (usually about 0.1% to 0.2%) as a result of recording volume holograms. Variations of grating mediums include, but are not limited to, photorefractive crystals, dichromated gelatin, photo-thermo-refractive glass, and film containing dispersed silver halide particles.

Variations of the first embodiment skew mirror 1100 may include an additional layer such as a glass cover or glass substrate (not shown in FIGS. 11A and 11B). The additional layer may serve to protect the grating medium from contamination, moisture, oxygen, reactive chemical species, damage, and the like. The additional layer is typically refractive index matched to the grating medium 1110. Because the refractive index for the additional layer is usually very close to the refractive index of the grating medium, refraction of light at the interface of the additional layer and the grating medium can sometimes be ignored. For the first embodiment, refractive indices for both the additional layer and the grating medium are approximately 1.5 for light having a wavelength of 405 nm. For clarity, the additional layer is not shown in FIGS. 11A and 11B.

As shown in FIG. 11A, the grating structure 1105 of the first embodiment has the physical property of being configured to reflect a first incident light 1124A, 1124B, about a first reflective axis 1138 (shown in broken line). The first incident light has a first wavelength of 532 nm and is incident upon the grating medium 1110 at a specific site 1117. The first reflective axis 1138 differs from surface normal 1122 of the grating medium by a first reflective axis angle 1135 of +13.759 degrees (internal, relative to surface normal), where the first incident light has an first internal angle of incidence 1125A, 1125B relative to surface normal, from −4.660 degrees (shown as first incident light 1124A) to +1.933 degrees (shown as first incident light 1124B), resulting in a range of 6.593 degrees. The first internal angles of incidence for the first incident light include one hundred (100) different internal angles spaced at angle intervals of about 0.067 degrees, from −4.660 degrees to +1.933 degrees, as shown in Table 1. In some variations of the first embodiment skew mirror, the first internal angles of incidence for the first incident light include ten (10) different internal angles spaced at angle intervals of about 0.67 degrees, from −4.660 degrees to +1.933 degrees. Throughout this specification and appended claims, identified angles and angle values refer to internal angles relative to surface normal, unless clearly indicated otherwise.

As shown FIG. 11A, first incident light 1124A, having a first internal angle of incidence of 1125A of −4.660 degrees relative to surface normal, is reflected by the grating structure 1105 as first reflected light 1127A, having a first internal angle of reflection 1126A of +32.267 degrees relative to surface normal. First incident light 1124, having a first internal angle of incidence 1125B relative to surface normal of +1.933 degrees, is reflected as first reflected light 1127B having a first internal angle of reflection 1126B of +25.668 degrees. First reflected light 1127A, 1127B has the first wavelength, i.e. in the first embodiment the first reflected light has a wavelength of 532 nm. First incident light angles, first reflected light angles, and first reflective axis angles for the first embodiment skew mirror are shown in Table 1.

TABLE 1

ANGLES OF FIRST INCIDENT LIGHT, FIRST REFLECTED LIGHT, AND FIRST REFLECTIVE AXIS, FOR A FIRST EMBODIMENT SKEW MIRROR; WAVELENGTH = 532 nm; AK174-200 RECORDING MEDIUM; N = 100

| First Internal Angle of Reflection (relative to surface normal, in degrees) | First Reflective Axis Angle (internal, relative to surface normal, in degrees) | First Internal Angle of Incidence (relative to surface normal, in degrees) | Angle Of Incidence of First Incident Light (external, relative to reflective axis, in degrees) | Angle Of Reflection of First Reflected Light (external, relative to reflective axis, in degrees) | Angle of Incidence of First Incident Light (external, relative to surface normal, in degrees) | Angle of Reflection of First Reflected Light (external, relative to surface normal, in degrees) | First Reflective Axis Angle (external, relative to surface normal, in degrees) |
|---|---|---|---|---|---|---|---|
| 25.668 | 13.800 | 1.933 | −11.867 | 11.867 | 2.900 | 40.521 | 21.711 |
| 25.680 | 13.773 | 1.866 | −11.907 | 11.907 | 2.800 | 40.542 | 21.671 |
| 25.691 | 13.746 | 1.800 | −11.946 | 11.946 | 2.701 | 40.563 | 21.632 |
| 25.814 | 13.774 | 1.733 | −12.041 | 12.041 | 2.600 | 40.782 | 21.691 |
| 25.938 | 13.803 | 1.667 | −12.136 | 12.136 | 2.501 | 41.003 | 21.752 |
| 26.005 | 13.802 | 1.600 | −12.202 | 12.202 | 2.400 | 41.122 | 21.761 |
| 25.904 | 13.719 | 1.533 | −12.185 | 12.185 | 2.300 | 40.942 | 21.621 |
| 25.971 | 13.719 | 1.466 | −12.252 | 12.252 | 2.200 | 41.062 | 21.631 |
| 26.094 | 13.747 | 1.400 | −12.347 | 12.347 | 2.101 | 41.283 | 21.692 |
| 26.216 | 13.775 | 1.333 | −12.442 | 12.442 | 2.000 | 41.502 | 21.751 |
| 26.339 | 13.803 | 1.267 | −12.536 | 12.536 | 1.901 | 41.723 | 21.812 |
| 26.350 | 13.775 | 1.200 | −12.575 | 12.575 | 1.800 | 41.742 | 21.771 |
| 26.472 | 13.803 | 1.134 | −12.669 | 12.669 | 1.701 | 41.963 | 21.832 |
| 26.538 | 13.802 | 1.067 | −12.736 | 12.736 | 1.600 | 42.082 | 21.841 |
| 26.660 | 13.830 | 1.001 | −12.830 | 12.830 | 1.501 | 42.303 | 21.902 |
| 26.780 | 13.857 | 0.933 | −12.924 | 12.924 | 1.399 | 42.521 | 21.960 |
| 26.738 | 13.802 | 0.867 | −12.935 | 12.935 | 1.301 | 42.443 | 21.872 |
| 26.803 | 13.801 | 0.800 | −13.001 | 13.001 | 1.200 | 42.561 | 21.881 |
| 26.923 | 13.829 | 0.734 | −13.095 | 13.095 | 1.101 | 42.781 | 21.941 |
| 26.989 | 13.828 | 0.667 | −13.161 | 13.161 | 1.000 | 42.901 | 21.951 |
| 26.946 | 13.773 | 0.601 | −13.173 | 13.173 | 0.901 | 42.822 | 21.862 |
| 27.066 | 13.800 | 0.533 | −13.266 | 13.266 | 0.800 | 43.041 | 21.921 |
| 26.913 | 13.690 | 0.467 | −13.223 | 13.223 | 0.701 | 42.762 | 21.732 |
| 27.088 | 13.744 | 0.400 | −13.344 | 13.344 | 0.600 | 43.081 | 21.841 |
| 27.263 | 13.798 | 0.334 | −13.464 | 13.464 | 0.501 | 43.402 | 21.952 |
| 27.436 | 13.852 | 0.267 | −13.585 | 13.585 | 0.400 | 43.721 | 22.061 |
| 27.230 | 13.715 | 0.201 | −13.515 | 13.515 | 0.301 | 43.342 | 21.822 |
| 27.241 | 13.687 | 0.133 | −13.554 | 13.554 | 0.200 | 43.361 | 21.781 |
| 27.416 | 13.742 | 0.067 | −13.674 | 13.674 | 0.101 | 43.683 | 21.892 |
| 27.589 | 13.794 | 0.000 | −13.794 | 13.794 | 0.000 | 44.002 | 22.001 |
| 27.600 | 13.766 | −0.067 | −13.833 | 13.833 | −0.100 | 44.022 | 21.961 |
| 27.664 | 13.766 | −0.133 | −13.899 | 13.899 | −0.200 | 44.142 | 21.971 |
| 27.837 | 13.818 | −0.200 | −14.018 | 14.018 | −0.300 | 44.462 | 22.081 |
| 27.955 | 13.844 | −0.267 | −14.111 | 14.111 | −0.400 | 44.682 | 22.141 |
| 28.074 | 13.870 | −0.333 | −14.203 | 14.203 | −0.499 | 44.903 | 22.202 |
| 28.030 | 13.815 | −0.401 | −14.215 | 14.215 | −0.601 | 44.822 | 22.111 |
| 28.042 | 13.788 | −0.467 | −14.254 | 14.254 | −0.700 | 44.844 | 22.072 |
| 28.106 | 13.786 | −0.533 | −14.320 | 14.320 | −0.800 | 44.964 | 22.082 |
| 28.224 | 13.812 | −0.600 | −14.412 | 14.412 | −0.900 | 45.184 | 22.142 |
| 28.288 | 13.811 | −0.667 | −14.477 | 14.477 | −1.000 | 45.304 | 22.152 |
| 28.298 | 13.783 | −0.733 | −14.516 | 14.516 | −1.100 | 45.324 | 22.112 |
| 28.362 | 13.781 | −0.800 | −14.581 | 14.581 | −1.200 | 45.444 | 22.122 |
| 28.427 | 13.781 | −0.866 | −14.646 | 14.646 | −1.299 | 45.566 | 22.134 |

TABLE 1-continued

ANGLES OF FIRST INCIDENT LIGHT, FIRST REFLECTED LIGHT,
AND FIRST REFLECTIVE AXIS, FOR A FIRST EMBODIMENT SKEW MIRROR;
WAVELENGTH = 532 nm; AK174-200 RECORDING MEDIUM; N = 100

| First Internal Angle of Reflection (relative to surface normal, in degrees) | First Reflective Axis Angle (internal, relative to surface normal, in degrees) | First Internal Angle of Incidence (relative to surface normal, in degrees) | Angle Of Incidence of First Incident Light (external, relative to reflective axis, in degrees) | Angle Of Reflection of First Reflected Light (external, relative to reflective axis, in degrees) | Angle of Incidence of First Incident Light (external, relative to surface normal, in degrees) | Angle of Reflection of First Reflected Light (external, relative to surface normal, in degrees) | First Reflective Axis Angle (external, relative to surface normal, in degrees) |
|---|---|---|---|---|---|---|---|
| 28.437 | 13.752 | −0.933 | −14.685 | 14.685 | −1.400 | 45.585 | 22.093 |
| 28.607 | 13.804 | −0.999 | −14.803 | 14.803 | −1.499 | 45.906 | 22.204 |
| 28.670 | 13.802 | −1.067 | −14.868 | 14.868 | −1.600 | 46.026 | 22.213 |
| 28.734 | 13.800 | −1.133 | −14.933 | 14.933 | −1.700 | 46.146 | 22.223 |
| 28.797 | 13.798 | −1.200 | −14.998 | 14.998 | −1.800 | 46.266 | 22.233 |
| 28.808 | 13.771 | −1.266 | −15.037 | 15.037 | −1.899 | 46.287 | 22.194 |
| 28.923 | 13.795 | −1.333 | −15.128 | 15.128 | −2.000 | 46.506 | 22.253 |
| 28.829 | 13.715 | −1.399 | −15.114 | 15.114 | −2.099 | 46.327 | 22.114 |
| 28.996 | 13.765 | −1.466 | −15.231 | 15.231 | −2.200 | 46.646 | 22.223 |
| 29.007 | 13.737 | −1.532 | −15.270 | 15.270 | −2.299 | 46.667 | 22.184 |
| 29.069 | 13.735 | −1.600 | −15.335 | 15.335 | −2.400 | 46.786 | 22.193 |
| 29.028 | 13.681 | −1.666 | −15.347 | 15.347 | −2.499 | 46.707 | 22.104 |
| 29.142 | 13.705 | −1.733 | −15.438 | 15.438 | −2.600 | 46.926 | 22.163 |
| 29.309 | 13.755 | −1.799 | −15.554 | 15.554 | −2.699 | 47.247 | 22.274 |
| 29.475 | 13.804 | −1.866 | −15.670 | 15.670 | −2.800 | 47.566 | 22.383 |
| 29.330 | 13.699 | −1.932 | −15.631 | 15.631 | −2.899 | 47.287 | 22.194 |
| 29.392 | 13.696 | −1.999 | −15.696 | 15.696 | −3.000 | 47.406 | 22.203 |
| 29.558 | 13.746 | −2.065 | −15.812 | 15.812 | −3.099 | 47.727 | 22.314 |
| 29.670 | 13.769 | −2.133 | −15.902 | 15.902 | −3.200 | 47.946 | 22.373 |
| 29.630 | 13.716 | −2.199 | −15.914 | 15.914 | −3.299 | 47.867 | 22.284 |
| 29.640 | 13.687 | −2.266 | −15.953 | 15.953 | −3.400 | 47.886 | 22.243 |
| 29.752 | 13.710 | −2.333 | −16.043 | 16.043 | −3.500 | 48.106 | 22.303 |
| 29.916 | 13.759 | −2.399 | −16.158 | 16.158 | −3.600 | 48.426 | 22.413 |
| 29.825 | 13.680 | −2.465 | −16.145 | 16.145 | −3.699 | 48.247 | 22.274 |
| 29.988 | 13.728 | −2.532 | −16.260 | 16.260 | −3.800 | 48.566 | 22.383 |
| 30.151 | 13.776 | −2.598 | −16.374 | 16.374 | −3.899 | 48.887 | 22.494 |
| 30.160 | 13.747 | −2.665 | −16.413 | 16.413 | −4.000 | 48.906 | 22.453 |
| 30.170 | 13.719 | −2.732 | −16.451 | 16.451 | −4.100 | 48.926 | 22.413 |
| 30.332 | 13.767 | −2.799 | −16.565 | 16.565 | −4.200 | 49.246 | 22.523 |
| 30.394 | 13.765 | −2.865 | −16.629 | 16.629 | −4.299 | 49.368 | 22.535 |
| 30.302 | 13.685 | −2.932 | −16.617 | 16.617 | −4.400 | 49.187 | 22.394 |
| 30.363 | 13.683 | −2.998 | −16.681 | 16.681 | −4.499 | 49.308 | 22.405 |
| 30.474 | 13.704 | −3.065 | −16.769 | 16.769 | −4.600 | 49.527 | 22.464 |
| 30.634 | 13.752 | −3.131 | −16.883 | 16.883 | −4.699 | 49.848 | 22.575 |
| 30.694 | 13.748 | −3.198 | −16.946 | 16.946 | −4.800 | 49.967 | 22.584 |
| 30.654 | 13.695 | −3.264 | −16.959 | 16.959 | −4.899 | 49.888 | 22.495 |
| 30.814 | 13.741 | −3.331 | −17.072 | 17.072 | −5.000 | 50.208 | 22.604 |
| 30.874 | 13.738 | −3.397 | −17.135 | 17.135 | −5.099 | 50.329 | 22.615 |
| 30.834 | 13.685 | −3.464 | −17.149 | 17.149 | −5.200 | 50.248 | 22.524 |
| 30.894 | 13.682 | −3.530 | −17.212 | 17.212 | −5.299 | 50.369 | 22.535 |
| 31.051 | 13.727 | −3.597 | −17.324 | 17.324 | −5.400 | 50.688 | 22.644 |
| 31.160 | 13.749 | −3.663 | −17.411 | 17.411 | −5.499 | 50.909 | 22.705 |
| 31.169 | 13.720 | −3.730 | −17.450 | 17.450 | −5.600 | 50.928 | 22.664 |
| 31.180 | 13.692 | −3.796 | −17.488 | 17.488 | −5.699 | 50.949 | 22.625 |
| 31.336 | 13.736 | −3.863 | −17.599 | 17.599 | −5.800 | 51.268 | 22.734 |
| 31.443 | 13.757 | −3.929 | −17.686 | 17.686 | −5.899 | 51.488 | 22.795 |
| 31.549 | 13.777 | −3.996 | −17.772 | 17.772 | −6.000 | 51.706 | 22.853 |
| 31.704 | 13.821 | −4.062 | −17.883 | 17.883 | −6.099 | 52.027 | 22.964 |
| 31.713 | 13.792 | −4.129 | −17.921 | 17.921 | −6.200 | 52.046 | 22.923 |
| 31.723 | 13.764 | −4.195 | −17.959 | 17.959 | −6.299 | 52.067 | 22.884 |
| 31.636 | 13.687 | −4.262 | −17.949 | 17.949 | −6.400 | 51.886 | 22.743 |
| 31.695 | 13.684 | −4.327 | −18.011 | 18.011 | −6.499 | 52.007 | 22.754 |
| 31.848 | 13.727 | −4.395 | −18.121 | 18.121 | −6.600 | 52.326 | 22.863 |
| 31.858 | 13.699 | −4.460 | −18.159 | 18.159 | −6.699 | 52.347 | 22.824 |
| 31.963 | 13.718 | −4.527 | −18.245 | 18.245 | −6.800 | 52.566 | 22.883 |
| 32.116 | 13.762 | −4.593 | −18.355 | 18.355 | −6.899 | 52.888 | 22.995 |
| 32.267 | 13.804 | −4.660 | −18.464 | 18.464 | −7.000 | 53.207 | 23.104 |
| | Mean = 13.759 | | | | | Mean = | 22.234 |
| | Std. Dev. = 0.047 | | | | | | |

Incident light and its reflection are bisected by the reflective axis such that the internal angle of incidence of the incident light relative to the reflective axis has the same magnitude as the internal angle of reflection of the reflected light relative to the reflective axis. Thus it can be said that the incident light and its reflection exhibit bilateral symmetry about the reflective axis.

As shown in FIG. 11B, the grating structure 1105 of the first embodiment is further configured to reflect second incident light 1130A, 1130B about a second reflective axis 1139. The second incident light has a second wavelength of 513 nm and is incident upon the grating medium 1110 at the specific site 1117. The specific site 1117 includes an area of the grating medium surface 1112 upon which both the first and second incident light shine. The second reflective axis 1139 differs from surface normal 1122 of the grating medium by a second reflective axis angle 1136 of +13.693 degrees (internal) relative to surface normal, where the second incident light has a second internal angle of incidence, relative to surface normal, from −4.660 degrees to +1.933 degrees. The second internal angle of incidence includes one hundred (100) different internal angles spaced at angle intervals of approximately 0.067 degrees, from −4.660 degrees to +1.933 degrees. In some variations of the first embodiment skew mirror, the second internal angles of incidence for the second incident light include ten (10) different internal angles spaced at angle intervals of about 0.67 degrees, from −4.660 degrees to +1.933 degrees.

As shown in FIG. 11B, second incident light 1130A, having a second internal angle of incidence 1128A of −4.660 degrees relative to surface normal, is reflected by the grating structure 1105 as second reflected light 1133A, having a second internal angle of reflection 1133A of +32.075 degrees relative to surface normal. Second incident light 1130B, having a second internal angle of incidence 1128B relative to surface normal of +1.933 degrees, is reflected as second reflected light 1133B having a second internal angle of reflection 1129B of +25.273 degrees. Second reflected light 1133A, 1133B has the second wavelength, i.e. in the first embodiment the second reflected light has a wavelength of 513 nm. Second incident light angles, second reflected light angles, and second reflective axis angles for the first embodiment skew mirror, are shown in Table 2.

TABLE 2

ANGLES OF SECOND INCIDENT LIGHT, SECOND REFLECTED LIGHT, AND SECOND REFLECTIVE AXIS, FOR A FIRST EMBODIMENT SKEW MIRROR; WAVELENGTH = 513 nm; AK174-200 RECORDING MEDIUM; N = 100

| Second Internal Angle of Reflection (relative to surface normal, in degrees) | Second Reflective Axis Angle (internal, relative to surface normal, in degrees) | Second Internal Angle of Incidence (relative to surface normal, in degrees) | Angle Of Incidence of Second Incident Light (external, relative to reflective axis, in degrees) | Angle Of Reflection of Second Reflected Light (external, relative to reflective axis, in degrees) | Angle of Incidence of Second Incident Light (external, relative to surface normal, in degrees) | Angle of Reflection of Second Reflected Light (external, relative to surface normal, in degrees) | Second Reflective Axis Angle (external, relative to surface normal, in degrees) |
|---|---|---|---|---|---|---|---|
| 25.273 | 13.603 | 1.933 | −11.670 | 11.670 | 2.900 | 39.821 | 21.361 |
| 25.341 | 13.604 | 1.866 | −11.737 | 11.737 | 2.800 | 39.942 | 21.371 |
| 25.466 | 13.633 | 1.800 | −11.833 | 11.833 | 2.701 | 40.163 | 21.432 |
| 25.645 | 13.689 | 1.733 | −11.956 | 11.956 | 2.600 | 40.481 | 21.541 |
| 25.769 | 13.718 | 1.667 | −12.051 | 12.051 | 2.501 | 40.702 | 21.602 |
| 25.780 | 13.690 | 1.600 | −12.090 | 12.090 | 2.400 | 40.721 | 21.561 |
| 25.959 | 13.746 | 1.533 | −12.213 | 12.213 | 2.300 | 41.041 | 21.671 |
| 25.915 | 13.691 | 1.466 | −12.224 | 12.224 | 2.200 | 40.961 | 21.581 |
| 25.982 | 13.691 | 1.400 | −12.291 | 12.291 | 2.100 | 41.081 | 21.591 |
| 26.160 | 13.746 | 1.333 | −12.413 | 12.413 | 2.000 | 41.400 | 21.700 |
| 26.171 | 13.719 | 1.267 | −12.452 | 12.452 | 1.900 | 41.420 | 21.660 |
| 26.181 | 13.691 | 1.200 | −12.491 | 12.491 | 1.800 | 41.439 | 21.620 |
| 26.249 | 13.691 | 1.134 | −12.557 | 12.557 | 1.701 | 41.560 | 21.631 |
| 26.259 | 13.663 | 1.067 | −12.596 | 12.596 | 1.600 | 41.579 | 21.590 |
| 26.438 | 13.719 | 1.001 | −12.718 | 12.718 | 1.501 | 41.900 | 21.701 |
| 26.448 | 13.691 | 0.933 | −12.757 | 12.757 | 1.400 | 41.919 | 21.660 |
| 26.515 | 13.691 | 0.867 | −12.824 | 12.824 | 1.301 | 42.040 | 21.671 |
| 26.636 | 13.718 | 0.800 | −12.918 | 12.918 | 1.200 | 42.259 | 21.730 |
| 26.592 | 13.663 | 0.734 | −12.929 | 12.929 | 1.101 | 42.180 | 21.641 |
| 26.769 | 13.718 | 0.667 | −13.051 | 13.051 | 1.000 | 42.500 | 21.750 |
| 26.780 | 13.690 | 0.601 | −13.090 | 13.090 | 0.901 | 42.520 | 21.711 |
| 26.845 | 13.689 | 0.533 | −13.156 | 13.156 | 0.800 | 42.639 | 21.720 |
| 26.912 | 13.690 | 0.467 | −13.222 | 13.222 | 0.701 | 42.760 | 21.731 |
| 26.977 | 13.689 | 0.400 | −13.289 | 13.289 | 0.600 | 42.879 | 21.740 |
| 26.989 | 13.661 | 0.334 | −13.327 | 13.327 | 0.501 | 42.900 | 21.701 |
| 27.108 | 13.687 | 0.266 | −13.421 | 13.421 | 0.399 | 43.118 | 21.759 |
| 27.229 | 13.715 | 0.201 | −13.514 | 13.514 | 0.301 | 43.340 | 21.821 |
| 27.240 | 13.686 | 0.133 | −13.553 | 13.553 | 0.200 | 43.359 | 21.780 |
| 27.360 | 13.714 | 0.067 | −13.646 | 13.646 | 0.101 | 43.580 | 21.841 |
| 27.425 | 13.713 | 0.000 | −13.713 | 13.713 | 0.000 | 43.700 | 21.850 |
| 27.490 | 13.712 | −0.066 | −13.778 | 13.778 | −0.099 | 43.820 | 21.861 |
| 27.555 | 13.711 | −0.133 | −13.844 | 13.844 | −0.200 | 43.939 | 21.870 |
| 27.565 | 13.683 | −0.200 | −13.883 | 13.883 | −0.300 | 43.959 | 21.830 |
| 27.630 | 13.682 | −0.267 | −13.949 | 13.949 | −0.400 | 44.079 | 21.840 |
| 27.750 | 13.709 | −0.333 | −14.041 | 14.041 | −0.499 | 44.300 | 21.901 |
| 27.760 | 13.680 | −0.400 | −14.080 | 14.080 | −0.600 | 44.319 | 21.860 |
| 27.825 | 13.680 | −0.466 | −14.146 | 14.146 | −0.699 | 44.440 | 21.871 |
| 27.889 | 13.678 | −0.533 | −14.211 | 14.211 | −0.800 | 44.559 | 21.880 |

TABLE 2-continued

ANGLES OF SECOND INCIDENT LIGHT, SECOND REFLECTED LIGHT,
AND SECOND REFLECTIVE AXIS, FOR A FIRST EMBODIMENT SKEW MIRROR;
WAVELENGTH = 513 nm; AK174-200 RECORDING MEDIUM; N = 100

| Second Internal Angle of Reflection (relative to surface normal, in degrees) | Second Reflective Axis Angle (internal, relative to surface normal, in degrees) | Second Internal Angle of Incidence (relative to surface normal, in degrees) | Angle Of Incidence of Second Incident Light (external, relative to reflective axis, in degrees) | Angle Of Reflection of Second Reflected Light (external, relative to reflective axis, in degrees) | Angle of Incidence of Second Incident Light (external, relative to surface normal, in degrees) | Angle of Reflection of Second Reflected Light (external, relative to surface normal, in degrees) | Second Reflective Axis Angle (external, relative to surface normal, in degrees) |
|---|---|---|---|---|---|---|---|
| 28.007 | 13.703 | −0.600 | −14.303 | 14.303 | −0.900 | 44.778 | 21.939 |
| 28.017 | 13.675 | −0.667 | −14.342 | 14.342 | −1.000 | 44.798 | 21.899 |
| 28.135 | 13.701 | −0.733 | −14.434 | 14.434 | −1.100 | 45.018 | 21.959 |
| 28.253 | 13.726 | −0.800 | −14.526 | 14.526 | −1.200 | 45.238 | 22.019 |
| 28.264 | 13.699 | −0.866 | −14.565 | 14.565 | −1.299 | 45.259 | 21.980 |
| 28.274 | 13.670 | −0.933 | −14.604 | 14.604 | −1.400 | 45.278 | 21.939 |
| 28.338 | 13.669 | −0.999 | −14.669 | 14.669 | −1.499 | 45.399 | 21.950 |
| 28.455 | 13.694 | −1.067 | −14.761 | 14.761 | −1.600 | 45.619 | 22.010 |
| 28.572 | 13.719 | −1.133 | −14.852 | 14.852 | −1.700 | 45.839 | 22.070 |
| 28.635 | 13.718 | −1.200 | −14.917 | 14.917 | −1.800 | 45.959 | 22.080 |
| 28.646 | 13.690 | −1.267 | −14.956 | 14.956 | −1.900 | 45.979 | 22.040 |
| 28.709 | 13.688 | −1.333 | −15.021 | 15.021 | −2.000 | 46.099 | 22.050 |
| 28.720 | 13.660 | −1.399 | −15.060 | 15.060 | −2.099 | 46.120 | 22.011 |
| 28.835 | 13.684 | −1.466 | −15.151 | 15.151 | −2.200 | 46.339 | 22.070 |
| 28.899 | 13.683 | −1.532 | −15.216 | 15.216 | −2.299 | 46.460 | 22.081 |
| 29.013 | 13.707 | −1.600 | −15.307 | 15.307 | −2.400 | 46.679 | 22.140 |
| 29.024 | 13.679 | −1.666 | −15.345 | 15.345 | −2.499 | 46.700 | 22.101 |
| 29.087 | 13.677 | −1.733 | −15.410 | 15.410 | −2.600 | 46.819 | 22.110 |
| 29.150 | 13.675 | −1.799 | −15.474 | 15.474 | −2.699 | 46.940 | 22.121 |
| 29.264 | 13.699 | −1.866 | −15.565 | 15.565 | −2.800 | 47.159 | 22.180 |
| 29.326 | 13.697 | −1.932 | −15.629 | 15.629 | −2.899 | 47.280 | 22.191 |
| 29.388 | 13.694 | −1.999 | −15.694 | 15.694 | −3.000 | 47.399 | 22.200 |
| 29.502 | 13.718 | −2.065 | −15.784 | 15.784 | −3.099 | 47.620 | 22.261 |
| 29.667 | 13.767 | −2.133 | −15.900 | 15.900 | −3.200 | 47.939 | 22.370 |
| 29.678 | 13.739 | −2.199 | −15.938 | 15.938 | −3.299 | 47.960 | 22.331 |
| 29.790 | 13.762 | −2.266 | −16.028 | 16.028 | −3.400 | 48.180 | 22.390 |
| 29.647 | 13.657 | −2.333 | −15.990 | 15.990 | −3.500 | 47.900 | 22.200 |
| 29.760 | 13.680 | −2.399 | −16.079 | 16.079 | −3.600 | 48.120 | 22.260 |
| 29.822 | 13.678 | −2.465 | −16.143 | 16.143 | −3.699 | 48.241 | 22.271 |
| 29.882 | 13.675 | −2.532 | −16.207 | 16.207 | −3.800 | 48.360 | 22.280 |
| 29.944 | 13.672 | −2.599 | −16.271 | 16.271 | −3.900 | 48.480 | 22.290 |
| 30.056 | 13.695 | −2.665 | −16.361 | 16.361 | −4.000 | 48.700 | 22.350 |
| 30.066 | 13.667 | −2.732 | −16.399 | 16.399 | −4.100 | 48.721 | 22.311 |
| 30.229 | 13.715 | −2.799 | −16.514 | 16.514 | −4.200 | 49.041 | 22.421 |
| 30.290 | 13.713 | −2.865 | −16.577 | 16.577 | −4.299 | 49.162 | 22.432 |
| 30.349 | 13.709 | −2.932 | −16.641 | 16.641 | −4.400 | 49.280 | 22.440 |
| 30.360 | 13.681 | −2.998 | −16.679 | 16.679 | −4.499 | 49.301 | 22.401 |
| 30.420 | 13.677 | −3.065 | −16.742 | 16.742 | −4.600 | 49.420 | 22.410 |
| 30.531 | 13.700 | −3.131 | −16.831 | 16.831 | −4.699 | 49.641 | 22.471 |
| 30.590 | 13.696 | −3.198 | −16.894 | 16.894 | −4.800 | 49.760 | 22.480 |
| 30.651 | 13.694 | −3.264 | −16.957 | 16.957 | −4.899 | 49.881 | 22.491 |
| 30.710 | 13.690 | −3.331 | −17.021 | 17.021 | −5.000 | 50.000 | 22.500 |
| 30.820 | 13.712 | −3.397 | −17.109 | 17.109 | −5.099 | 50.221 | 22.561 |
| 30.830 | 13.683 | −3.464 | −17.147 | 17.147 | −5.200 | 50.240 | 22.520 |
| 30.939 | 13.705 | −3.530 | −17.235 | 17.235 | −5.299 | 50.461 | 22.581 |
| 30.949 | 13.676 | −3.597 | −17.273 | 17.273 | −5.400 | 50.480 | 22.540 |
| 31.009 | 13.673 | −3.663 | −17.336 | 17.336 | −5.499 | 50.602 | 22.552 |
| 31.068 | 13.669 | −3.730 | −17.399 | 17.399 | −5.600 | 50.721 | 22.561 |
| 31.225 | 13.714 | −3.797 | −17.511 | 17.511 | −5.700 | 51.041 | 22.671 |
| 31.284 | 13.710 | −3.863 | −17.573 | 17.573 | −5.800 | 51.161 | 22.681 |
| 31.293 | 13.682 | −3.929 | −17.611 | 17.611 | −5.900 | 51.181 | 22.641 |
| 31.352 | 13.678 | −3.996 | −17.674 | 17.674 | −6.000 | 51.302 | 22.651 |
| 31.460 | 13.699 | −4.062 | −17.761 | 17.761 | −6.099 | 51.522 | 22.712 |
| 31.517 | 13.694 | −4.129 | −17.823 | 17.823 | −6.200 | 51.641 | 22.721 |
| 31.528 | 13.667 | −4.195 | −17.861 | 17.861 | −6.299 | 51.662 | 22.682 |
| 31.682 | 13.710 | −4.262 | −17.972 | 17.972 | −6.400 | 51.981 | 22.791 |
| 31.692 | 13.682 | −4.327 | −18.010 | 18.010 | −6.499 | 52.002 | 22.752 |

TABLE 2-continued

ANGLES OF SECOND INCIDENT LIGHT, SECOND REFLECTED LIGHT,
AND SECOND REFLECTIVE AXIS, FOR A FIRST EMBODIMENT SKEW MIRROR;
WAVELENGTH = 513 nm; AK174-200 RECORDING MEDIUM; N = 100

| Second Internal Angle of Reflection (relative to surface normal, in degrees) | Second Reflective Axis Angle (internal, relative to surface normal, in degrees) | Second Internal Angle of Incidence (relative to surface normal, in degrees) | Angle Of Incidence of Second Incident Light (external, relative to reflective axis, in degrees) | Angle Of Reflection of Second Reflected Light (external, relative to reflective axis, in degrees) | Angle of Incidence of Second Incident Light (external, relative to surface normal, in degrees) | Angle of Reflection of Second Reflected Light (external, relative to surface normal, in degrees) | Second Reflective Axis Angle (external, relative to surface normal, in degrees) |
|---|---|---|---|---|---|---|---|
| 31.798 | 13.701 | −4.395 | −18.096 | 18.096 | −6.600 | 52.221 | 22.811 |
| 31.904 | 13.722 | −4.460 | −18.182 | 18.182 | −6.699 | 52.442 | 22.872 |
| 31.913 | 13.693 | −4.527 | −18.220 | 18.220 | −6.800 | 52.461 | 22.831 |
| 31.970 | 13.689 | −4.593 | −18.282 | 18.282 | −6.899 | 52.582 | 22.842 |
| 32.075 | 13.707 | −4.660 | −18.368 | 18.368 | −7.000 | 52.801 | 22.901 |
| | Mean = 13.693 | | | | | Mean = | 22.110 |
| | Std. Dev. = 0.025 | | | | | | |

The first wavelength ($\lambda_1$=532 nm) differs from the second wavelength ($\lambda_2$=513 nm) by 19 nm, which can be represented by a value referred to as a wave fraction (WF), defined as WF=$|\lambda_1-\lambda_2|/[(\lambda_1+\lambda_2)/2]$. Thus where the multiple wavelengths include a first wavelength of 532 nm and a second wavelength of 513 nm, WF=0.036. Similarly, where the multiple wavelengths consist of a continuous spectrum from 390 nm or less to at least 700 nm, WF≥0.57. Embodiments include, but are not limited to, variations in which WF≥0.005; WF≥0.010; WF≥0.030; WF≥0.10; WF≥0.250; WF≥1.0; or WF≥2.0. The wave fraction (WF) defined by a first ($\lambda_1$) and a second ($\lambda_2$) wavelength in the range may, but does not necessarily, includes a continuous spectrum of wavelengths between $\lambda_1$ and $\lambda_2$.

The second reflective axis angle 1136 differs from the first reflective axis angle 1135 by 0.066 degree. Accordingly, the second reflective axis is substantially coincident with the first reflective axis, meaning that the second reflective axis angle 1136 differs from first reflective axis angle 1135 by 1.0 degree or less. Such small difference between reflecting axis angles across a range of wavelengths (in this case, across a WF of 0.039) means that the grating structure acts as a nondispersive mirror. For some applications, the difference between reflective axis angles should be 0.250 degree or less for WF=0.030. Similarly, for some other applications, the difference between reflective axis angles should equal 0.10 degree or less for WF=0.030.

Relative to the first reflective axis, internal angles of incidence of the first incident light range from −11.867 degrees to −18.464 degrees. Relative to the second reflective axis, internal angles of incidence of the second incident light range from −11.670 degrees to −18.368 degrees. Thus it can be said that each of the first incident light and second incident light is offset from the first reflective axis by at least 11.670 degrees. In embodiments, incident light may be offset from its reflective axis by an internal angle of at least 1.0 degree; by at least 2.0 degrees; by at least 5.0 degrees; or by at least 9.0 degrees. A skew mirror or other reflective device configured to reflect incident light that is offset from the incident light's reflective axis can be advantageous in some applications. For example, in a head mounted display it may be advantageous to reflect an image toward a user's eye, but not to retroreflect the image back toward its source. Such reflection toward a user's eye typically requires that incident light be offset from its reflective axis by an internal angle of at least 5.0 degrees, and more typically by at least 9.0 degrees. Similarly, a device utilizing total internal reflection typically requires that incident light be offset from its reflective axis.

First embodiment external angles relative to surface normal for incident light and its reflection are also illustrated in FIGS. 11A and 11B. As seen in FIG. 11A, external angles relative to surface normal for first incident light 1124A, 1124B ranges from first incident light external angle 1113A of −7.000 degrees to first incident light external angle 1113B of +2.900 degrees. As seen in FIG. 11B, external angles relative to surface normal for second incident light 1130A, 1130B ranges from second incident light external angle 1115A of −7.000 to second incident light external angle 1115B of +2.900 degrees. First reflected light external angles 1114A, 1114B and second reflected light external angles 1116A, 1116B are also illustrated in FIGS. 11A and 11B, respectively. External angles are measured with the skew mirror residing in air, with refraction occurring at the skew mirror/air boundary. Angles of incidence and angles of reflection, and reflective axis angles are tabulated in Tables 1 and 2.

The physical properties of the first embodiment enable it to reflect light having other wavelengths, and to reflect light incident upon the grating medium at other angles, about substantially constant reflective axes. For example, the first embodiment grating structure's reflective properties enable it to reflect light having a wavelength of 520.4 nm about reflective axes having a mean reflective axis angle of +13.726 degrees, where the reflective axis angles vary by 0.10 degree or less for angles of incidence ranging from −6.862 degrees to +13.726 degrees and all angles in between (a range of 20.588 degrees). In another example of its reflective properties, the first embodiment is configured to reflect incident light about reflective axes (having a mean reflective axis angle of)+13.726°, where the reflective axis angles vary by 0.20 degree or less for wavelengths at 503 nm and 537 nm (a range of 34 nm, WF=0.065, including a continuous spectrum of wavelengths between 503 nm and 537 nm), where the angle of incidence (internal, relative to surface normal) is −1.174 degrees.

For clarity, light in FIGS. 11A and 11B is illustrated as being reflected at a point residing proximate a center of the grating structure 1105. However, persons skilled in the art recognize that light is typically reflected throughout the grating structure rather than at a specific point.

In some embodiments, the first incident light and the second incident light have wavelengths other than 532 and 513, respectively. Similarly, embodiments include first and second reflective axes that may be coincident with surface normal, or may differ from surface normal.

A Second Embodiment Skew Mirror

Inventive aspects of a second embodiment skew mirror include the mirror being configured to reflect incident light having a wavelength of 532 nm and incident light having a wavelength of 513 nm about reflective axes that collectively have a mean reflective axis angle of +14.62 degrees relative to surface normal. In a further inventive aspect, the mean reflective axis angle (+14.618 degrees) for 532 nm light incident upon the skew mirror at internal angles of incidence ranging from −9.281 to −2.665 degrees differs by less than 0.001 degree from the mean reflective axis angle (+14.617 degrees) for 513 nm light incident upon the skew mirror at the same angles of incidence as the 532 nm incident light. The reflective axes are thus substantially constant for the 532 nm to 513 nm wavelength range, a condition that obtains for internal angles of incidence (relative to surface normal) from −9.281 degrees to −2.665 degrees.

Figure 12A:
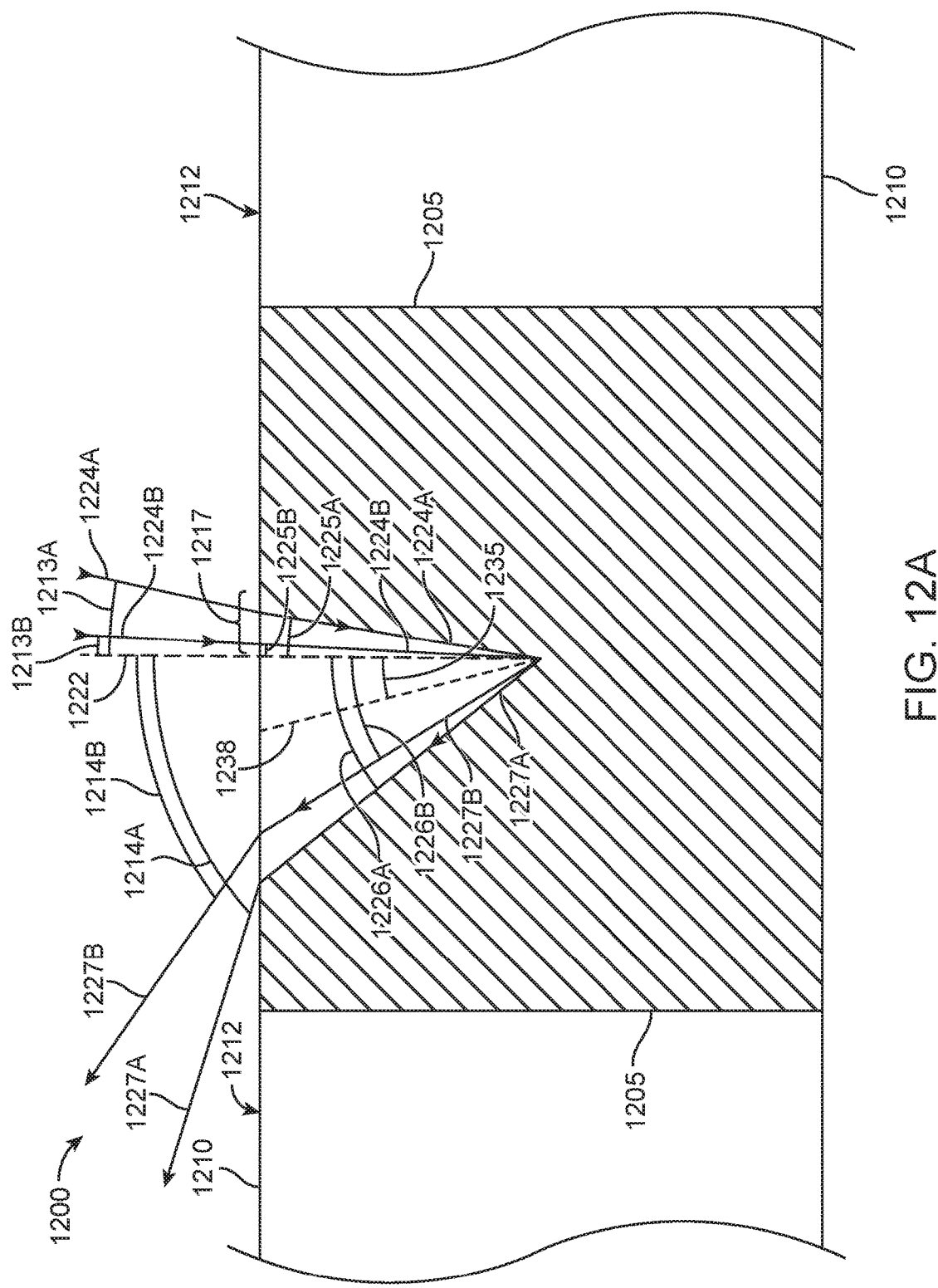
FIG. 12A is a cross-section view illustrating reflective properties of a skew mirror according to an embodiment.
Figure 12B:
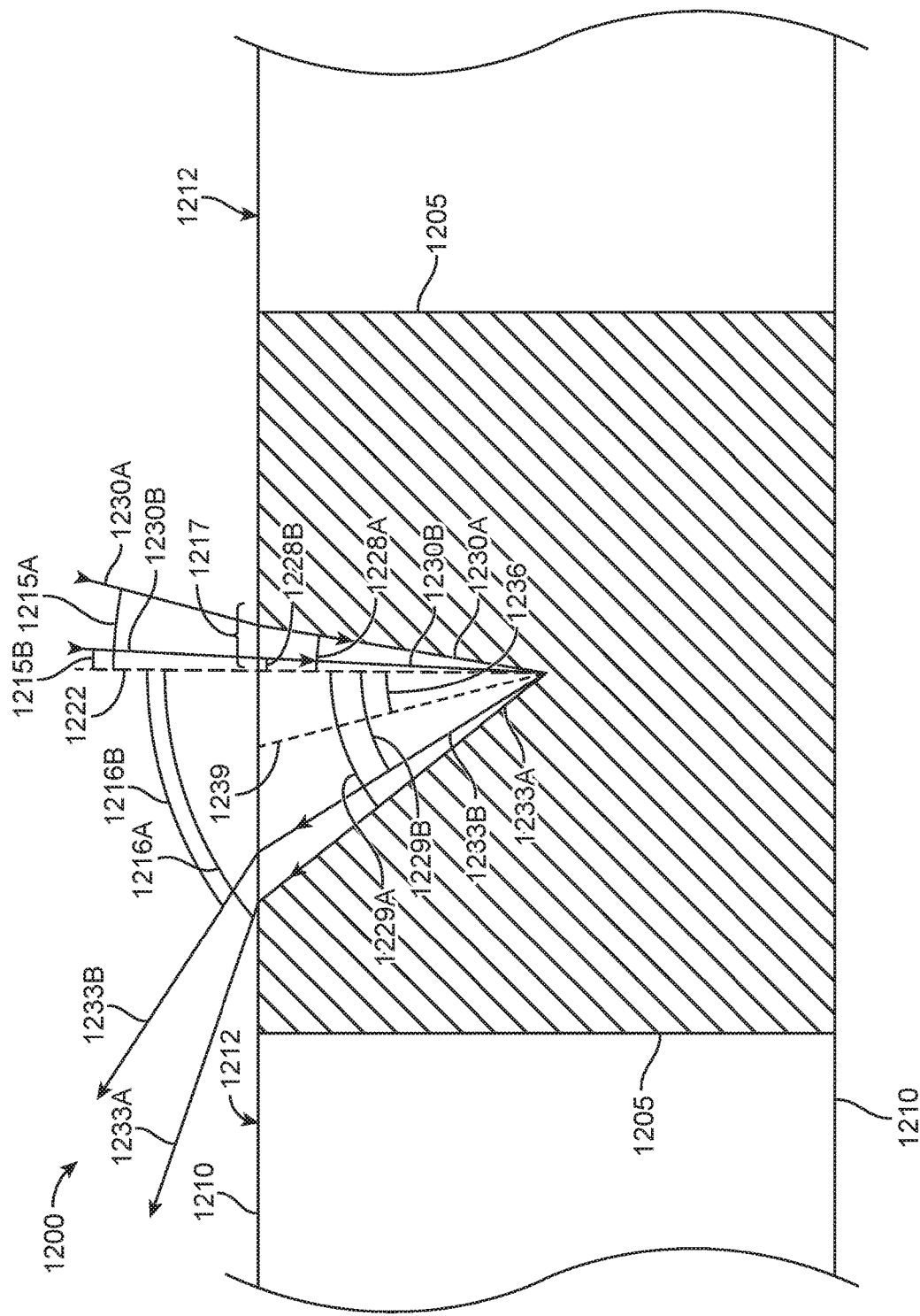
FIG. 12B is a cross-section view illustrating reflective properties of a skew mirror according to an embodiment.

A second embodiment skew mirror 1200 is illustrated in FIGS. 12A and 12B. The second embodiment skew mirror 1200 comprises a grating structure 1205 (shown by diagonal hatch lines in FIGS. 12A and 12B) residing in a grating medium 1210. For purposes of clarity, the diagonal hatch lines are omitted in a region within the grating medium 1210 proximate figure elements indicating light, axes, and angles. However, persons skilled in the art will recognize that the grating structure 1205 typically occupies the region described above. The grating structure 1205 of the second embodiment includes multiple holograms that at least partially overlap with each other in the grating medium 1210. The multiple holograms of the second embodiment comprise forty nine (49) volume holograms, recorded with recording beams having a wavelength of 405 nm. The 49 volume holograms overlap each other in the grating medium 1210, and are recorded in a manner similar to the first embodiment skew mirror, except that recording beam internal angles of incidence are adjusted to account for media shrinkage. Recording the 49 holograms of the second embodiment skew mirror is described below in a second method of making a skew mirror.

The second embodiment grating medium 1210 is a proprietary photosensitive polymeric optical recording medium, designated AK233-200, available from Akonia Holographics, LLC (Longmont, Colo.). The AK233-200 recording medium of the second embodiment is approximately 200 μm thick, has an M/# of approximately 24, and a refractive index of approximately 1.50 for light having a wavelength of 405 nm. The AK233-200 medium typically shrinks about 0.50% as a result of recording volume holograms.

Variations of the second embodiment skew mirror 1200 may include an additional layer such as a glass cover or glass substrate (not shown in FIGS. 12A and 12B). The additional layer is typically refractive index matched to the grating medium, and a thin film of index matching fluid may reside between the grating medium 1210 and the additional layer.

As shown in FIG. 12A, the grating structure 1205 of the second embodiment has the physical property of being configured to reflect a first incident light 1224A, 1224B, about a first reflective axis 1238 (shown in broken line). The first incident light has a first wavelength of 532 nm and is incident upon the grating medium 1210 at a specific site 1217. The first reflective axis 1238 differs from surface normal 1222 of the grating medium by a first reflective axis angle 1235 of +14.618 degrees (internal) relative to surface normal, where the first incident light has a first internal angle of incidence 1225A, 1225B, relative to surface normal, residing between −9.281 degrees to −2.665 degrees, inclusive (a range of 6.616 degrees). The first internal angle of incidence includes one hundred one (101) different internal angles spaced at angle intervals of approximately 0.066 degrees, from −9.281 degrees to −2.665 degrees. In some variations of the second embodiment skew mirror, the first internal angles of incidence for the first incident light include ten (10) different internal angles spaced at angle intervals of about 0.66 degrees, from −9.281 degrees to −2.665 degrees.

As shown FIG. 12A, first incident light 1224A, having a first internal angle of incidence 1225A of −9.281 degrees relative to surface normal, is reflected by the grating structure 1205 as first reflected light 1227A, having a first internal angle of reflectance 1226A of +38.610 degrees relative to surface normal. First incident light 1224B, having a first internal angle of incidence 1225B relative to surface normal of −2.665 degrees, is reflected as first reflected light 1227B having a first internal angle of reflectance 1226B of +31.836 degrees. First reflected light 1224A, 1224B has the first wavelength, i.e. in the second embodiment the first reflected light has a wavelength of 532 nm. First incident light angles, first reflected light angles, and first reflective axis angles, for the second embodiment skew mirror are shown in Table 3.

TABLE 3

ANGLES OF FIRST INCIDENT LIGHT, FIRST REFLECTED LIGHT, AND FIRST REFLECTIVE AXIS, FOR A SECOND EMBODIMENT SKEW MIRROR; WAVELENGTH = 532 nm; AK233-200 RECORDING MEDIUM; N = 101

| First Internal Angle of Reflection (relative to surface normal, in degrees) | First Reflective Axis Angle (internal, relative to surface normal, in degrees) | First Internal Angle of Incidence (relative to surface normal, in degrees) | Angle Of Incidence of First Incident Light (external, relative to reflective axis, in degrees) | Angle Of Reflection of First Reflected Light (external, relative to reflective axis, in degrees) | Angle of Incidence of First Incident Light (external, relative to surface normal, in degrees) | Angle of Reflection of First Reflected Light (external, relative to surface normal, in degrees) | First Reflective Axis Angle (external, relative to surface normal, in degrees) |
|---|---|---|---|---|---|---|---|
| 31.836 | 14.585 | −2.665 | −17.250 | 17.250 | −4.000 | 52.300 | 24.150 |
| 31.941 | 14.604 | −2.732 | −17.336 | 17.336 | −4.100 | 52.520 | 24.210 |
| 31.998 | 14.600 | −2.799 | −17.398 | 17.398 | −4.200 | 52.640 | 24.220 |
| 32.103 | 14.619 | −2.865 | −17.484 | 17.484 | −4.299 | 52.861 | 24.281 |
| 32.160 | 14.614 | −2.932 | −17.546 | 17.546 | −4.400 | 52.980 | 24.290 |
| 32.217 | 14.610 | −2.998 | −17.607 | 17.607 | −4.499 | 53.101 | 24.301 |
| 32.321 | 14.628 | −3.065 | −17.693 | 17.693 | −4.600 | 53.320 | 24.360 |

TABLE 3-continued

ANGLES OF FIRST INCIDENT LIGHT, FIRST REFLECTED LIGHT,
AND FIRST REFLECTIVE AXIS, FOR A SECOND EMBODIMENT SKEW MIRROR;
WAVELENGTH = 532 nm; AK233-200 RECORDING MEDIUM; N = 101

| First Internal Angle of Reflection (relative to surface normal, in degrees) | First Reflective Axis Angle (internal, relative to surface normal, in degrees) | First Internal Angle of Incidence (relative to surface normal, in degrees) | Angle Of Incidence of First Incident Light (external, relative to reflective axis, in degrees) | Angle Of Reflection of First Reflected Light (external, relative to reflective axis, in degrees) | Angle of Incidence of First Incident Light (external, relative to surface normal, in degrees) | Angle of Reflection of First Reflected Light (external, relative to surface normal, in degrees) | First Reflective Axis Angle (external, relative to surface normal, in degrees) |
|---|---|---|---|---|---|---|---|
| 32.378 | 14.623 | −3.131 | −17.754 | 17.754 | −4.699 | 53.441 | 24.371 |
| 32.433 | 14.618 | −3.198 | −17.816 | 17.816 | −4.800 | 53.560 | 24.380 |
| 32.490 | 14.613 | −3.264 | −17.877 | 17.877 | −4.899 | 53.681 | 24.391 |
| 32.546 | 14.607 | −3.331 | −17.938 | 17.938 | −5.000 | 53.800 | 24.400 |
| 32.602 | 14.603 | −3.397 | −18.000 | 18.000 | −5.099 | 53.921 | 24.411 |
| 32.704 | 14.620 | −3.464 | −18.084 | 18.084 | −5.200 | 54.140 | 24.470 |
| 32.760 | 14.615 | −3.530 | −18.145 | 18.145 | −5.299 | 54.261 | 24.481 |
| 32.815 | 14.609 | −3.597 | −18.206 | 18.206 | −5.400 | 54.380 | 24.490 |
| 32.871 | 14.604 | −3.664 | −18.267 | 18.267 | −5.500 | 54.500 | 24.500 |
| 32.926 | 14.598 | −3.730 | −18.328 | 18.328 | −5.600 | 54.620 | 24.510 |
| 33.027 | 14.616 | −3.796 | −18.412 | 18.412 | −5.699 | 54.841 | 24.571 |
| 33.082 | 14.609 | −3.863 | −18.472 | 18.472 | −5.800 | 54.960 | 24.580 |
| 33.137 | 14.604 | −3.929 | −18.533 | 18.533 | −5.899 | 55.081 | 24.591 |
| 33.191 | 14.598 | −3.996 | −18.594 | 18.594 | −6.000 | 55.200 | 24.600 |
| 33.291 | 14.615 | −4.062 | −18.677 | 18.677 | −6.099 | 55.421 | 24.661 |
| 33.345 | 14.608 | −4.129 | −18.737 | 18.737 | −6.200 | 55.540 | 24.670 |
| 33.400 | 14.603 | −4.195 | −18.797 | 18.797 | −6.299 | 55.661 | 24.681 |
| 33.498 | 14.618 | −4.262 | −18.880 | 18.880 | −6.400 | 55.880 | 24.740 |
| 33.552 | 14.612 | −4.327 | −18.940 | 18.940 | −6.499 | 56.001 | 24.751 |
| 33.605 | 14.605 | −4.395 | −19.000 | 19.000 | −6.600 | 56.120 | 24.760 |
| 33.659 | 14.600 | −4.460 | −19.060 | 19.060 | −6.699 | 56.241 | 24.771 |
| 33.757 | 14.615 | −4.527 | −19.142 | 19.142 | −6.800 | 56.460 | 24.830 |
| 33.810 | 14.608 | −4.593 | −19.201 | 19.201 | −6.899 | 56.580 | 24.841 |
| 33.862 | 14.601 | −4.660 | −19.261 | 19.261 | −7.000 | 56.699 | 24.850 |
| 33.916 | 14.595 | −4.726 | −19.321 | 19.321 | −7.099 | 56.820 | 24.861 |
| 34.012 | 14.609 | −4.793 | −19.402 | 19.402 | −7.200 | 57.039 | 24.920 |
| 34.064 | 14.603 | −4.859 | −19.462 | 19.462 | −7.299 | 57.160 | 24.931 |
| 34.116 | 14.595 | −4.926 | −19.521 | 19.521 | −7.400 | 57.279 | 24.940 |
| 34.169 | 14.588 | −4.992 | −19.580 | 19.580 | −7.500 | 57.399 | 24.950 |
| 34.264 | 14.603 | −5.058 | −19.661 | 19.661 | −7.600 | 57.619 | 25.010 |
| 34.316 | 14.596 | −5.124 | −19.720 | 19.720 | −7.699 | 57.740 | 25.021 |
| 34.368 | 14.588 | −5.191 | −19.779 | 19.779 | −7.800 | 57.860 | 25.030 |
| 34.462 | 14.602 | −5.257 | −19.860 | 19.860 | −7.900 | 58.080 | 25.090 |
| 34.513 | 14.595 | −5.324 | −19.918 | 19.918 | −8.000 | 58.199 | 25.100 |
| 34.606 | 14.608 | −5.390 | −19.998 | 19.998 | −8.100 | 58.419 | 25.160 |
| 34.699 | 14.622 | −5.456 | −20.078 | 20.078 | −8.200 | 58.639 | 25.220 |
| 34.750 | 14.614 | −5.522 | −20.136 | 20.136 | −8.299 | 58.760 | 25.231 |
| 34.842 | 14.626 | −5.589 | −20.216 | 20.216 | −8.401 | 58.978 | 25.289 |
| 34.893 | 14.619 | −5.655 | −20.274 | 20.274 | −8.500 | 59.100 | 25.300 |
| 34.943 | 14.611 | −5.721 | −20.332 | 20.332 | −8.600 | 59.220 | 25.310 |
| 35.035 | 14.624 | −5.787 | −20.411 | 20.411 | −8.699 | 59.441 | 25.371 |
| 35.084 | 14.615 | −5.854 | −20.469 | 20.469 | −8.800 | 59.560 | 25.380 |
| 35.134 | 14.607 | −5.919 | −20.527 | 20.527 | −8.899 | 59.681 | 25.391 |
| 35.224 | 14.619 | −5.986 | −20.605 | 20.605 | −9.000 | 59.900 | 25.450 |
| 35.273 | 14.611 | −6.052 | −20.662 | 20.662 | −9.099 | 60.021 | 25.461 |
| 35.321 | 14.601 | −6.119 | −20.720 | 20.720 | −9.200 | 60.140 | 25.470 |
| 35.411 | 14.613 | −6.184 | −20.798 | 20.798 | −9.299 | 60.361 | 25.531 |
| 35.459 | 14.604 | −6.251 | −20.855 | 20.855 | −9.400 | 60.479 | 25.540 |
| 35.548 | 14.616 | −6.316 | −20.932 | 20.932 | −9.499 | 60.700 | 25.601 |
| 35.595 | 14.606 | −6.383 | −20.989 | 20.989 | −9.600 | 60.819 | 25.610 |
| 35.683 | 14.617 | −6.449 | −21.066 | 21.066 | −9.699 | 61.040 | 25.671 |
| 35.731 | 14.608 | −6.516 | −21.123 | 21.123 | −9.800 | 61.159 | 25.680 |
| 35.817 | 14.618 | −6.582 | −21.200 | 21.200 | −9.900 | 61.379 | 25.740 |
| 35.865 | 14.608 | −6.648 | −21.256 | 21.256 | −10.000 | 61.499 | 25.750 |
| 35.951 | 14.618 | −6.714 | −21.332 | 21.332 | −10.100 | 61.719 | 25.810 |
| 35.997 | 14.609 | −6.780 | −21.389 | 21.389 | −10.200 | 61.839 | 25.820 |
| 36.083 | 14.619 | −6.845 | −21.464 | 21.464 | −10.299 | 62.060 | 25.881 |
| 36.168 | 14.628 | −6.912 | −21.540 | 21.540 | −10.400 | 62.279 | 25.940 |
| 36.214 | 14.618 | −6.977 | −21.596 | 21.596 | −10.499 | 62.400 | 25.951 |
| 36.298 | 14.627 | −7.044 | −21.671 | 21.671 | −10.600 | 62.619 | 26.010 |
| 36.343 | 14.617 | −7.110 | −21.726 | 21.726 | −10.699 | 62.739 | 26.020 |
| 36.426 | 14.625 | −7.176 | −21.801 | 21.801 | −10.800 | 62.958 | 26.079 |
| 36.471 | 14.615 | −7.242 | −21.856 | 21.856 | −10.899 | 63.079 | 26.090 |
| 36.553 | 14.623 | −7.308 | −21.931 | 21.931 | −11.000 | 63.298 | 26.149 |

TABLE 3-continued

ANGLES OF FIRST INCIDENT LIGHT, FIRST REFLECTED LIGHT, AND FIRST REFLECTIVE AXIS, FOR A SECOND EMBODIMENT SKEW MIRROR; WAVELENGTH = 532 nm; AK233-200 RECORDING MEDIUM; N = 101

| First Internal Angle of Reflection (relative to surface normal, in degrees) | First Reflective Axis Angle (internal, relative to surface normal, in degrees) | First Internal Angle of Incidence (relative to surface normal, in degrees) | Angle Of Incidence of First Incident Light (external, relative to reflective axis, in degrees) | Angle Of Reflection of First Reflected Light (external, relative to reflective axis, in degrees) | Angle of Incidence of First Incident Light (external, relative to surface normal, in degrees) | Angle of Reflection of First Reflected Light (external, relative to surface normal, in degrees) | First Reflective Axis Angle (external, relative to surface normal, in degrees) |
|---|---|---|---|---|---|---|---|
| 36.635 | 14.631 | −7.373 | −22.004 | 22.004 | −11.099 | 63.519 | 26.210 |
| 36.679 | 14.620 | −7.440 | −22.060 | 22.060 | −11.200 | 63.638 | 26.219 |
| 36.761 | 14.628 | −7.505 | −22.133 | 22.133 | −11.299 | 63.859 | 26.280 |
| 36.804 | 14.616 | −7.572 | −22.188 | 22.188 | −11.400 | 63.978 | 26.289 |
| 36.885 | 14.624 | −7.637 | −22.261 | 22.261 | −11.499 | 64.199 | 26.350 |
| 36.964 | 14.630 | −7.704 | −22.334 | 22.334 | −11.600 | 64.418 | 26.409 |
| 37.007 | 14.619 | −7.769 | −22.388 | 22.388 | −11.699 | 64.539 | 26.420 |
| 37.086 | 14.625 | −7.836 | −22.461 | 22.461 | −11.800 | 64.758 | 26.479 |
| 37.164 | 14.631 | −7.901 | −22.533 | 22.533 | −11.900 | 64.978 | 26.539 |
| 37.241 | 14.637 | −7.967 | −22.604 | 22.604 | −12.000 | 65.198 | 26.599 |
| 37.284 | 14.625 | −8.033 | −22.658 | 22.658 | −12.100 | 65.318 | 26.609 |
| 37.360 | 14.630 | −8.099 | −22.729 | 22.729 | −12.200 | 65.537 | 26.669 |
| 37.436 | 14.636 | −8.165 | −22.800 | 22.800 | −12.300 | 65.757 | 26.729 |
| 37.512 | 14.640 | −8.231 | −22.871 | 22.871 | −12.400 | 65.977 | 26.789 |
| 37.553 | 14.629 | −8.296 | −22.924 | 22.924 | −12.499 | 66.098 | 26.800 |
| 37.627 | 14.633 | −8.362 | −22.995 | 22.995 | −12.600 | 66.317 | 26.859 |
| 37.702 | 14.637 | −8.427 | −23.064 | 23.064 | −12.699 | 66.538 | 26.920 |
| 37.774 | 14.640 | −8.494 | −23.134 | 23.134 | −12.800 | 66.756 | 26.978 |
| 37.848 | 14.645 | −8.559 | −23.203 | 23.203 | −12.899 | 66.978 | 27.040 |
| 37.920 | 14.648 | −8.625 | −23.273 | 23.273 | −13.000 | 67.197 | 27.099 |
| 37.960 | 14.635 | −8.690 | −23.325 | 23.325 | −13.099 | 67.318 | 27.110 |
| 38.031 | 14.637 | −8.756 | −23.394 | 23.394 | −13.200 | 67.537 | 27.169 |
| 38.102 | 14.640 | −8.822 | −23.462 | 23.462 | −13.300 | 67.757 | 27.229 |
| 38.172 | 14.642 | −8.888 | −23.530 | 23.530 | −13.400 | 67.977 | 27.289 |
| 38.242 | 14.644 | −8.953 | −23.597 | 23.597 | −13.499 | 68.197 | 27.349 |
| 38.310 | 14.645 | −9.019 | −23.664 | 23.664 | −13.600 | 68.415 | 27.408 |
| 38.379 | 14.647 | −9.084 | −23.731 | 23.731 | −13.699 | 68.636 | 27.469 |
| 38.446 | 14.648 | −9.150 | −23.798 | 23.798 | −13.800 | 68.855 | 27.528 |
| 38.514 | 14.649 | −9.215 | −23.864 | 23.864 | −13.899 | 69.076 | 27.589 |
| 38.610 | 14.664 | −9.281 | −23.946 | 23.946 | −14.000 | 69.395 | 27.698 |
| Mean = | 14.618 | | | | | Mean = | 25.594 |
| Std. Dev. = | 0.016 | | | | | | |

As shown in FIG. 12B, the grating structure 1205 of the second embodiment is further configured to reflect second incident light 1230A, 1230B about a second reflective axis 1239. The second incident light has a second wavelength of 513 nm, and the second wavelength therefore differs from the first wavelength by 19 nm, or a wave fraction (WF) of 0.036. The second incident light is incident upon the grating medium 1210 at the specific site 1217. The specific site 1217 of the second embodiment includes an area of the grating medium surface 1212 upon which both the first and second incident light shine. The second reflective axis 1239 differs from surface normal 1222 of the grating medium by a second reflective axis angle 1236 of +14.617 degrees (internal) relative to surface normal, where the second incident light has a second internal angle of incidence 1228A, 1228B relative to surface normal, spanning a range of −9.281 degrees to −2.665 degrees. The second internal angle of incidence of the second incident light includes one hundred one (101) different internal angles spaced at angle intervals of approximately 0.066 degrees, from −9.281 degrees to −2.665 degrees. In some variations of the second embodiment skew mirror, the second internal angles of incidence for the second incident light include ten (10) different internal angles spaced at angle intervals of about 0.66 degrees, from −9.281 degrees to −2.665 degrees.

As shown in FIG. 12B, second incident light 1230A, having a second internal angle incidence 1228A of −9.281 degrees relative to surface normal, is reflected by the grating structure 1205 as second reflected light 1233A, having a second internal angle of reflectance 1229A of +38.598 degrees relative to surface normal. Second incident light 1230B, having a second internal angle of incidence 1228B relative to surface normal of −2.655 degrees, is reflected as second reflected light 1233B having a second internal angle of reflectance 1229B of +31.836 degrees. Second reflected light 1233A, 1233B has the second wavelength, i.e. in the second embodiment the second reflected light has a wavelength of 513 nm. Second incident light angles, second reflected light angles, and second reflective axis angles for the second embodiment skew mirror 1200 are shown in Table 4.

TABLE 4

ANGLES OF SECOND INCIDENT LIGHT, SECOND REFLECTED LIGHT, AND SECOND REFLECTIVE AXIS, FOR A SECOND EMBODIMENT SKEW MIRROR; WAVELENGTH = 513 nm; AK233-200 RECORDING MEDIUM; N = 101

| Second Internal Angle of Reflection (relative to surface normal, in degrees) | Second Reflective Axis Angle (internal, relative to surface normal, in degrees) | Second Internal Angle of Incidence (relative to surface normal, in degrees) | Angle Of Incidence of Second Incident Light (external, relative to reflective axis, in degrees) | Angle Of Reflection of Second Reflected Light (external, relative to reflective axis, in degrees) | Angle of Incidence of Second Incident Light (external, relative to surface normal, in degrees) | Angle of Reflection of Second Reflected Light (external, relative to surface normal, in degrees) | Second Reflective Axis Angle (external, relative to surface normal, in degrees) |
|---|---|---|---|---|---|---|---|
| 31.836 | 14.585 | −2.665 | −17.250 | 17.250 | −4.000 | 52.300 | 24.150 |
| 31.941 | 14.604 | −2.732 | −17.336 | 17.336 | −4.100 | 52.520 | 24.210 |
| 32.022 | 14.612 | −2.799 | −17.410 | 17.410 | −4.200 | 52.690 | 24.245 |
| 32.080 | 14.608 | −2.865 | −17.472 | 17.472 | −4.299 | 52.811 | 24.256 |
| 32.160 | 14.614 | −2.932 | −17.546 | 17.546 | −4.400 | 52.980 | 24.290 |
| 32.240 | 14.621 | −2.998 | −17.619 | 17.619 | −4.499 | 53.150 | 24.326 |
| 32.297 | 14.616 | −3.065 | −17.681 | 17.681 | −4.600 | 53.270 | 24.335 |
| 32.378 | 14.623 | −3.131 | −17.754 | 17.754 | −4.699 | 53.441 | 24.371 |
| 32.434 | 14.618 | −3.198 | −17.816 | 17.816 | −4.800 | 53.561 | 24.381 |
| 32.514 | 14.625 | −3.264 | −17.889 | 17.889 | −4.899 | 53.732 | 24.417 |
| 32.570 | 14.619 | −3.331 | −17.950 | 17.950 | −5.000 | 53.851 | 24.426 |
| 32.626 | 14.615 | −3.397 | −18.011 | 18.011 | −5.099 | 53.972 | 24.437 |
| 32.705 | 14.620 | −3.464 | −18.084 | 18.084 | −5.200 | 54.141 | 24.471 |
| 32.737 | 14.604 | −3.530 | −18.134 | 18.134 | −5.299 | 54.212 | 24.457 |
| 32.816 | 14.610 | −3.597 | −18.207 | 18.207 | −5.400 | 54.382 | 24.491 |
| 32.872 | 14.605 | −3.663 | −18.267 | 18.267 | −5.500 | 54.503 | 24.502 |
| 32.950 | 14.610 | −3.730 | −18.340 | 18.340 | −5.600 | 54.672 | 24.536 |
| 33.006 | 14.605 | −3.796 | −18.401 | 18.401 | −5.699 | 54.794 | 24.548 |
| 33.060 | 14.598 | −3.863 | −18.461 | 18.461 | −5.800 | 54.912 | 24.556 |
| 33.137 | 14.604 | −3.929 | −18.533 | 18.533 | −5.899 | 55.082 | 24.592 |
| 33.215 | 14.609 | −3.996 | −18.605 | 18.605 | −6.000 | 55.252 | 24.626 |
| 33.292 | 14.615 | −4.062 | −18.677 | 18.677 | −6.099 | 55.423 | 24.662 |
| 33.346 | 14.608 | −4.129 | −18.737 | 18.737 | −6.200 | 55.541 | 24.671 |
| 33.423 | 14.614 | −4.195 | −18.809 | 18.809 | −6.299 | 55.713 | 24.707 |
| 33.477 | 14.608 | −4.262 | −18.869 | 18.869 | −6.400 | 55.833 | 24.717 |
| 33.554 | 14.613 | −4.327 | −18.941 | 18.941 | −6.499 | 56.004 | 24.753 |
| 33.607 | 14.606 | −4.395 | −19.001 | 19.001 | −6.600 | 56.123 | 24.762 |
| 33.683 | 14.611 | −4.460 | −19.072 | 19.072 | −6.699 | 56.294 | 24.798 |
| 33.758 | 14.615 | −4.527 | −19.143 | 19.143 | −6.800 | 56.463 | 24.832 |
| 33.812 | 14.609 | −4.593 | −19.202 | 19.202 | −6.899 | 56.584 | 24.843 |
| 33.886 | 14.613 | −4.660 | −19.273 | 19.273 | −7.000 | 56.752 | 24.876 |
| 33.939 | 14.607 | −4.726 | −19.333 | 19.333 | −7.099 | 56.874 | 24.888 |
| 33.992 | 14.599 | −4.793 | −19.392 | 19.392 | −7.200 | 56.994 | 24.897 |
| 34.067 | 14.604 | −4.859 | −19.463 | 19.463 | −7.299 | 57.165 | 24.933 |
| 34.141 | 14.608 | −4.926 | −19.533 | 19.533 | −7.400 | 57.335 | 24.968 |
| 34.192 | 14.600 | −4.992 | −19.592 | 19.592 | −7.500 | 57.454 | 24.977 |
| 34.266 | 14.604 | −5.058 | −19.662 | 19.662 | −7.600 | 57.624 | 25.012 |
| 34.318 | 14.597 | −5.124 | −19.721 | 19.721 | −7.699 | 57.745 | 25.023 |
| 34.391 | 14.600 | −5.191 | −19.791 | 19.791 | −7.800 | 57.915 | 25.058 |
| 34.443 | 14.593 | −5.257 | −19.850 | 19.850 | −7.900 | 58.036 | 25.068 |
| 34.258 | 14.467 | −5.324 | −19.791 | 19.791 | −8.000 | 57.606 | 24.803 |
| 34.418 | 14.514 | −5.390 | −19.904 | 19.904 | −8.100 | 57.977 | 24.939 |
| 34.576 | 14.560 | −5.456 | −20.016 | 20.016 | −8.200 | 58.348 | 25.074 |
| 34.733 | 14.606 | −5.522 | −20.127 | 20.127 | −8.299 | 58.719 | 25.210 |
| 34.846 | 14.629 | −5.589 | −20.217 | 20.217 | −8.401 | 58.988 | 25.294 |
| 34.897 | 14.621 | −5.654 | −20.276 | 20.276 | −8.500 | 59.109 | 25.305 |
| 34.967 | 14.623 | −5.721 | −20.344 | 20.344 | −8.600 | 59.279 | 25.340 |
| 35.018 | 14.615 | −5.787 | −20.402 | 20.402 | −8.699 | 59.400 | 25.351 |
| 35.108 | 14.627 | −5.854 | −20.481 | 20.481 | −8.800 | 59.618 | 25.409 |
| 35.137 | 14.609 | −5.919 | −20.528 | 20.528 | −8.899 | 59.690 | 25.396 |
| 35.207 | 14.610 | −5.986 | −20.596 | 20.596 | −9.000 | 59.859 | 25.430 |
| 35.277 | 14.612 | −6.052 | −20.664 | 20.664 | −9.099 | 60.030 | 25.466 |
| 35.345 | 14.613 | −6.119 | −20.732 | 20.732 | −9.200 | 60.198 | 25.499 |
| 35.414 | 14.615 | −6.184 | −20.799 | 20.799 | −9.299 | 60.368 | 25.535 |
| 35.482 | 14.615 | −6.251 | −20.866 | 20.866 | −9.400 | 60.536 | 25.568 |
| 35.551 | 14.617 | −6.316 | −20.934 | 20.934 | −9.499 | 60.708 | 25.605 |
| 35.618 | 14.617 | −6.383 | −21.001 | 21.001 | −9.600 | 60.876 | 25.638 |
| 35.666 | 14.608 | −6.449 | −21.058 | 21.058 | −9.699 | 60.996 | 25.649 |
| 35.753 | 14.619 | −6.516 | −21.134 | 21.134 | −9.800 | 61.216 | 25.708 |
| 35.820 | 14.619 | −6.582 | −21.201 | 21.201 | −9.900 | 61.385 | 25.743 |
| 35.887 | 14.619 | −6.648 | −21.267 | 21.267 | −10.000 | 61.555 | 25.778 |
| 35.954 | 14.620 | −6.713 | −21.334 | 21.334 | −10.100 | 61.727 | 25.814 |
| 36.020 | 14.620 | −6.780 | −21.400 | 21.400 | −10.200 | 61.897 | 25.849 |

TABLE 4-continued

ANGLES OF SECOND INCIDENT LIGHT, SECOND REFLECTED LIGHT,
AND SECOND REFLECTIVE AXIS, FOR A SECOND EMBODIMENT SKEW
MIRROR; WAVELENGTH = 513 nm; AK233-200 RECORDING MEDIUM;
N = 101

| Second Internal Angle of Reflection (relative to surface normal, in degrees) | Second Reflective Axis Angle (internal, relative to surface normal, in degrees) | Second Internal Angle of Incidence (relative to surface normal, in degrees) | Angle Of Incidence of Second Incident Light (external, relative to reflective axis, in degrees) | Angle Of Reflection of Second Reflected Light (external, relative to reflective axis, in degrees) | Angle of Incidence of Second Incident Light (external, relative to surface normal, in degrees) | Angle of Reflection of Second Reflected Light (external, relative to surface normal, in degrees) | Second Reflective Axis Angle (external, relative to surface normal, in degrees) |
|---|---|---|---|---|---|---|---|
| 36.067 | 14.611 | −6.845 | −21.456 | 21.456 | −10.299 | 62.017 | 25.859 |
| 36.170 | 14.629 | −6.912 | −21.541 | 21.541 | −10.400 | 62.286 | 25.943 |
| 36.217 | 14.620 | −6.977 | −21.597 | 21.597 | −10.499 | 62.407 | 25.954 |
| 36.282 | 14.619 | −7.044 | −21.663 | 21.663 | −10.600 | 62.577 | 25.989 |
| 36.365 | 14.628 | −7.110 | −21.737 | 21.737 | −10.699 | 62.798 | 26.050 |
| 36.429 | 14.627 | −7.176 | −21.803 | 21.803 | −10.800 | 62.967 | 26.084 |
| 36.475 | 14.617 | −7.242 | −21.858 | 21.858 | −10.899 | 63.089 | 26.095 |
| 36.557 | 14.625 | −7.308 | −21.933 | 21.933 | −11.000 | 63.309 | 26.155 |
| 36.621 | 14.624 | −7.373 | −21.997 | 21.997 | −11.099 | 63.480 | 26.191 |
| 36.665 | 14.612 | −7.440 | −22.053 | 22.053 | −11.200 | 63.599 | 26.200 |
| 36.746 | 14.620 | −7.505 | −22.126 | 22.126 | −11.299 | 63.819 | 26.260 |
| 36.826 | 14.627 | −7.572 | −22.199 | 22.199 | −11.400 | 64.037 | 26.319 |
| 36.888 | 14.626 | −7.637 | −22.263 | 22.263 | −11.499 | 64.209 | 26.355 |
| 36.950 | 14.623 | −7.704 | −22.327 | 22.327 | −11.600 | 64.379 | 26.390 |
| 37.029 | 14.630 | −7.769 | −22.399 | 22.399 | −11.699 | 64.600 | 26.451 |
| 37.107 | 14.636 | −7.836 | −22.472 | 22.472 | −11.800 | 64.819 | 26.510 |
| 37.185 | 14.642 | −7.901 | −22.543 | 22.543 | −11.900 | 65.039 | 26.570 |
| 37.228 | 14.630 | −7.967 | −22.598 | 22.598 | −12.000 | 65.159 | 26.580 |
| 37.305 | 14.636 | −8.033 | −22.669 | 22.669 | −12.100 | 65.380 | 26.640 |
| 37.364 | 14.633 | −8.099 | −22.731 | 22.731 | −12.200 | 65.549 | 26.675 |
| 37.440 | 14.638 | −8.165 | −22.803 | 22.803 | −12.300 | 65.770 | 26.735 |
| 37.499 | 14.634 | −8.231 | −22.865 | 22.865 | −12.400 | 65.940 | 26.770 |
| 37.557 | 14.631 | −8.296 | −22.926 | 22.926 | −12.499 | 66.111 | 26.806 |
| 37.632 | 14.635 | −8.362 | −22.997 | 22.997 | −12.600 | 66.330 | 26.865 |
| 37.706 | 14.639 | −8.427 | −23.067 | 23.067 | −12.699 | 66.551 | 26.926 |
| 37.779 | 14.643 | −8.494 | −23.136 | 23.136 | −12.800 | 66.770 | 26.985 |
| 37.852 | 14.647 | −8.559 | −23.206 | 23.206 | −12.899 | 66.991 | 27.046 |
| 37.908 | 14.641 | −8.625 | −23.266 | 23.266 | −13.000 | 67.159 | 27.080 |
| 37.980 | 14.645 | −8.690 | −23.335 | 23.335 | −13.099 | 67.380 | 27.141 |
| 38.051 | 14.647 | −8.756 | −23.404 | 23.404 | −13.200 | 67.599 | 27.200 |
| 38.121 | 14.650 | −8.822 | −23.472 | 23.472 | −13.300 | 67.819 | 27.260 |
| 38.176 | 14.644 | −8.888 | −23.532 | 23.532 | −13.400 | 67.989 | 27.295 |
| 38.245 | 14.646 | −8.953 | −23.599 | 23.599 | −13.499 | 68.208 | 27.355 |
| 38.314 | 14.647 | −9.019 | −23.666 | 23.666 | −13.600 | 68.427 | 27.414 |
| 38.398 | 14.657 | −9.084 | −23.741 | 23.741 | −13.699 | 68.697 | 27.499 |
| 38.465 | 14.657 | −9.150 | −23.808 | 23.808 | −13.800 | 68.916 | 27.558 |
| 38.517 | 14.651 | −9.215 | −23.866 | 23.866 | −13.899 | 69.087 | 27.594 |
| 38.598 | 14.658 | −9.281 | −23.940 | 23.940 | −14.000 | 69.355 | 27.678 |
| | Mean = 14.617 | | | | | Mean = | 25.593 |
| | Std. Dev. = 0.025 | | | | | | |

For clarity, light in FIGS. 12A and 12B is illustrated as being reflected at a point residing proximate a center of the grating structure 1205. However, persons skilled in the art recognize that light is typically reflected throughout the grating structure rather than at a specific point.

In the second embodiment, the second reflective axis angle differs from the first reflective axis angle by approximately 0.0005 degree across WF=0.036. This very low level of change can approach the level of precision of instrumentation used to measure reflection angles. Accordingly, for the purposes of the present invention, the second reflective axis can be said to not differ from the first reflective axis. For some applications, the difference between reflective axis angles should be 0.025 degree or less. For some other applications, the difference between reflective axis angles should be 0.010 degree or less across WF≥0.036. The second embodiment skew mirror meets these requirements. A Student's t-test (two-tailed) indicates no difference between the first reflective axis angle and the second reflective axis angle (N=101 per group; P=0.873). Moreover, a difference of 0.001 degree or less challenges the precision of instrumentation used to measure skew mirror reflection angles. Accordingly, for purposes of the present invention, where a second reflective axis differs from a first reflective axis by 0.001 degree or less, the second reflective axis can be said to not differ from the first reflective axis.

For the second embodiment skew mirror, angles of incidence of the first incident light vary from −17.250 degrees to −23.946 degrees relative to the first reflective axis. Angles of incidence of the second incident light relative to the second reflective axis vary from −17.250 degrees to −23.940 degrees. Thus it can be said that each of the first incident light and second incident light is offset from the first reflective axis by at least 17.20 degrees. For the second embodiment skew mirror, angles if incidence and angles of reflection relative to reflective axis, for incident light and its reflection, respectively, are tabulated in Tables 3 and 4.

Second embodiment external angles relative to surface normal for incident light and its reflection are also illustrated in FIGS. 12A and 12B. As seen in FIG. 12A, external angles relative to surface normal for first incident light 1224A, 1224B ranges from first incident light external angle 1213A of −14.000 degrees to first incident light external angle 1213B of −4.000 degrees. As seen in FIG. 12A, external angles relative to surface normal for second incident light 1230A, 1230B ranges from second incident light external angle 1215A of −14.000 to second incident light external angle 1215B of −4.000 degrees. First reflected light external angles 1214A, 1214B and second reflected light external angles 1216A, 1216B are also illustrated in FIGS. 12A and 12B, respectively.

Persons skilled in the art will recognize that incident light and its reflection can typically be reversed, such that what was previously an angle of reflection becomes and angle of incidence, and vice versa. However, for purposes of the present disclosure, recitation or description of a range of incidence angles refers to incident light oriented to one side or the other of a reflective axis, but not both, or in the case of retroreflected incident light, an incidence angle of zero (0) relative to the reflective axis. Accordingly, a range of incidence angles does not include angles that are both positive and negative with respect to the reflective axes. As illustrated and described here, incidence angles relative to their respective reflective axes are negative (i.e. in a clockwise direction). However, this convention is used for convenience and simplicity and is not meant to teach, suggest, or imply that a skew mirror can only reflect incident light residing to one side of a reflective axis.

A Third Embodiment Skew Mirror

A third embodiment skew mirror comprises a grating structure residing in a grating medium, wherein the grating structure comprises twenty one (21) volume holograms that overlap each other in the grating medium.

The third embodiment grating medium is a commercial photosensitive polymeric optical recording medium, designated BAYFOL® HX TP photopolymer film, available from Covestro AG (formerly Bayer MaterialScience AG) (Leverkusen, Germany) The BAYFOL® HX TP recording medium of the third embodiment is approximately 70 μm thick, and typically shrinks about 1.0% as a result of recording volume holograms. Accordingly, shrinkage compensation is typically employed when recording volume holograms in the third embodiment grating medium. Shrinkage compensation is described below in the method of making the third embodiment skew mirror.

Variations of the third embodiment skew mirror may include an additional layer such as a glass cover or glass substrate. The additional layer is typically refractive index matched to the grating medium, and a thin film of index matching fluid may reside between the third embodiment grating medium and the additional layer.

The grating structure of the third embodiment has the physical property of being configured to reflect a first incident light about a first reflective axis. The first incident light has a first wavelength of 532 nm and is incident upon the grating medium at a specific site. The first reflective axis differs from surface normal of the grating medium by a first reflective axis angle of +9.419 degrees (internal) relative to surface normal, where the first incident light has an internal angle, relative to surface normal, residing between −6.251 degrees and +0.334 degrees, inclusive (a range of 6.585 degrees). The internal angle of the first incident light includes multiple angles spanning a range of approximately 6.59 degrees, the multiple angles including one hundred (100) different internal angles spaced at angle intervals of approximately 0.067 degrees, from −6.251 degrees to +0.334 degrees.

Third embodiment first incident light having an internal angle of −6.251 degrees relative to surface normal, is reflected by the grating structure as first reflected light having an internal angle of +25.027 degrees relative to surface normal. First incident light having an internal angle relative to surface normal of +0.334 degrees is reflected as first reflected light having an internal angle of +18.487 degrees. First reflected light has the first wavelength, i.e. in the third embodiment the first reflected light has a wavelength of 532 nm.

The grating structure of the third embodiment is further configured to reflect second incident light about a second reflective axis. The second incident light has a second wavelength of 513 nm, and the second wavelength therefor differs from the first wavelength by 19 nm, or a wave fraction (WF) of 0.036. The second incident light is incident upon the grating medium at the specific site. The second reflective axis differs from surface normal of the grating medium by a second reflective axis angle of +9.400 degrees (internal) relative to surface normal, where the second incident light has in internal angle, relative to surface normal, spanning a range from −6.251 degrees to +0.334 degrees. The internal angle of the second incident light includes one hundred (100) different internal angles spaced at angle intervals of approximately 0.067 degrees, from −6.251 degrees to +0.334 degrees.

Third embodiment second incident light, having an internal angle of −6 . . . 251 degrees relative to surface normal, is reflected by the grating structure as second reflected light, having an internal angle of +24.967 degrees relative to surface normal. Second incident light having an internal angle relative to surface normal of +0.334 degrees is reflected as second reflected light having an internal angle of +18.425 degrees. Second reflected light has the second wavelength, i.e. in the third embodiment the second reflected light has a wavelength of 513 nm. The second reflective axis of the third embodiment is substantially coincident with the first reflective axis.

Tables 5 summarizes reflective properties of first, second, and third embodiment skew mirrors.

TABLE 5

DIFFERENCE BETWEEN REFLECTIVE AXIS
ANGLES AT λ = 532 nm AND λ = 513 nm

| | FIRST EMBODIMENT SKEW MIRROR (AK174-200 recording medium) N = 100 measurements | SECOND EMBODIMENT SKEW MIRROR (AK233-200 recording medium) N = 101 measurements | THIRD EMBODIMENT SKEW MIRROR (BAYFOL ® HX recording medium) N = 100 measurements |
|---|---|---|---|
| Mean reflective axis INTERNAL angle at λ = 532 nm* | 13.693° | 14.617° | 9.400° |
| Mean reflective axis INTERNAL angle at λ = 513 nm* | 13.759° | 14.618° | 9.419° |
| Difference between reflective axis INTERNAL angle at λ = 532 nm and at λ = 513 nm** | 0.066° | 0.0005° | 0.018° |
| Incident Light INTERNAL Angles*** | −4.660° to +1.933° (range = 6.593°) | −9.281° to −2.665° (range = 6.616°) | −6.251° to +0.334° (range = 6.585°) |
| Mean reflective axis EXTERNAL angle at λ = 532 nm* | 22.234° | 25.594° | 14.720° |
| Mean reflective axis EXTERNAL angle at λ = 513 nm* | 22.110° | 25.593° | 14.690° |
| Difference between reflective axis EXTERNAL angle at λ = 532 nm and at λ = 513 nm** | 0.124° | 0.0005° | 0.030° |
| Incident Light EXTERNAL Angles*** | −7.000° to 2.900° | −14.000° to −4.000° | −9.400° to +0.501° |

*mean angles are relative to surface normal, and are the means of N measurements at N incident light angles of incidence; both incident and reflected light have the specified wavelength (λ).
**differences between mean reflective axis angles at λ = 532 nm and at λ = 513 nm are absolute values and thus excludes negative numbers.
***incident light angles of incidence, relative to surface normal.

The range of angles of incidence across which a reflective axis remains constant can by expressed in terms of $\Delta\theta_B$. As shown in Table 6 below, the reflective axis angle for the first embodiment skew mirror varies by less than 0.015 degree for incident light having a range of angles of incidence of $\geq 20 \times \Delta\theta_B$, at multiple wavelengths that differ from each other by WF≥0.036. For the second embodiment skew mirror the reflective axis angle varies by less than 0.020 degree for incident light having a range of angles of incidence $\geq 20 \times \Delta\theta_B$, at multiple wavelengths that differ from each other by WF≥0.036.

Methods of Making a Skew Mirror

Figure 13:
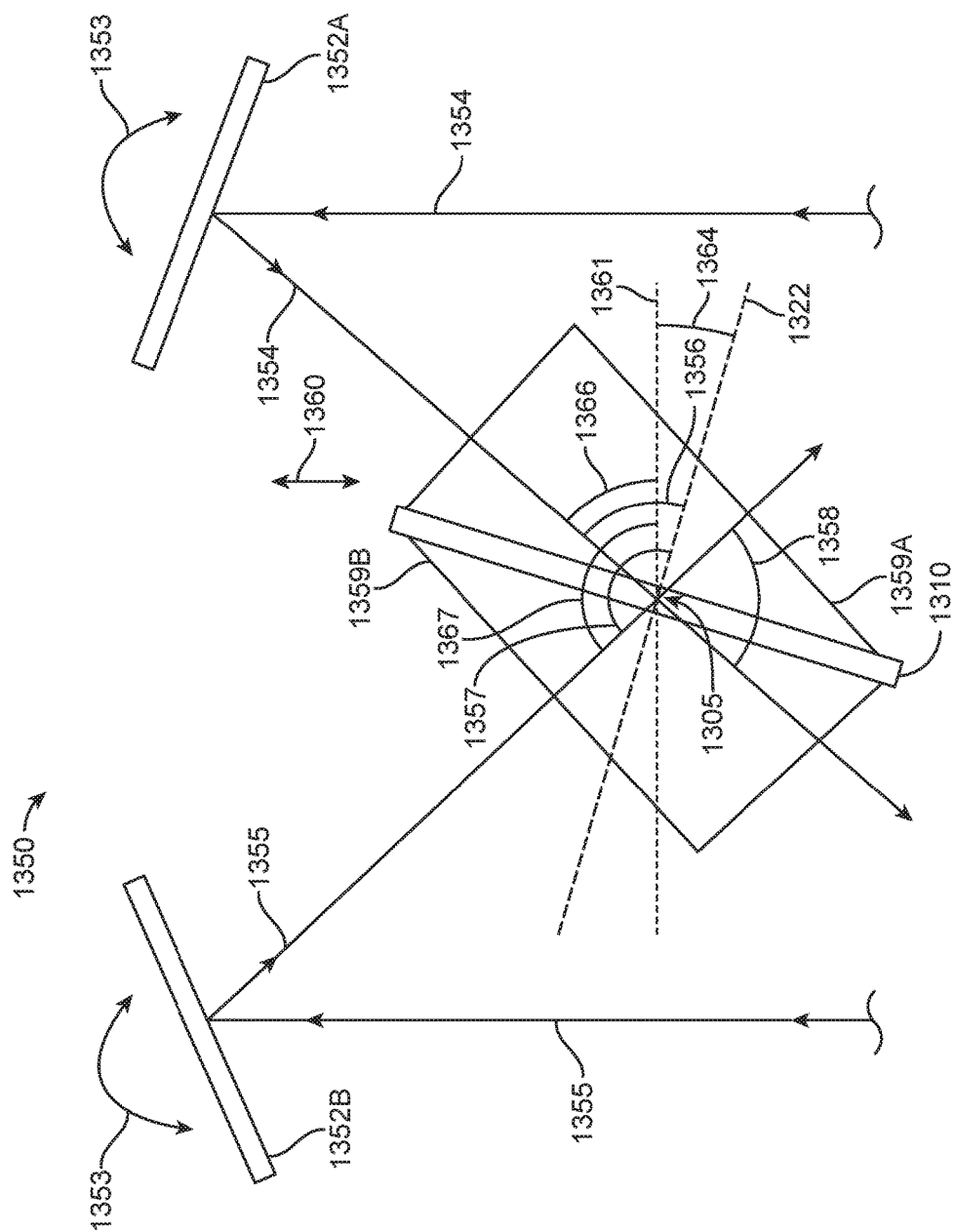
FIG. 13 is a cross-section view of a system for making a skew mirror, according to an embodiment.

An exemplary system 1350 for making a skew mirror is illustrated in FIG. 13. The exemplary system 1350 includes a grating medium 1310 disposed between a first mirror 1352A and a second mirror 1352B. The first and second mirrors are arranged to direct a first recording beam 1354 and a second recording beam 1355 such that the recording beams intersect and interfere with each other to form an interference pattern that is recorded as a hologram 1305 in the grating medium 1310. The hologram 1305 is an example of a grating structure.

TABLE 6

CHANGE IN REFLECTIVE AXIS ANGLES ACROSS
AN INCIDENCE ANGLE RANGE OF APPROXIMATELY 20 × $\Delta\theta_B$

| Skew Mirror Embodiment | λ* | Difference In reflective Axis Angles** | Incident Light Angle Range*** | $\Delta\theta_B$† |
|---|---|---|---|---|
| FIRST EMBODIMENT SKEW MIRROR (AK174-200 recording medium) | 532 nm | 0.012° | −3.198° to +0.400° (3.598° = 20.3 × $\Delta\theta_B$) | 0.177° |
| | 513 nm | 0.012° | −3.198° to +0.400° (3.598° = 21.0 × $\Delta\theta_B$) | 0.171° |
| SECOND EMBODIMENT SKEW MIRROR (AK233-200 recording medium) | 532 nm | 0.019° | −7.242° to −4.726° (2.516° = 20.0 × $\Delta\theta_B$) | 0.126° |
| | 513 nm | 0.016° | −7.242° to −4.726° (2.516° = 20.6 × $\Delta\theta_B$) | 0.122° |

*wavelength of both incident and reflected light.
**difference in reflective axis angles (internal, relative to surface normal) for incident light having a change in angle of incidence of approximately 20 × $\Delta\theta_B$.
***range of incident light angles of incidence (internal, relative to surface normal) approximately equal to 20 × $\Delta\theta_B$, for which the Difference In Reflective Axis Angles is reported in this table.
†$\Delta\theta_B$ is calculated for an incident light angle of incidence at the midpoint of the Incident Light Angle Range reported in this table.

The recording beams may be referred to as a reference beam and a signal beam according to a convention sometimes used by persons skilled in the holographic arts. However, each of the first and second recording beams are typically monochromatic collimated plane wave beams that are identical to each other (except for angles at which they are incident upon the grating medium). Moreover, the so-called signal beam typically includes no data encoded therein that is not also present in the so-called reference beam. Thus designation of one recording beam as a signal beam and the other recording beam as a reference beam can be arbitrary, with the designation of "signal" and "reference" serving to distinguish between the two recording beams, rather than to indicate that the one recording beam includes encoded data not present in the other recording beam.

In some embodiments the recording beams may have widths that differ from each other, or they may be the same. The recording beams may each have the same intensity as each other, or intensity can differ among the beams. The grating medium 1310 is typically secured in place between a first prism 1359A and second prism 1359B using a fluid index matched to both the prisms and the grating medium. A skew axis 1361 resides at a skew angle 1364 relative to surface normal 1322. The first and second recording beams 1354, 1355 reside at a first recording beam internal angle 1356 and a second recording beam internal angle 1357, respectively, relative surface normal 1322. Beam difference angle (α) 1358 is an angle of the first and second recording beams 1354, 1355, relative to each other. In embodiments, a resides in a range from 0 to 180 degrees. The skew angle 1364 for each hologram can be calculated according to equation (9), $$\theta_{skew} = (\theta_{R1} + \theta_{R2} - 180°)/2 \quad (9)$$

where: $\theta_{skew}$ is the skew angle, i.e., the internal angle of the skew axis relative to surface normal;

$\theta_{R1}$ is the first recording beam internal angle relative to surface normal; and $\theta_{R2}$ is the second recording beam internal angle relative to surface normal.

As can be seen in FIG. 13, the first and second recording beams 1354, 1355 are symmetrical about the skew axis 1361 such that the first recording beam internal angle relative to the skew axis 1366 plus the second recording beam internal angle relative to the skew axis 1367 is equal to 180 degrees. The internal angles of the first and second recording beams relative to the skew axis 1366, 1367 are readily calculated from the first and second recording beam internal angles 1356, 1357, respectively, and the skew angle 1364.

Each of the first and second recording beams are typically collimated plane wave beams originating from a laser light source. The plane wave beams may be illustrated using multiple light ray depictions for each recording beam. For clarity however, in FIG. 13 the first and second recording beams are illustrated using a single light ray depiction for each recording beam.

Refraction at air/prism boundaries, for example where the first recording beam 1354 intersects an air/prism boundary of the first prism 1359A and where the second recording beam 1355 intersects an air/prism boundary of the second prism 1359, is shown figuratively rather than strictly quantitatively in FIG. 13. Because the prisms are typically index matched to the grating medium 1310, refraction at the prism/grating medium boundary can usually be ignored. In embodiments, the grating medium and prisms each have an index of refraction of approximately 1.50.

A skew angle for a hologram (including a mean skew angle for a collection of holograms) can be substantially identical to a reflective axis angle, meaning the skew angle or mean skew angle is within 1.0 degree of the reflective axis angle. Persons skilled in the art will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. A skew axis/reflective axis is generally called a skew axis when referring to making a skew mirror (for example when describing recording a hologram in a skew mirror grating medium), and as a reflective axis when referring to light reflective properties of a skew mirror.

Angles at which the first and second recording beams 1354, 1355 are incident upon the grating medium are adjusted by rotating the first and second beam mirrors, 1352A, 1352B, respectively. Rotation of the beam mirrors, indicated by rotation arrows 1353, not only adjusts incidence angles, but would also change where in the grating medium 1310 the recording beams interfere with each other. Accordingly, when beam mirrors are rotated in order to adjust incidence angles, the grating medium 1310 and prisms 1359A, 1359B are moved translationally in order to record new holograms at approximately the same location in the grating medium as previously recorded holograms. Translation of the grating medium 1310 is indicated by translation arrow 1360.

In a variation of the exemplary system 1350, a variable wavelength laser is used to vary the wavelength of the first and second recording beams. Incidence angles of the first and second recording beams may be, but are not necessarily, held constant while the wavelength of the first and second recording beams is changed.

A First Method of Making a Skew Mirror

Figure 14:
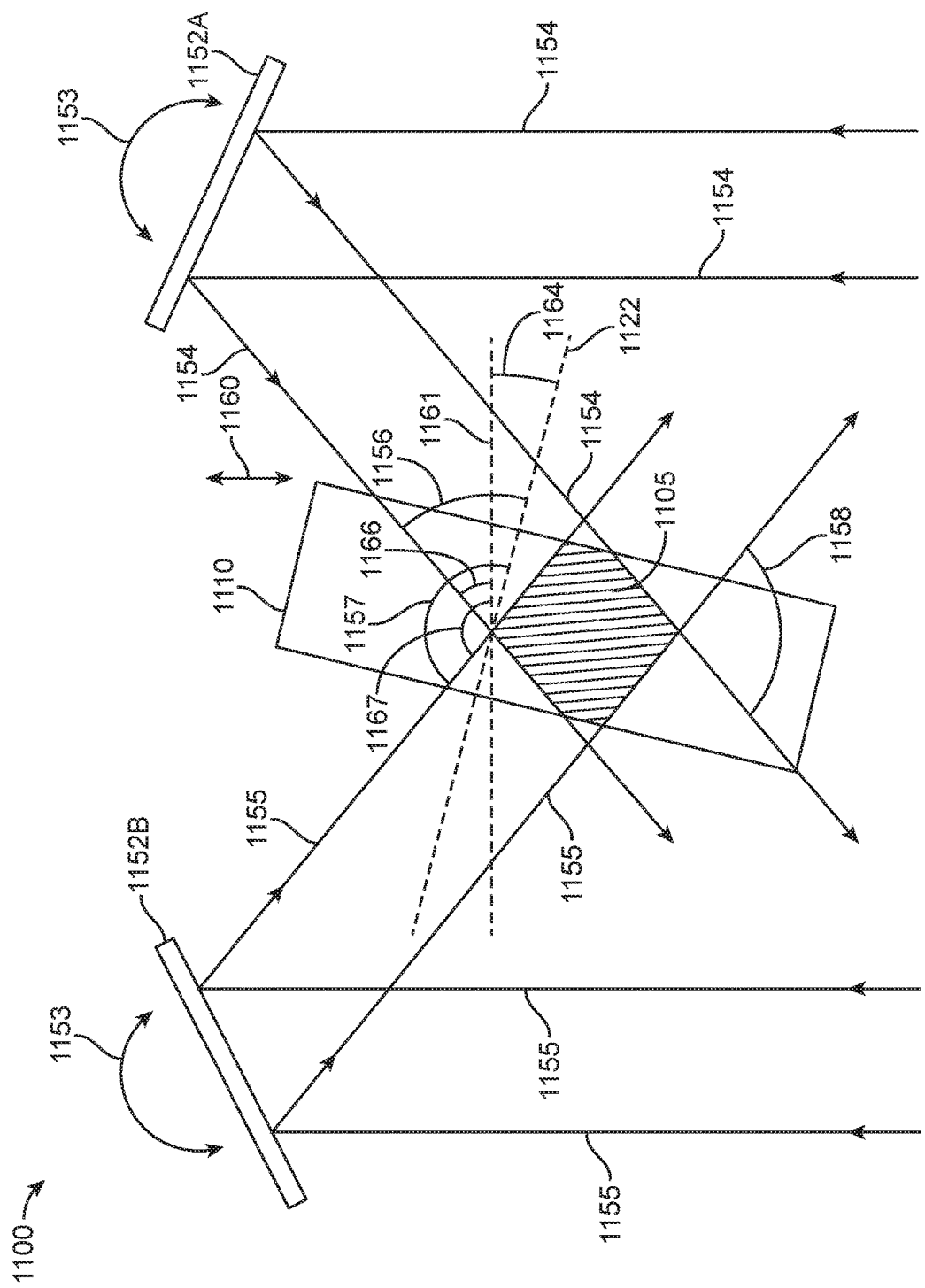
FIG. 14 is a cross-section view illustrating a method of making a skew mirror, according to an embodiment.

A first method of making a skew mirror is illustrated in FIG. 14. The skew mirror of the first method is the first embodiment skew mirror 1100, which is also illustrated in FIGS. 11A and 11B, and whose reflective properties are described above. The first method typically utilizes a system for making a skew mirror such as the exemplary system 1350 illustrated in FIG. 13 and described above. For clarity however, in FIG. 14 first and second prisms are omitted, and recording beams are illustrated without showing refraction at air/grating medium boundaries or air/prism boundaries. However, persons skilled in the art will recognize that refraction typically occurs at an air/prism boundary (or air/grating medium boundary, where index matched prisms are not used), and should be accounted for when designing a system or method to achieve the internal angles described.

A first recording beam 1154 and a second recording beam 1155 are directed at the first embodiment grating medium 1110, where the recording beams interfere with each other to create an interference pattern, which is recorded as a volume hologram in the grating medium 1110. The recording beams are typically created by splitting a 405 nm light beam from an external cavity, tunable diode laser into two separate beams. The light beam is split using a polarizing beam splitter, and a half wave plate is used to alter polarity of one of the two separate beams from p-polarized to s-polarized, such that both of the two separate beams are s-polarized. One of the s-polarized beams becomes the first recording beam 1154 and the other of the s-polarized beams becomes the second recording beam 1155. Each of the first and second recording beams is a collimated, plane wave beam having a wavelength of 405 nm.

The first embodiment skew mirror benefits from having reflective properties that allow it to reflect light at a substantially different wavelength, and in particular a considerably longer wavelength, than the recording beam wavelength. The AK174-200 grating medium, in which first embodiment holograms are recorded with 405 nm wavelength recording beams, absorbs 405 nm light at approximately 0.07 absorbance units for the 200 μm thick medium. Conversely, the AK174-200 grating medium has negligible absorbance for visible wavelengths of light greater than 425 nm (conservatively estimated at less than 0.002 absorbance units per 200 μm; the negligible absorbance is typically indistinguishable from zero). Thus the AK174-200 grating medium absorbs recording beam light (at 405 nm) at least 35 times more strongly than green light (for example, in a range of 503 nm to 537 nm) the first embodiment skew mirror is configured to reflect.

The grating structure 1105 of the first embodiment skew mirror 1100 is created by recording 48 volume holograms in the grating medium 1110. Each of the 48 holograms is recorded at its own unique first recording beam internal angle 1156 and its own unique second recording beam internal angle 1157. The first recording beam internal angle 1156 is an internal angle of the first recording beam 1154 relative to surface normal 1122 of the grating medium 1110 and the second recording beam internal angle 1157 is an internal angle of the second recording beam 1155 relative to surface normal 1122. Beam difference angle (α) 1158 is an angle of the first and second recording beams 1154, 1155, relative to each other.

Each of the first and second recording beams for the first embodiment skew mirror has irradiance of approximately 3 mW/cm². Typically, the first of the 48 holograms is recorded with an energy dose of 35 mJ/cm², and the dose is increased by about 1.5% for each subsequent hologram. The total energy dose for recording all 48 holograms is typically about 2.5 J/cm². Irradiance and energy doses described here are merely exemplary. Other embodiments of skew mirrors and methods of making skew mirrors may use different levels of irradiance and energy dose.

A first hologram is recorded using a first recording beam internal angle 1156 of +53.218 degrees and a second recording beam internal angle 1157 of +154.234 degrees, resulting in a beam difference angle (α) 1158 of 101.016 degrees. The skew axis 1161 for each of the 48 holograms has a skew angle 1164 of +13.726 degrees relative to surface normal 1122, and the mean skew angle for the 48 holograms is therefore also +13.726 degrees. The skew angle for each hologram is calculated according to equation (9) above. For each subsequent hologram of the grating structure, the first and second recording beam internal angles 1156, 1157 are typically changed by amounts that are approximately equal in magnitude to each other but having opposite signs, which maintains symmetry of the first and second recording beams about the skew axis.

For example, for a second hologram, the first recording beam internal angle is changed by +0.091 degree and the second recording beam internal angle is adjusted by −0.091 degree, such that the first recording beam internal angle 1156 becomes +53.309 degrees and the second recording beam internal angle +154.143 degrees; α=100.834 degrees. The magnitudes of changes in recording beam internal angles from one hologram to the next hologram vary slightly across the 48 volume holograms (i.e., the change in recording beam internal angles from one hologram to the next varies), from 0.091 degree for changes in recording beam internal angles from the first hologram to the second hologram, to 0.084 degree for changes in recording beam internal angles from the 47th hologram to the 48th hologram. However, for each change of first and second recording beam internal angles, the magnitude of change is the same and the sign is opposite for each of the first and second beam angles. The first and second recording beam internal angles 1156, 1157 for the last (48th) hologram of the first embodiment grating structure 1105 are +57.332 and +150.120 degrees, respectively, and α=92.788 degrees. In some embodiments, the magnitude of change of the first recording beam internal angle may differ very slightly from the magnitude of change of the second recording beam internal angle, which may compensate for system imprecision, for Snell effects, for dispersion, or for shrinkage of the grating medium that results from recording the holograms.

Position of the grating medium 1110 is adjusted (as indicated by translation arrow 1160) between recording one hologram and the next hologram such that at least part of each of the 48 holograms is recorded in a common space in the grating medium shared with at least part of all others of the 48 holograms. Accordingly, each of the 48 holograms at least partially spatially overlaps all others of the 48 holograms in the grating medium.

The first recording beam internal angle 1156 ranges from +53.218 to +57.332 degrees (a range of 4.114 degrees) and the second recording beam internal angle 1157 ranges from +154.234 to +150.120 degrees (a range of 4.114 degrees). As can be seen in FIG. 14, for each hologram of the first method, the first and second recording beams 1154, 1155 are symmetrical about the skew axis 1161 such that the internal angle of the first recording beam relative to the skew axis 1166 (+38.492 degrees for the first hologram) plus the internal angle of the second recording beam relative to the skew axis 1167 (+141.508 degrees for the first hologram) is equal to 180 degrees (38.492°+141.508°=180°). The internal angles of the first and second recording beams relative to the skew axis 1166, 1167 are readily calculated from the first and second recording beam internal angles 1156, 1157, respectively, and the skew angle 1164. First and second recording beam internal angles (which are defined as internal angles relative to surface normal of the grating medium) and internal angles relative to the skew axis of the first and second recording beams are listed in Table 7. After recording the 48 volume holograms, the AK174-200 recording medium is light cured by a process familiar to persons skilled in the art. [need more here]

Beam difference angle α can be used to calculate $K_G$ according to equations (10) and (11).

$$K_G \equiv |\vec{K}_G| = \sqrt{2k^2(1-\cos\alpha)} \tag{10}$$

$$k \equiv |\vec{k}_1| = |\vec{k}_2| = \frac{2\pi n}{\lambda} \tag{11}$$

where: $\vec{k}_G$ is a grating vector in k-space for a hologram, comprising both $\vec{k}_{G+}$ and $\vec{k}_{G-}$;

$\vec{k}_1$ and $\vec{k}_2$ are wave vectors in k-space for first and second recording beams, respectively, used for recording the hologram;

α is the beam difference angle as described above;

λ is the vacuum wavelength of light of the first and second recording beams; and n is the mean refractive index of the hologram (referred to as the "bulk index," for which the refractive index of the grating medium in which the hologram is recorded is used as an approximation).

A more detailed explanation of $\vec{k}_G$ and $\vec{k}$ is found above in a section of this specification titled k-Space Formalism for Holography.

For the AK174-200 grating medium used for the first embodiment skew mirror, n is estimated at 1.50 for light at 405 nm. The wavelength of the first and second recording beams used to record holograms for making the first embodiment skew mirror is 405 nm=405×10$^{-9}$ m. Accordingly, k=2.327×10$^7$ radians per meter (rad/m) for the first and second recording beams in AK174-200 grating medium. $K_G$ for the holograms of the first embodiment skew mirror ranges from 3.592×10$^7$ rad/m for the first hologram to 3.370×10$^7$ rad/m for the 48$^{th}$ hologram.

The absolute value of the difference in grating vectors $|\Delta K_G|$ between any two holograms can be a useful metric for describing hologram "spacing" (i.e. how close to each other in k-space are grating vectors for the any two holograms). $|\Delta K_G|$ for each first embodiment hologram and its adjacent hologram(s) is relatively constant, with a mean value for all 48 holograms of 4.715×10$^4$ rad/m and a coefficient of variation of 0.11%. The adjacent hologram(s) for each hologram consist of a hologram or holograms having the next highest or the next lowest $K_G$ compared to $K_G$ for the each hologram. $|\Delta K_G|$ for each first embodiment hologram and its adjacent hologram(s) reside in a range between 4.70×10$^4$ and less than 4.73×10$^4$ rad/m. $|\Delta K_G|$ between the first and 48$^{th}$ holograms is 2.22×10$^6$ rad/m.

In skew mirror embodiments, $|\Delta K_G|$ between a hologram and an adjacent hologram (which can be referred to as adjacent $|\Delta K_G|$) has a mean value for multiple holograms that typically, but not necessarily, resides in a range between 5.0×10$^3$ and 1.0×10$^7$ rad/m, more typically in a range between 1.0×10$^4$ and 5×10$^6$ rad/m, and more typically still in a range between 1.0×10$^4$ and 1.0×10$^6$. In some embodiments, mean adjacent $|\Delta K_G|$ for multiple holograms resides in a range between 8.0×10$^4$ and 5.0×10$^6$ rad/m, and may reside in a range between 1.0×10$^5$ and 1.0×10$^6$ rad/m.

In some embodiments, mean adjacent $|\Delta K_G|$ for multiple holograms strongly influences skew mirror performance Relatively small mean adjacent $|\Delta K_G|$ for a set of holograms can correspond to relatively high skew mirror image fidelity. However, where adjacent $|\Delta K_G|$ for a set of holograms is relatively small, the total number of holograms in the set is larger in order to span a given $|\Delta K_G|$ range for the hologram set. Moreover, given that recording capacity for grating mediums is typically limited by dynamic range (usually expressed as M/#), recording more holograms in a set usually means that each hologram in the set is weaker (i.e., is recorded more faintly in the medium). Accordingly, tension exists between having relatively small adjacent $|\Delta K_G|$ for a hologram set (which requires more holograms, other things being equal), and having a larger adjacent $|\Delta K_G|$ for the set, which enables recording fewer, but stronger holograms. Fewer, stronger holograms typically results in stronger reflectance by a skew mirror. Furthermore, the use of relatively broadband illumination sources (e.g., LEDs instead of lasers) may reduce image fidelity loss in a skew mirror with a larger mean adjacent $|\Delta K_G|$. In some embodiments, a sweet spot exists where mean adjacent $|\Delta K_G|$ for multiple holograms resides in the range between 5.0×10$^3$ rad/m and 1.0×10$^7$ rad/m. Embodiments of skew mirrors where mean adjacent $|\Delta K_G|$ resides in the sweet spot typically exhibit a desirable balance of image fidelity and reflectance.

Values for a, $K_G$, and $|\Delta K_G|$ for each of the 48 holograms of the first embodiment skew mirror can be found in Table 7.

TABLE 7

RECORDING BEAM ANGLES FOR A FIRST METHOD OF MAKING A SKEW MIRROR; SKEW ANGLE = 13.726° RELATIVE TO SURFACE NORMAL

| # | First Recording Beam Angle (internal, relative to surface normal, in degrees) | Second Recording Beam Angle | Internal Angle of First Recording Beam Relative To Skew Axis (degrees) | Internal Angle of Second Recording Beam Relative To Skew Axis (degrees) | Magnitude of Angle Difference From Previous Hologram (degrees) | α (degrees) | $K_G$ (×10$^7$ rad/m) | $|\Delta K_G|$ Between Hologram and Its Preceding Adjacent Hologram (×10$^4$ rad/m) |
|---|---|---|---|---|---|---|---|---|
| 1 | 53.218 | 154.234 | 39.492 | 140.508 | | 101.016 | 3.592 | |
| 2 | 53.309 | 154.143 | 39.583 | 140.417 | 0.091 | 100.833 | 3.587 | 4.709 |
| 3 | 53.400 | 154.052 | 39.674 | 140.326 | 0.091 | 100.652 | 3.582 | 4.704 |
| 4 | 53.491 | 153.961 | 39.765 | 140.235 | 0.091 | 100.470 | 3.578 | 4.713 |
| 5 | 53.581 | 153.871 | 39.855 | 140.145 | 0.091 | 100.289 | 3.573 | 4.708 |
| 6 | 53.672 | 153.780 | 39.946 | 140.054 | 0.090 | 100.109 | 3.568 | 4.709 |
| 7 | 53.762 | 153.690 | 40.036 | 139.964 | 0.090 | 99.928 | 3.563 | 4.704 |
| 8 | 53.852 | 153.600 | 40.126 | 139.874 | 0.090 | 99.748 | 3.559 | 4.713 |
| 9 | 53.942 | 153.510 | 40.216 | 139.784 | 0.090 | 99.568 | 3.554 | 4.707 |
| 10 | 54.031 | 153.421 | 40.305 | 139.695 | 0.090 | 99.389 | 3.549 | 4.709 |
| 11 | 54.121 | 153.331 | 40.395 | 139.605 | 0.090 | 99.210 | 3.545 | 4.710 |
| 12 | 54.210 | 153.242 | 40.484 | 139.516 | 0.089 | 99.031 | 3.540 | 4.712 |
| 13 | 54.300 | 153.152 | 40.574 | 139.426 | 0.089 | 98.853 | 3.535 | 4.713 |
| 14 | 54.389 | 153.063 | 40.663 | 139.337 | 0.089 | 98.674 | 3.530 | 4.707 |
| 15 | 54.478 | 152.974 | 40.752 | 139.248 | 0.089 | 98.496 | 3.526 | 4.715 |
| 16 | 54.567 | 152.885 | 40.841 | 139.159 | 0.089 | 98.319 | 3.521 | 4.710 |
| 17 | 54.655 | 152.797 | 40.929 | 139.071 | 0.089 | 98.142 | 3.516 | 4.711 |

TABLE 7-continued

RECORDING BEAM ANGLES FOR A FIRST METHOD OF MAKING A SKEW MIRROR; SKEW ANGLE = 13.726° RELATIVE TO SURFACE NORMAL

| # | First Recording Beam Angle (internal, relative to surface normal, in degrees) | Second Recording Beam Angle | Internal Angle of First Recording Beam Relative To Skew Axis (degrees) | Internal Angle of Second Recording Beam Relative To Skew Axis (degrees) | Magnitude of Angle Difference From Previous Hologram (degrees) | $\alpha$ (degrees) | $K_G$ ($\times 10^7$ rad/m) | $|\Delta K_G|$ Between Hologram and Its Preceding Adjacent Hologram ($\times 10^4$ rad/m) |
|---|---|---|---|---|---|---|---|---|
| 18 | 54.744 | 152.708 | 41.018 | 138.982 | 0.089 | 97.965 | 3.512 | 4.719 |
| 19 | 54.832 | 152.620 | 41.106 | 138.894 | 0.088 | 97.788 | 3.507 | 4.712 |
| 20 | 54.920 | 152.532 | 41.194 | 138.806 | 0.088 | 97.612 | 3.502 | 4.713 |
| 21 | 55.008 | 152.444 | 41.282 | 138.718 | 0.088 | 97.436 | 3.497 | 4.714 |
| 22 | 55.096 | 152.356 | 41.370 | 138.630 | 0.088 | 97.260 | 3.493 | 4.715 |
| 23 | 55.184 | 152.268 | 41.458 | 138.542 | 0.088 | 97.085 | 3.488 | 4.708 |
| 24 | 55.271 | 152.181 | 41.545 | 138.455 | 0.088 | 96.909 | 3.483 | 4.716 |
| 25 | 55.359 | 152.093 | 41.633 | 138.367 | 0.087 | 96.734 | 3.479 | 4.717 |
| 26 | 55.446 | 152.006 | 41.720 | 138.280 | 0.087 | 96.560 | 3.474 | 4.717 |
| 27 | 55.533 | 151.919 | 41.807 | 138.193 | 0.087 | 96.386 | 3.469 | 4.710 |
| 28 | 55.620 | 151.832 | 41.894 | 138.106 | 0.087 | 96.211 | 3.464 | 4.718 |
| 29 | 55.707 | 151.745 | 41.981 | 138.019 | 0.087 | 96.038 | 3.460 | 4.718 |
| 30 | 55.794 | 151.658 | 42.068 | 137.932 | 0.087 | 95.864 | 3.455 | 4.718 |
| 31 | 55.881 | 151.571 | 42.155 | 137.845 | 0.087 | 95.691 | 3.450 | 4.718 |
| 32 | 55.967 | 151.485 | 42.241 | 137.759 | 0.086 | 95.518 | 3.446 | 4.711 |
| 33 | 56.053 | 151.399 | 42.327 | 137.673 | 0.086 | 95.346 | 3.441 | 4.719 |
| 34 | 56.139 | 151.313 | 42.413 | 137.587 | 0.086 | 95.173 | 3.436 | 4.719 |
| 35 | 56.225 | 151.227 | 42.499 | 137.501 | 0.086 | 95.001 | 3.431 | 4.718 |
| 36 | 56.311 | 151.141 | 42.585 | 137.415 | 0.086 | 94.829 | 3.427 | 4.718 |
| 37 | 56.397 | 151.055 | 42.671 | 137.329 | 0.086 | 94.658 | 3.422 | 4.718 |
| 38 | 56.483 | 150.969 | 42.757 | 137.243 | 0.086 | 94.486 | 3.417 | 4.718 |
| 39 | 56.568 | 150.884 | 42.842 | 137.158 | 0.086 | 94.315 | 3.413 | 4.725 |
| 40 | 56.654 | 150.798 | 42.928 | 137.072 | 0.085 | 94.145 | 3.408 | 4.717 |
| 41 | 56.739 | 150.713 | 43.013 | 136.987 | 0.085 | 93.974 | 3.403 | 4.717 |
| 42 | 56.824 | 150.628 | 43.098 | 136.902 | 0.085 | 93.804 | 3.398 | 4.724 |
| 43 | 56.909 | 150.543 | 43.183 | 136.817 | 0.085 | 93.634 | 3.394 | 4.723 |
| 44 | 56.994 | 150.458 | 43.268 | 136.732 | 0.085 | 93.464 | 3.389 | 4.715 |
| 45 | 57.079 | 150.373 | 43.353 | 136.647 | 0.085 | 93.295 | 3.384 | 4.722 |
| 46 | 57.163 | 150.289 | 43.437 | 136.563 | 0.085 | 93.126 | 3.380 | 4.721 |
| 47 | 57.248 | 150.204 | 43.522 | 136.478 | 0.085 | 92.956 | 3.375 | 4.728 |
| 48 | 57.332 | 150.120 | 43.606 | 136.394 | 0.084 | 92.788 | 3.370 | 4.719 |
| | | | | | | | MEAN | 4.715 |
| | | | | | | | STDEV | 0.0054 |
| | | | | | | | % CV | 0.11 |

In a variation of the first method of making a skew mirror, a hologram is created by continuously and synchronously adjusting the first and second recording beam internal angles while maintaining the symmetry of the first and second recording beams about the skew axis as described above. Accordingly, a single hologram is recorded while the first recording beam is scanned from a first recording beam internal angle of +53.218 degrees to a first recording beam angle of +57.332 degrees. Simultaneously, the second recording beam is scanned from a second recording beam internal angle of +154.234 degrees to +150.120 degrees. Accordingly, a varies from 101.016 degrees to 92.788 degrees and $K_G$ varies from $3.592 \times 10^7$ rad/m to $3.370 \times 10^7$ rad/m while the single hologram is being recorded. Position of the grating medium is adjusted while the single hologram is being recorded such that the single hologram is recorded in a relatively compact space in the grating medium, rather than being smeared across a relatively broad space as the recording beam angles change. The single hologram thus exhibits reflective properties very similar to the 48 discrete holograms recorded with 48 sets of unique first recording beam and second recording beam internal angles, and the total energy dose for recording the single hologram is typically about the same (2.5 J/cm²) as for the 48 holograms.

A Second Method of Making a Skew Mirror

A second method of making a skew mirror is described below. The skew mirror made by the second method is the second embodiment skew mirror 1200, which is also illustrated in FIGS. 12A and 12B, and whose reflective properties are described above.

The second method is identical to the first method except that first and second recording beam internal angles are different than with the first method, which gives the second embodiment skew mirror reflective properties that differ from those of the first embodiment. In the present example, the second method is performed using a grating medium (AK233-200) that differs from that of the first method (AK174-200). Like the first embodiment, the second embodiment skew mirror benefits from having reflective properties that allow it to reflect light at a substantially different wavelength, and in particular a considerably longer wavelength, than the recording beam wavelength.

The grating structure 1205 of the second embodiment skew mirror 1200 is created by recording 49 volume holograms in the grating medium 1210. Each of the 49 holograms of the second method is recorded at its own unique first recording beam internal angle and its own unique second recording beam internal angle. The first recording beam internal angle is an internal angle of the first recording beam relative to surface normal of the grating medium and the second recording beam internal angle is an internal angle of the second recording beam relative to surface normal. Each of the first and second recording beams for the first embodiment skew mirror has irradiance of approximately 3 mW/cm². Typically, the first of the 49 holograms is recorded with an energy dose of 35 mJ/cm², and the dose is increased by about 1.5% for each subsequent hologram. The total dose for recording all 49 holograms is typically about 2.5 J/cm².

According to the second method, a first hologram is recorded using a first recording beam internal angle of +55.913 degrees and a second recording beam internal angle of +153.323 degrees; α therefore is 97.410 degrees. The skew axis for each of the 49 holograms has a skew angle of +14.618 degrees relative to surface normal. The skew angle for each hologram is calculated according to equation (9) above. For each subsequent hologram of the grating structure, the first and second recording beam internal angles are typically changed by amounts that are approximately equal in magnitude to each other, but having opposite signs, which maintains symmetry of the first and second recording beams about the skew axis.

For example, for recording a second hologram according to the second method, the first recording beam internal angle is changed by +0.095 degree and the second recording beam internal angle is adjusted by −0.095 degree, such that the first recording beam internal angle becomes +56.008 degrees and the second recording beam internal angle +153.228 degrees; α=97.220 degrees. The magnitudes of changes in recording beam internal angles from one hologram to the next hologram typically vary slightly across the 49 volume holograms (i.e. the change in change in recording beam internal angles from one hologram to the next varies), from a magnitude of 0.095 degree for changes in recording beam internal angles from the first hologram to the second hologram, to a magnitude of 0.087 degree for changes in recording beam internal angles from the 48$^{th}$ hologram to the 49$^{th}$ hologram. However, the magnitude of change is the same for each of the first and second recording beam internal angles, and the sign of the change is opposite for each of the first and second recording beam internal angles. The first and second recording beam internal angles for the last (49$^{th}$) hologram of the second embodiment grating structure are +60.252 and +148.984 degrees, respectively, and α=88.732.

In some embodiments, the magnitude of change of the first recording beam internal angle may differ very slightly from the magnitude of change of the second recording beam internal angle in order to compensate for factors such as system imprecision, Snell effects, dispersion, or shrinkage of the grating medium that results from recording the holograms.

The position of the grating medium is adjusted between recording one hologram and the next such that at least part of each of the 49 holograms is recorded in a common space shared with at least part of all others of the 49 holograms. Accordingly, each of the 49 holograms at least partially spatially overlaps all others of the 49 holograms in the grating medium.

Thus according to the second method first recording beam internal angles range from +55.913 to +60.252 degrees (a range of 4.339 degrees) and the second recording beam internal angles range from +153.323 to +148.984 degrees (a range of 4.339 degrees). As with the first method, for each hologram of the second method the first and second recording beams are symmetrical about the skew axis such that the internal angle of the first recording beam relative to the skew axis (+41.295 degrees for the first hologram) plus the internal angle of the second recording beam relative to the skew axis (+138.705 for the first hologram)=180 degrees (41.295°+138.705°=180°). The internal angles of the first and second recording beams relative to the skew axis are readily calculated from the first and second recording beam internal angles relative to surface normal, respectively, and the skew angle. For the second method of making a skew mirror, first and second recording beam internal angles (which are defined as internal angles relative to surface normal of the grating medium) and internal angles relative to the skew axis for the first and second recording beams are listed in Table 8. After recording the 49 volume holograms, the AK233-200 recording medium is light cured by a process familiar to persons skilled in the art. For example, in some embodiments light curing comprises exposure to near-ultraviolet uniform coherent light from a light emitting diode, until substantially all photoinitiator, photoactive monomer, of other photoactive chemistry has been consumed.

TABLE 8

RECORDING BEAM ANGLES FOR A SECOND METHOD OF MAKING A SKEW MIRROR; SKEW ANGLE = 14.618° RELATIVE TO SURFACE NORMAL

| # | First Recording Beam Angle (internal, relative to surface normal, in degrees) | Second Recording Beam Angle (internal, relative to surface normal, in degrees) | Internal Angle of First Recording Beam Relative To Skew Axis (degrees) | Internal Angle of Second Recording Beam Relative To Skew Axis (degrees) | Magnitude of Angle Difference From Previous Hologram (degrees) | α (degrees) | $K_G$ (×10$^7$ rad/m) | $\Delta K_G$ (×10$^4$ rad/m) |
|---|---|---|---|---|---|---|---|---|
| 1 | 55.913 | 153.323 | 41.295 | 138.705 |  | 97.410 | 3.497 |  |
| 2 | 56.008 | 153.228 | 41.390 | 138.610 | 0.095 | 97.220 | 3.492 | 5.098 |
| 3 | 56.102 | 153.134 | 41.484 | 138.516 | 0.094 | 97.032 | 3.487 | 5.053 |
| 4 | 56.196 | 153.040 | 41.578 | 138.422 | 0.094 | 96.844 | 3.482 | 5.063 |
| 5 | 56.290 | 152.946 | 41.672 | 138.328 | 0.094 | 96.656 | 3.477 | 5.072 |
| 6 | 56.384 | 152.852 | 41.766 | 138.234 | 0.094 | 96.468 | 3.471 | 5.081 |
| 7 | 56.477 | 152.759 | 41.859 | 138.141 | 0.093 | 96.282 | 3.466 | 5.037 |
| 8 | 56.571 | 152.665 | 41.953 | 138.047 | 0.094 | 96.094 | 3.461 | 5.100 |
| 9 | 56.664 | 152.572 | 42.046 | 137.954 | 0.093 | 95.908 | 3.456 | 5.055 |
| 10 | 56.757 | 152.479 | 42.139 | 137.861 | 0.093 | 95.722 | 3.451 | 5.064 |
| 11 | 56.849 | 152.387 | 42.231 | 137.769 | 0.092 | 95.538 | 3.446 | 5.019 |
| 12 | 56.942 | 152.294 | 42.324 | 137.676 | 0.093 | 95.352 | 3.441 | 5.082 |
| 13 | 57.034 | 152.202 | 42.416 | 137.584 | 0.092 | 95.168 | 3.436 | 5.036 |
| 14 | 57.127 | 152.109 | 42.509 | 137.491 | 0.093 | 94.982 | 3.431 | 5.100 |
| 15 | 57.219 | 152.017 | 42.601 | 137.399 | 0.092 | 94.798 | 3.426 | 5.054 |

TABLE 8-continued

RECORDING BEAM ANGLES FOR A SECOND METHOD OF MAKING A
SKEW MIRROR; SKEW ANGLE = 14.618° RELATIVE TO SURFACE NORMAL

| # | First Recording Beam Angle (internal, relative to surface normal, in degrees) | Second Recording Beam Angle | Internal Angle of First Recording Beam Relative To Skew Axis (degrees) | Internal Angle of Second Recording Beam Relative To Skew Axis (degrees) | Magnitude of Angle Difference From Previous Hologram (degrees) | α (degrees) | $K_G$ (×$10^7$ rad/m) | $\Delta K_G$ (×$10^4$ rad/m) |
|---|---|---|---|---|---|---|---|---|
| 16 | 57.311 | 151.925 | 42.693 | 137.307 | 0.092 | 94.614 | 3.421 | 5.063 |
| 17 | 57.402 | 151.834 | 42.784 | 137.216 | 0.091 | 94.432 | 3.416 | 5.017 |
| 18 | 57.494 | 151.742 | 42.876 | 137.124 | 0.092 | 94.248 | 3.411 | 5.081 |
| 19 | 57.585 | 151.651 | 42.967 | 137.033 | 0.091 | 94.066 | 3.406 | 5.034 |
| 20 | 57.676 | 151.560 | 43.058 | 136.942 | 0.091 | 93.884 | 3.401 | 5.043 |
| 21 | 57.767 | 151.469 | 43.149 | 136.851 | 0.091 | 93.702 | 3.396 | 5.051 |
| 22 | 57.858 | 151.378 | 43.240 | 136.760 | 0.091 | 93.520 | 3.391 | 5.060 |
| 23 | 57.949 | 151.287 | 43.331 | 136.669 | 0.091 | 93.338 | 3.385 | 5.068 |
| 24 | 58.040 | 151.196 | 43.422 | 136.578 | 0.091 | 93.156 | 3.380 | 5.077 |
| 25 | 58.130 | 151.106 | 43.512 | 136.488 | 0.090 | 92.976 | 3.375 | 5.029 |
| 26 | 58.220 | 151.016 | 43.602 | 136.398 | 0.090 | 92.796 | 3.370 | 5.038 |
| 27 | 58.310 | 150.926 | 43.692 | 136.308 | 0.090 | 92.616 | 3.365 | 5.046 |
| 28 | 58.400 | 150.836 | 43.782 | 136.218 | 0.090 | 92.436 | 3.360 | 5.054 |
| 29 | 58.490 | 150.746 | 43.872 | 136.128 | 0.090 | 92.256 | 3.355 | 5.063 |
| 30 | 58.579 | 150.657 | 43.961 | 136.039 | 0.089 | 92.078 | 3.350 | 5.015 |
| 31 | 58.669 | 150.567 | 44.051 | 135.949 | 0.090 | 91.898 | 3.345 | 5.079 |
| 32 | 58.758 | 150.478 | 44.140 | 135.860 | 0.089 | 91.720 | 3.340 | 5.031 |
| 33 | 58.847 | 150.389 | 44.229 | 135.771 | 0.089 | 91.542 | 3.335 | 5.039 |
| 34 | 58.936 | 150.300 | 44.318 | 135.682 | 0.089 | 91.364 | 3.330 | 5.047 |
| 35 | 59.025 | 150.211 | 44.407 | 135.593 | 0.089 | 91.186 | 3.325 | 5.055 |
| 36 | 59.113 | 150.123 | 44.495 | 135.505 | 0.088 | 91.010 | 3.320 | 5.006 |
| 37 | 59.202 | 150.034 | 44.584 | 135.416 | 0.089 | 90.832 | 3.315 | 5.071 |
| 38 | 59.290 | 149.946 | 44.672 | 135.328 | 0.088 | 90.656 | 3.310 | 5.022 |
| 39 | 59.378 | 149.858 | 44.760 | 135.240 | 0.088 | 90.480 | 3.305 | 5.030 |
| 40 | 59.466 | 149.770 | 44.848 | 135.152 | 0.088 | 90.304 | 3.300 | 5.037 |
| 41 | 59.554 | 149.682 | 44.936 | 135.064 | 0.088 | 90.128 | 3.295 | 5.045 |
| 42 | 59.642 | 149.594 | 45.024 | 134.976 | 0.088 | 89.952 | 3.290 | 5.053 |
| 43 | 59.730 | 149.506 | 45.112 | 134.888 | 0.088 | 89.776 | 3.285 | 5.061 |
| 44 | 59.817 | 149.419 | 45.199 | 134.801 | 0.087 | 89.602 | 3.280 | 5.011 |
| 45 | 59.904 | 149.332 | 45.286 | 134.714 | 0.087 | 89.428 | 3.275 | 5.018 |
| 46 | 59.991 | 149.245 | 45.373 | 134.627 | 0.087 | 89.254 | 3.270 | 5.026 |
| 47 | 60.078 | 149.158 | 45.460 | 134.540 | 0.087 | 89.080 | 3.264 | 5.033 |
| 48 | 60.165 | 149.071 | 45.547 | 134.453 | 0.087 | 88.906 | 3.259 | 5.041 |
| 49 | 60.252 | 148.984 | 45.634 | 134.366 | 0.087 | 88.732 | 3.254 | 5.048 |
| | | | | | | MEAN | | 5.050 |
| | | | | | | STDEV | | 0.0235 |
| | | | | | | % CV | | 0.47 |

For the AK233-200 grating medium used for the second embodiment skew mirror, n is estimated at 1.50 for light at 405 nm. The wavelength of the first and second recording beams used to record holograms for making the second embodiment skew mirror is 405 nm=405×$10^{-9}$ m. Accordingly, k=2.327×$10^7$ rad/m for the first and second recording beams in AK233-200 grating medium. $K_G$ for the holograms of the second embodiment skew mirror ranges from 3.497×$10^7$ rad/m for the first hologram to 3.254×$10^7$ rad/m for the $49^{th}$ hologram.

Adjacent $|\Delta K_G|$ for the second embodiment holograms is relatively constant, with a mean value for all 49 holograms of 5.050×$10^4$ rad/m and a coefficient of variation of 0.47%. Adjacent $|\Delta K_G|$ for each second embodiment hologram resides in a range between 5.01×$10^4$ to 5.10×$10^4$ rad/m. $|\Delta K_G|$ between the first and $49^{th}$ holograms is 2.42×$10^6$ rad/m.

In a variation of the second method of making a skew mirror, a hologram is created by continuously and synchronously adjusting the first and second recording beam internal angles while maintaining the symmetry of the first and second recording beams about the skew axis as described above. Accordingly, a single hologram is recorded while the first recording beam is scanned from a first recording beam internal angle of +55.913 degrees to a first recording beam angle of +60.252 degrees. Simultaneously, the second recording beam is scanned from a second recording beam internal angle of +153.323 degrees to +148.984 degrees. The single hologram is thus equivalent to the 49 discrete holograms recorded with 49 sets of unique first recording beam and second recording beam internal angles. The total energy dose for recording the single hologram is typically 2.5 J/$cm^2$ for the single hologram.

A Third Method of Making a Skew Mirror

A third method of making a skew mirror is described below. Like the first method, the third method typically utilizes a system for making a skew mirror such as the exemplary system 1350 illustrated in FIG. 13 and described above.

According to the third method, a grating structure is created by recording three sets of holograms in a grating medium. The first hologram set includes 21 holograms, the second hologram set includes 19 holograms, and the third hologram set includes 16 holograms, for a total of 56 holograms. In some embodiments, each of the first, second, and third holograms sets includes at least 6 holograms, or at least 9 holograms. Each of the multiple holograms in the first hologram set typically at least partially spatially overlaps at least one other of the multiple holograms in the first hologram set, and at least one of the multiple holograms in the first hologram set may at least partially spatially overlap at least one of the holograms in the second hologram set. In some embodiments, each of the multiple holograms in the first hologram set at least partially spatially overlaps all others of the multiple holograms in the first hologram set.

Similarly, each of the multiple holograms in the second hologram set typically at least partially spatially overlaps at least one other of the multiple holograms in the second hologram set, and at least one of the multiple holograms in the second hologram set may at least partially spatially overlap at least one of the holograms in the first hologram set or the third hologram set. In some embodiments, each of the multiple holograms in the second hologram set at least partially spatially overlaps all others of the multiple holograms in the second hologram set.

Similarly, each of the multiple holograms in the third hologram set typically at least partially spatially overlaps at least one other of the multiple holograms in the third hologram set, and at least one of the multiple holograms in the third hologram set may at least partially spatially overlap at least one of the holograms in the second hologram set. In some embodiments, each of the multiple holograms in the third hologram set at least partially spatially overlaps all others of the multiple holograms in the third hologram set. In some embodiments, all holograms of the first, second, and third hologram sets at least partially spatially overlap with each other.

Each of the 56 total holograms is recorded using first and second recording beams, each of which is incident upon the grating medium at its own unique first recording beam internal angle and its own unique second recording beam internal angle. In some embodiments, not every first and second recording beam internal angle is unique. For example, in some embodiments multiple holograms having the same recording beam internal angles as each other may be written in in locations in the skew mirror that differ from each other. The first recording beam internal angle is an internal angle of the first recording beam relative to surface normal of the grating medium and the second recording beam internal angle is an internal angle of the second recording beam relative to surface normal. Each of the first and second recording beams for the first embodiment skew mirror is a monochromatic collimated light beam having irradiance of approximately 3 mW/cm$^2$. Typically, the first of the 56 holograms is recorded with an energy dose of 35 mJ/cm$^2$, and the dose is increased by about 0.9% for each subsequent hologram. The total dose for recording all 56 holograms is typically about 2.5 J/cm$^2$.

The first hologram set of the third method includes a first hologram recorded using a first recording beam internal angle of +43.519 degrees and a second recording beam internal angle of +163.882 degrees, resulting in a beam difference angle ($\alpha$) of 120.363 degrees. The first and second recording beams of the first hologram are symmetrical about a skew axis having a skew angle of 13.700 degrees. For each subsequent hologram of first hologram set, the first and second recording beam internal angles are typically changed by amounts that are approximately equal in magnitude to each other, but having opposite signs. For example, for recording a second hologram of the first hologram set, the first recording beam internal angle is changed by +0.351 degree and the second recording beam internal angle is adjusted by −0.355 degree, such that the first recording beam internal angle becomes +43.870 degrees and the second recording beam internal angle +163.527 degrees ($\alpha$=119.657 degrees). The first and second recording beams of the second hologram are symmetrical about a skew axis having a skew angle of 13.699 degrees. The magnitudes of changes in recording beam internal angles from one hologram to the next hologram typically vary slightly across the 21 volume holograms of the first hologram set (i.e. the change in change in recording beam internal angles from one hologram to the next varies), from a magnitude of approximately 0.353 degree for changes in recording beam internal angles from the first hologram to the second hologram, to a magnitude of approximately 0.299 degree for changes in recording beam internal angles from the 20$^{th}$ hologram to the 21$^{st}$ hologram. However, the magnitude of change is approximately the same for each of the first and second recording beam internal angles, and the sign of the change is opposite for each of the first and second recording beam internal angles. The first and second recording beam internal angles for the last (21") hologram of the first hologram set are +49.960 and +157.379 degrees, respectively, and $\alpha$=107.419 degrees. The first and second recording beams of the 21$^{st}$ hologram are symmetrical about a skew axis having a skew angle of 13.670 degrees.

According to the third method, the first recording beam internal angle of the first hologram set ranges from +43.519 to +49.960 degrees (a range of 6.441 degrees) and the second recording beam internal angle of the first hologram set ranges from +163.882 to +157.379 degrees (a range of 6.503 degrees). For each hologram of the first hologram set, the first recording beam and its respective second recording beam are symmetrical about a skew axis. Thus the internal angle of the first recording beam relative to a skew axis (+29.819 degrees for the first hologram) plus the internal angle of the second recording beam relative to the skew axis (+150.182 degrees for the first hologram) is equal to 180.0 degrees (29.818°+150.182=180.0°). The internal angles of the first and second recording beams relative to the skew axis are readily calculated from the first and second recording beam internal angles respectively, and the skew angle. The mean skew angle for all holograms of the first hologram set is 13.685 degrees and all skew angles of the first set are within 0.015 degree of the mean. For the first hologram set of the third method of making a skew mirror, first and second recording beam internal angles relative to surface normal of the grating medium and internal angles relative to the skew axis are listed in Table 9.

For many skew mirror applications, all skew angles for a set of holograms are within 2.0 degrees of the mean skew angle for all holograms in the set, in order to achieve adequate reflective performance. In some skew mirror applications, all skew angles for a set of holograms are within 1.0 degree of the hologram set mean skew angle in order to achieve adequate reflective performance. For more demanding applications, all skew angles of a set of holograms are within 0.5 degree of the hologram set mean skew angle in order to achieve adequate reflective performance. For still more demanding applications, all skew angles of a set of holograms are within 0.10 degree of the hologram set mean skew angle in order to achieve adequate reflective performance. For especially demanding applications, all skew angles in a set of holograms are within 0.01 degree of the hologram set mean skew angle.

$K_G$ for the holograms of the first hologram set ranges from 4.140×10$^7$ rad/m for the first hologram to 3.846×10$^7$ rad/m for the 21$^{st}$ hologram, based on n=1.538 for 405 nm light and AK283 photosensitive grating medium, resulting in k=2.386×10⁷ rad/m. The third method can be, but is not necessarily, practiced using the AK283 grating medium having a thickness of 500 μm. Adjacent $|\Delta K_G|$ for each hologram of the first hologram set is 1.469×10⁵ rad/m. $|\Delta K_G|$ between the first and 21ˢᵗ holograms is 2.939×10⁶ rad/m. Values for α, $K_G$, and $|\Delta K_G|$ for each of the 21 holograms of the first hologram set of the third method can be found in Table 9.

The second hologram set of the third method includes a first hologram recorded using a first recording beam internal angle of +53.704 degrees and a second recording beam internal angle of +153.696 degrees, resulting in a =99.992 degrees. The first and second recording beams of the first hologram are symmetrical about a skew axis having a skew angle of 13.700 degrees. For recording a second hologram of the second hologram set, the first recording beam internal angle is changed by +0.272 degree and the second recording beam internal angle is adjusted by −0.275 degree, such that the first recording beam internal angle becomes +53.976 degrees and the second recording beam internal angle +153.421 degrees (α=99.445 degrees). The first and second recording beams of the second hologram are symmetrical about a skew axis having a skew angle of 13.699 degrees. The magnitudes of changes in recording beam internal angles from one hologram to the next hologram typically vary slightly across the 19 volume holograms of the second hologram set (i.e. the change in change in recording beam internal angles from one hologram to the next varies), from a magnitude of approximately 0.274 degree for changes in recording beam internal angles from the first hologram to the second hologram, to a magnitude of 0.252 degree for changes in recording beam internal angles from the 18ᵗʰ hologram to the 19ᵗʰ hologram. However, the magnitude of change is approximately the same for each of the first and second recording beam internal angles, and the sign of the change is opposite for each of the first and second recording beam internal angles. The first and second recording beam internal angles for the last (19ᵗʰ) hologram of the second hologram set are +58.393 and +148.957 degrees, respectively, and α=90.564 degrees. The first and second recording beams of the 19ᵗʰ hologram are symmetrical about a skew axis having a skew angle of 13.675 degrees.

$K_G$ for the holograms of the second hologram set ranges from 3.655×10⁷ for the first hologram to 3.391×10⁷ for the 19ᵗʰ hologram (n=1.538; k=2.386×10⁷). Adjacent $|\Delta K_G|$ for each hologram of the second hologram set is 1.469×10⁵. $|\Delta K_G|$ between the first and 19ᵗʰ holograms is 2.645×10⁶. Values for α, $K_G$, and $|\Delta K_G|$ for each of the 19 holograms of the second hologram set of the third method can be found in Table 9.

According to the third method, the first recording beam internal angle of the second hologram set ranges from +53.704 to +58.393 degrees (a range of 4.689 degrees) and the second recording beam internal angle of the second hologram set ranges from +153.696 to +148.597 degrees (a range of 4.736 degrees). For each hologram of the second hologram set, the first recording beam and its respective second recording beam are symmetrical about a skew axis. Thus the internal angle of the first recording beam relative to a skew axis (+40.004 degrees for the first hologram) plus the internal angle of the second recording beam relative to the skew axis (+139.996 degrees for the first hologram) is equal to 180.0 degrees (40.004°+139.996=180.0°). The internal angles of the first and second recording beams relative to the skew axis are readily calculated from the first and second recording beam internal angles respectively, and the skew angle. The mean skew angle for all holograms of the second hologram set is 13.688 degrees and all skew angles of the first set are within 0.013 degree of the mean. For the second hologram set of the third method of making a skew mirror, first and second recording beam internal angles relative to surface normal of the grating medium and internal angles relative to the skew axis are listed in Table 9.

The third hologram set of the third method includes a first hologram recorded using a first recording beam internal angle of +63.696 degrees and a second recording beam internal angle of +143.704 degrees, resulting in a =80.008 degrees. The first and second recording beams of the first hologram are symmetrical about a skew axis having a skew angle of 13.700 degrees. For recording a second hologram of the third hologram set, the first recording beam internal angle is changed by +0.229 degree and the second recording beam internal angle is adjusted by −0.231 degree, such that the first recording beam internal angle becomes +63.925 degrees and the second recording beam internal angle +143.473 degrees (α=79.548 degrees). The first and second recording beams of the first hologram are symmetrical about a skew axis having a skew angle of 13.699 degrees. The magnitudes of changes in recording beam internal angles from one hologram to the next hologram typically vary slightly across the 16 volume holograms of the third hologram set (i.e. the change in change in recording beam internal angles from one hologram to the next varies), from a magnitude of approximately 0.230 degree for changes in recording beam internal angles from the first hologram to the second hologram, to a magnitude of approximately 0.219 degree for changes in recording beam internal angles from the 18ᵗʰ hologram to the 19ᵗʰ hologram. However, the magnitude of change is approximately the same for each of the first and second recording beam internal angles, and the sign of the change is opposite for each of the first and second recording beam internal angles. The first and second recording beam internal angles for the last (16ᵗʰ) hologram of the third hologram set are +67.051 and +140.313 degrees, respectively, and a =73.262 degrees. The first and second recording beams of the 16ᵗʰ hologram are symmetrical about a skew axis having a skew angle of 13.682 degrees.

$K_G$ for the holograms of the third hologram set ranges from 3.068×10⁷ for the first hologram to 2.847×10⁷ for the 16ᵗʰ hologram (n=1.538; k=2.386×10⁷). Adjacent $|\Delta K_G|$ for each hologram of the third hologram set is 1.469×10⁵. $|\Delta K_G|$ between the first and 16ᵗʰ holograms is 2.204×10⁶. Values for a, $K_G$, and $|\Delta K_G|$ for each of the 16 holograms of the third hologram set of the third method can be found in Table 9.

According to the third method, the first recording beam internal angle of the third hologram set ranges from +63.696 to +67.051 degrees (a range of 3.355 degrees) and the second recording beam internal angle of the third hologram set ranges from +143.704 to +140.313 degrees (a range of 3.391 degrees). For each hologram of the third hologram set, the first recording beam and its respective second recording beam are symmetrical about a skew axis. Thus the internal angle of the first recording beam relative to a skew axis (+49.996 degrees for the first hologram) plus the internal angle of the second recording beam relative to the skew axis (+130.004 degrees for the first hologram) is equal to 180.0 degrees (49.996°+130.004=180.0°). The internal angles of the first and second recording beams relative to the skew axis are readily calculated from the first and second recording beam internal angles respectively, and the skew angle. The mean skew angle for all holograms of the third hologram set is 13.691 degrees and all skew angles of the first set are within 0.009 degree of the mean. For the third hologram set of the third method of making a skew mirror, first and second recording beam internal angles relative to surface normal of the grating medium and internal angles relative to the skew axis are listed in Table 9.

TABLE 9

RECORDING BEAM ANGLES AND RELATED DATA
FOR A THIRD METHOD OF MAKING A SKEW MIRROR

| # | First Recording Beam Angle (internal, in degrees, relative to surface normal) | Second Recording Beam Angle | Skew Angle (internal, in degrees, relative to surface normal) | Internal Angle of First Recording Beam Relative To Skew Axis (degrees) | Internal Angle of Second Recording Beam Relative To Skew Axis (degrees) | Magnitude of Angle Difference From Previous Hologram | $\alpha$ (degrees) | $K_G$ ($\times 10^7$ rad/m) |
|---|---|---|---|---|---|---|---|---|
| | | | | First Set of Holograms | | | | |
| 1 | 43.519 | 163.882 | 13.700 | 29.819 | 150.182 | | 120.363 | 4.140 |
| 2 | 43.870 | 163.527 | 13.699 | 30.171 | 149.829 | 0.354 | 119.657 | 4.126 |
| 3 | 44.218 | 163.177 | 13.697 | 30.521 | 149.479 | 0.351 | 118.959 | 4.111 |
| 4 | 44.562 | 162.830 | 13.696 | 30.866 | 149.134 | 0.347 | 118.268 | 4.096 |
| 5 | 44.903 | 162.486 | 13.695 | 31.208 | 148.792 | 0.344 | 117.583 | 4.082 |
| 6 | 45.240 | 162.146 | 13.693 | 31.547 | 148.453 | 0.340 | 116.906 | 4.067 |
| 7 | 45.574 | 161.809 | 13.692 | 31.883 | 148.117 | 0.337 | 116.235 | 4.052 |
| 8 | 45.905 | 161.475 | 13.690 | 32.215 | 147.785 | 0.334 | 115.570 | 4.037 |
| 9 | 46.233 | 161.144 | 13.689 | 32.545 | 147.455 | 0.331 | 114.911 | 4.023 |
| 10 | 46.558 | 160.816 | 13.687 | 32.871 | 147.129 | 0.328 | 114.258 | 4.008 |
| 11 | 46.880 | 160.491 | 13.686 | 33.195 | 146.805 | 0.325 | 113.611 | 3.993 |
| 12 | 47.200 | 160.169 | 13.684 | 33.515 | 146.485 | 0.322 | 112.969 | 3.979 |
| 13 | 47.516 | 159.849 | 13.683 | 33.834 | 146.166 | 0.320 | 112.333 | 3.964 |
| 14 | 47.830 | 159.532 | 13.681 | 34.149 | 145.851 | 0.317 | 111.702 | 3.949 |
| 15 | 48.142 | 159.218 | 13.680 | 34.462 | 145.538 | 0.314 | 111.076 | 3.935 |
| 16 | 48.451 | 158.905 | 13.678 | 34.773 | 145.227 | 0.312 | 110.455 | 3.920 |
| 17 | 48.757 | 158.596 | 13.676 | 35.081 | 144.919 | 0.310 | 109.838 | 3.905 |
| 18 | 49.061 | 158.288 | 13.675 | 35.387 | 144.613 | 0.307 | 109.227 | 3.891 |
| 19 | 49.363 | 157.983 | 13.673 | 35.690 | 144.310 | 0.305 | 108.620 | 3.876 |
| 20 | 49.663 | 157.680 | 13.672 | 35.991 | 144.009 | 0.303 | 108.017 | 3.861 |
| 21 | 49.960 | 157.379 | 13.670 | 36.290 | 143.710 | 0.301 | 107.419 | 3.846 |
| MEAN SKEW ANGLE = | | | 13.685 | | | | | |
| | | | | Second Set of Holograms | | | | |
| 1 | 53.704 | 153.696 | 13.700 | 40.004 | 139.996 | | 99.992 | 3.655 |
| 2 | 53.976 | 153.421 | 13.699 | 40.278 | 139.722 | 0.275 | 99.445 | 3.641 |
| 3 | 54.247 | 153.148 | 13.698 | 40.550 | 139.450 | 0.273 | 98.900 | 3.626 |
| 4 | 54.517 | 152.876 | 13.696 | 40.820 | 139.180 | 0.272 | 98.359 | 3.611 |
| 5 | 54.785 | 152.605 | 13.695 | 41.090 | 138.910 | 0.270 | 97.821 | 3.597 |
| 6 | 55.051 | 152.336 | 13.694 | 41.357 | 138.643 | 0.269 | 97.286 | 3.582 |
| 7 | 55.316 | 152.069 | 13.692 | 41.624 | 138.377 | 0.268 | 96.753 | 3.567 |
| 8 | 55.579 | 151.803 | 13.691 | 41.888 | 138.112 | 0.266 | 96.223 | 3.553 |
| 9 | 55.842 | 151.538 | 13.690 | 42.152 | 137.848 | 0.265 | 95.696 | 3.538 |
| 10 | 56.102 | 151.274 | 13.688 | 42.414 | 137.586 | 0.264 | 95.172 | 3.523 |
| 11 | 56.362 | 151.012 | 13.687 | 42.675 | 137.325 | 0.262 | 94.650 | 3.509 |
| 12 | 56.620 | 150.751 | 13.685 | 42.935 | 137.065 | 0.261 | 94.131 | 3.494 |
| 13 | 56.877 | 150.491 | 13.684 | 43.193 | 136.807 | 0.260 | 93.614 | 3.479 |
| 14 | 57.133 | 150.232 | 13.683 | 43.450 | 136.550 | 0.259 | 93.100 | 3.464 |
| 15 | 57.387 | 149.975 | 13.681 | 43.706 | 136.294 | 0.257 | 92.588 | 3.450 |
| 16 | 57.640 | 149.719 | 13.680 | 43.961 | 136.039 | 0.256 | 92.079 | 3.435 |
| 17 | 57.892 | 149.464 | 13.678 | 44.214 | 135.786 | 0.255 | 91.571 | 3.420 |
| 18 | 58.143 | 149.210 | 13.677 | 44.467 | 135.533 | 0.254 | 91.067 | 3.406 |
| 19 | 58.393 | 148.957 | 13.675 | 44.718 | 135.282 | 0.253 | 90.564 | 3.391 |
| MEAN SKEW ANGLE = | | | 13.688 | | | | | |
| | | | | Third Set of Holograms | | | | |
| 1 | 63.696 | 143.704 | 13.700 | 49.996 | 130.004 | | 80.008 | 3.068 |
| 2 | 63.925 | 143.473 | 13.699 | 50.226 | 129.774 | 0.231 | 79.548 | 3.053 |
| 3 | 64.153 | 143.243 | 13.698 | 50.455 | 129.545 | 0.230 | 79.090 | 3.038 |
| 4 | 64.380 | 143.013 | 13.697 | 50.683 | 129.317 | 0.230 | 78.633 | 3.024 |
| 5 | 64.607 | 142.785 | 13.696 | 50.911 | 129.089 | 0.229 | 78.178 | 3.009 |
| 6 | 64.833 | 142.556 | 13.694 | 51.138 | 128.862 | 0.228 | 77.724 | 2.994 |
| 7 | 65.058 | 142.329 | 13.693 | 51.364 | 128.636 | 0.227 | 77.272 | 2.980 |
| 8 | 65.282 | 142.102 | 13.692 | 51.590 | 128.410 | 0.227 | 76.821 | 2.965 |
| 9 | 65.506 | 141.877 | 13.691 | 51.815 | 128.186 | 0.226 | 76.371 | 2.950 |
| 10 | 65.728 | 141.651 | 13.690 | 52.039 | 127.961 | 0.225 | 75.923 | 2.935 |
| 11 | 65.951 | 141.427 | 13.689 | 52.262 | 127.738 | 0.225 | 75.476 | 2.921 |
| 12 | 66.172 | 141.203 | 13.687 | 52.485 | 127.515 | 0.224 | 75.031 | 2.906 |

TABLE 9-continued

RECORDING BEAM ANGLES AND RELATED DATA
FOR A THIRD METHOD OF MAKING A SKEW MIRROR

| # | First Recording Beam Angle (internal, in degrees, relative to surface normal) | Second Recording Beam Angle (internal, in degrees, relative to surface normal) | Skew Angle (internal, in degrees, relative to surface normal) | Internal Angle of First Recording Beam Relative To Skew Axis (degrees) | Internal Angle of Second Recording Beam Relative To Skew Axis (degrees) | Magnitude of Angle Difference From Previous Hologram | α (degrees) | $K_G$ ($\times 10^7$ rad/m) |
|---|---|---|---|---|---|---|---|---|
| 13 | 66.393 | 140.979 | 13.686 | 52.707 | 127.293 | 0.223 | 74.586 | 2.891 |
| 14 | 66.613 | 140.757 | 13.685 | 52.928 | 127.072 | 0.223 | 74.144 | 2.877 |
| 15 | 66.832 | 140.534 | 13.683 | 53.149 | 126.851 | 0.222 | 73.702 | 2.862 |
| 16 | 67.051 | 140.313 | 13.682 | 53.369 | 126.631 | 0.222 | 73.262 | 2.847 |
| MEAN SKEW ANGLE = | | | 13.691 | | | | | |

A Multicolor Skew Mirror Embodiment

A skew mirror produced by the third method of making a skew mirror can be referred to as a multicolor skew mirror because its grating medium is configured to reflect blue, green, and red light about substantially constant reflective axes. The first hologram set is configured to reflect incident light residing in a blue region of the visible spectrum about substantially constant first reflective axes that differ by at least 2.0 degrees from surface normal of the grating medium. For purposes of the present disclosure, incident light in the blue region of the visible spectrum has a wavelength in the range of 405 nm to 492 nm. The first hologram set is more specifically configured to reflect blue incident light having a wavelength of 463 nm about substantially constant first reflective axes having a mean reflective axis angle of +13.685 degrees, where (i) the blue incident light has internal angles of incidence (relative to surface normal) that range from +8.615 degrees to −8.606 degrees, and (ii) the internal angles of incidence include at least 21 different incidence angles, each of which is separated from all others of the at least 21 different incidence angles by 0.52 degrees or more. In some embodiments, the internal angles of incidence of the blue incident light include at least 4 different incidence angles, each of which is separated from all others of the at least 4 difference incidence angles by 1.0 degrees or more.

The incident light is reflected at an internal angle of reflection (relative to surface normal) ranging from +18.785 degrees to +35.946 degrees, respectively, and the reflected light has the same wavelength as the incident light. Persons skilled in the art recognize that the incident light and its reflection are interchangeable such that where the 463 nm incident light has internal angles of incidence that range from +18.785 degrees to +35.946 degrees, it is reflected about the substantially constant reflective axes at an internal angles of reflection ranging from +8.615 degrees to −8.606 degrees, respectively.

The second hologram set is configured to reflect incident light residing in a green region of the visible spectrum about substantially constant second reflective axes that differ by at least 2.0 degrees from surface normal of the grating medium. For purposes of the present disclosure, incident light in the green region of the visible spectrum has a wavelength in the range of 493 nm to 577 nm. The second hologram set is more specifically configured to reflect green incident light having a wavelength of 522 nm about substantially constant second reflective axes having a mean reflective axis angle of +13.688 degrees, where (i) the green incident light has internal angles of incidence (relative to surface normal) that range from +7.813 degrees to −8.993 degrees, and (ii) the internal angles of incidence include at least 19 different incidence angles, each of which is separated from all others of the at least 19 different incidence angles by 0.60 degrees or more. In some embodiments, the internal angles of incidence of the green incident light include at least 4 different incidence angles, each of which is separated from all others of the at least 4 difference incidence angles by 1.2 degrees or more.

The green incident light is reflected at internal angles of reflection ranging from +19.587 degrees to +36.342 degrees, respectively, and the reflected light has the same wavelength as the incident light. Persons skilled in the art recognize that the incident light and its reflection are interchangeable such that where the 522 nm incident light has an internal angle of incidence that ranges from +19.587 degrees to +36.342 degrees, it is reflected about the substantially constant reflective axes at an internal angle of reflection ranging from +7.813 degrees to −8.993 degrees, respectively.

The third hologram set is configured to reflect incident light residing in a red region of the visible spectrum about substantially constant third reflective axes that differ by at least 2.0 degrees from surface normal of the grating medium. For purposes of the present disclosure, incident light in the red region of the visible spectrum has a wavelength in the range of 610 nm to 780 nm. The third hologram set is more specifically configured to reflect red incident light having a wavelength of 622 nm about substantially constant third reflective axes having a mean reflective axis angle of +13.691 degrees, where (i) the red incident light has internal angles of incidence (relative to surface normal) that range from +10.370 degrees to −8.391 degrees, and (ii) the internal angles of incidence include at least 16 different incidence angles, each of which is separated from others of the at least 16 different incidence angles by 0.74 degrees or more. In some embodiments, the internal angles of incidence of the red incident light include at least 4 different incidence angles, each of which is separated from all others of the at least 4 difference incidence angles by 1.5 degrees or more.

The red incident light is reflected at internal angles of reflection ranging from +17.030 degrees to +35.791 degrees, respectively, and the reflected light has the same wavelength as the incident light. Persons skilled in the art recognize that the red incident light and its reflection are interchangeable such that where the 622 nm incident light has an internal angle of incidence that ranges from +17.030 degrees to +35.791 degrees, it is reflected about the substantially constant reflective axis at internal angles of reflection ranging from +10.370 degrees to −8.391 degrees, respectively.

As described above, the first hologram set is configured to reflect blue incident light having a wavelength of 463 nm about reflective axes that are substantially constant, having a mean reflective axis angle of +13.7 degrees, where the 463 nm light is incident upon the grating medium at multiple internal angles ranging from −8.6 degrees to +8.6 degrees relative to surface normal. The second hologram set is configured to reflect green incident light having a wavelength of 522 nm about reflective axes that are substantially constant, having a mean reflective axis angle of +13.7 degrees, where the 522 nm light is incident upon the grating medium at multiple internal angles of incidence ranging from −9.0 degrees to +7.8 degrees relative to surface normal. The third hologram set is configured to reflect red incident light having a wavelength of 622 nm about reflective axes that are substantially constant, having a mean reflective axis angle of +13.7 degrees, where the 622 nm light is incident upon the grating medium at multiple internal angles ranging from −8.4 degrees to +10.4 degrees relative to surface normal.

Thus the multicolor skew mirror's reflective properties enable it to reflect blue, green, and red incident light about substantially constant reflective axes having a mean reflective axis angle of 13.7 degrees, where the blue, green, and red incident light is incident upon the mirror at internal angles of incidence ranging from −8.4 degrees to +7.8 degrees (a range of 16.2 degrees) relative to surface normal. In embodiments, a skew mirror's reflective properties enable it to reflect blue, green, and red incident light about substantially constant reflective axes, where the blue, green, and red incident light is incident upon the grating medium at multiple internal angles of incidence that span a range of at least 4.0 degrees, or at least 8.0 degrees.

A Multiwavelength Method of Making a Skew Mirror

In a multiwavelength method of making a skew mirror, six volume holograms are recorded in AK233-200 grating medium, with each of the six holograms being recorded using its own unique first and second recording beam internal angles of incidence. In addition, for each of the six volume holograms, wavelengths of the first and second recording beams are adjusted continuously and synchronously from 403 nm to 408 nm, using a variable wavelength laser. Wavelengths of the first and second recording beams are kept equal to each other while recording each of the six volume holograms. Total energy dose delivered in recording the six volume holograms according to the multiwavelength method is typically, but not necessarily, 2.5 J/cm² for first and second recording beam internal angles of incidence for the multiwavelength method of making a skew mirror are provided below in Table 10. A skew mirror made by the multiwavelength method has the same reflective characteristics of the second embodiment skew mirror described above.

TABLE 10

RECORDING BEAM ANGLES FOR A MULTIWAVELENGTH METHOD OF MAKING A SKEW MIRROR

| HOLOGRAM | First Recording Beam Angle of Incidence* | Second Recording Beam Angle of Incidence* |
|---|---|---|
| 1 | 56.235° | 153.001° |
| 2 | 57.033° | 152.203° |
| 3 | 57.813° | 151.423° |
| 4 | 58.568° | 150.668° |
| 5 | 59.303° | 149.933° |
| 6 | 60.018° | 149.218° |

*internal, relative to grating medium surface normal

Other Skew Mirror Embodiments

Embodiments of a skew mirror can be created in a grating medium comprising a volumetric dielectric medium, such as a photosensitive recording medium. Skew mirror embodiments may be formed by constraining a spatial dielectric modulation spectrum as described herein. In an embodiment, dielectric modulation is accomplished holographically by recording an interference pattern of two or more coherent light beams in a photosensitive recording medium. In other embodiments, dielectric modulation can be accomplished by other means.

Figure 15:
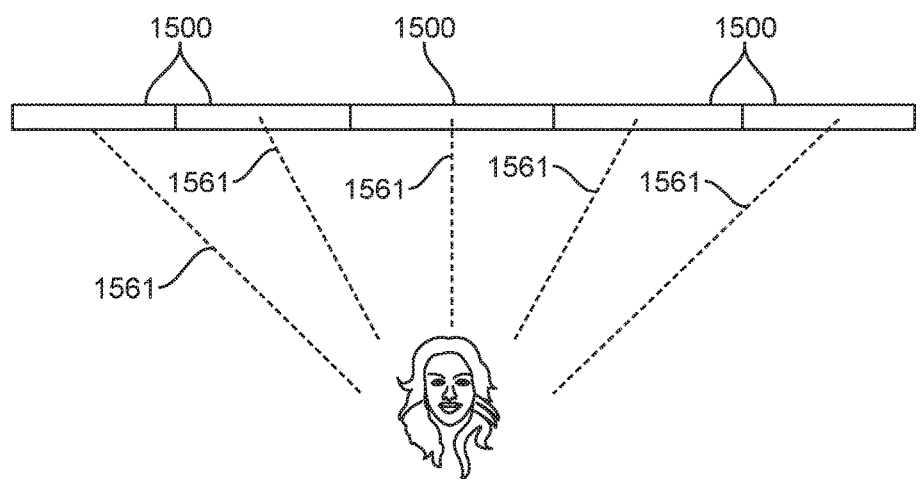
FIG. 15 is a plan view illustrating reflective properties of a skew mirror according to an embodiment.

FIG. 15 illustrates another skew mirror embodiment, a "narcissist's mirror" includes several skew mirrors 1500 whose reflective axes 1561 intersect. A narcissist can sit at the point of convergence and see several images of them self.

Skew Mirror Fabrication

Skew mirrors may be recorded holographically according to an embodiment. Skew mirrors may be recorded holographically or fabricated by with non-holographic means according to embodiments.

Holographic Recording

Figure 16A:
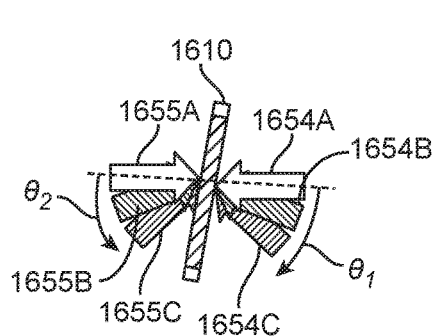
FIG. 16A is a cross-section view illustrating a system for making a skew mirror, according to an embodiment.
Figure 16B:
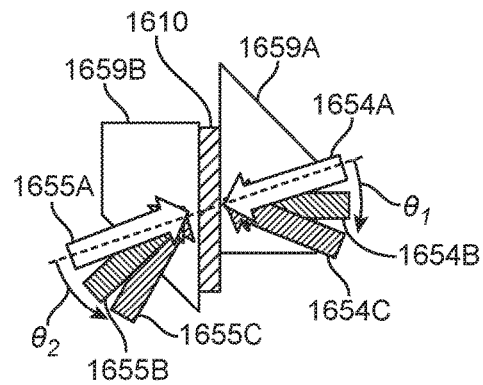
FIG. 16B is a cross-section view illustrating a system for making a skew mirror, according to an embodiment.

FIGS. 16A and 16B illustrate additional methods for recording skew mirrors. In FIG. 16A, substantially collimated recording beams are used to illuminate a grating medium to create a desired $\Delta n(\vec{k})$ distribution. In one embodiment, illustrated in FIG. 16A, a recording beam pair consisting of a first recording beam 1654A and a second recording beam 1655A at wavelength λ illuminate the grating medium 1610 in order to record a first point-like subset of the desired line segment-like $\Delta n(\vec{k})$ distribution, e.g., the highest spatial frequency components (the outer tips of $\Delta n(\vec{k})$). The angles of incidence $\theta_1$ and $\theta_2$ of a recording apparatus are then adjusted to produce another set of recording beams consisting of another first recording beam 1654 and another second recording beam 1655, which are also at wavelength A. The other first and second recording beams 1654, 1655 illuminate the medium to record a second point-like subset of the desired line segment-like $\Delta n(\vec{k})$ distribution. This process is repeated using yet another set of recording beams consisting of yet another first recording beam 1654C and yet another second recording beam 1655C etc . . . , until an entire desired line segment-like $\Delta n(\vec{k})$ distribution has been recorded.

In some embodiments, this recording may be made in one continuous exposure wherein $\theta_r$ and $\theta_s$ are adjusted continuously and synchronously in order to produce the desired distribution. In other embodiments, separate, discreet exposures where $\theta_r$ and $\theta_s$ are fixed during exposure and changed only between exposures are used. Still other embodiments may combine these methods. In some embodiments, the components of $\Delta n(\vec{k})$ may be written in an arbitrary order. In some embodiments, intensity may be varied across one or both beams in order to control the spatial diffraction efficiency profile. In some embodiments, a phase control element (e.g., a mirror mounted on a piezo-electric actuator) may be inserted into one or both beam paths in order to control the phase of each exposure. In some embodiments, more than one skew mirror or broadband skew mirror might be recorded into the same medium.

In the case of discreet exposures, the number and angular density of exposures is sufficient to produce a smooth, continuous line segment-like $\Delta n(\vec{k})$ distribution. One skilled in the art will readily calculate the angular selectivity of each hologram produced by a discreet exposure using Kogelnik's theory. In one embodiment, exposures are made at angular increments corresponding to a function of this angular selectivity, e.g., at the angular spacing of the full-width-quarter-maximum (FWQM) of the diffraction efficiency peaks. In other embodiments, the angular exposure density might be finer than this in order to assure a smooth final distribution.

The number of FWQM peaks necessary to span the line segment-like $\Delta n(\vec{k})$ distribution may be regarded as an equivalent number of holograms, M, required to form the distribution. Accordingly, the maximum possible diffraction efficiency of the resulting skew mirror may be estimated by $\eta = (M/M/\#)^2$ where $\eta$ is the diffraction efficiency, and M/# is a material parameter characterizing the dynamic range of the recording medium. One skilled in the art will readily determine how to refine this estimate according to the geometry of each individual exposure or the overlap of neighboring exposures.

FIG. 16B illustrates an embodiment where a first prism 1659A and a second prism 1659B are incorporated to produce internal beam angles that are not otherwise accessible due to refraction at the grating medium 1610 surface. This method is typically used, for example, to fabricate the skew coupler of FIG. 12B. One skilled in the art will readily perceive how to modify the configurations of FIGS. 13A and 13B to achieve a desired distribution.

In some embodiments, a single recording wavelength $\lambda$ may be chosen to write the entire line segment-like $\Delta n(\vec{k})$ distribution. For example, in an embodiment it is possible to write a skew mirror that operates across all visible wavelengths using only a 405 nm laser source. This has an advantage of requiring sufficient recording medium sensitivity at only a single wavelength, as well as an advantage of simplicity. In some embodiments, more than one recording wavelength is used. In still other cases, a continuously-variable wavelength source is used. In one such embodiment, the recording angles Or and a are held constant, and the recording wavelength is instead changed in order to produce the entire line segment-like $\Delta n(\vec{k})$ distribution, or a subset thereof.

Other Fabrication Methods

Other methods for producing a skew mirror fall within the scope of the present invention. In one embodiment, for example, a very thick dielectric layer structure is built up using conventional optical coating means. The structure is designed to produce broadband reflectivity within sub-layers, typically by repetition of a conventional broadband reflective coating design. The thick structure is then ground and polished to produce a surface at an oblique angle to the coating layers. The resulting structure typically exhibits mirror-like behavior with respect to a reflective axis substantially defined by the normal of the coating layers rather than the polished surface, and thus constitutes a skew mirror. In some embodiments, atomically-precise manufacturing methods enable fabrication of skew mirrors by composing dielectric structures atom-by-atom without regard to external surfaces.

Non-Flat Mirrors

Skew mirrors may be said to be non-flat in two senses: 1) When the physical shape of the recording medium is not flat; and 2) when the holographic fringes are not planar.

Non-Slab-Like Mirrors

Embodiments of mirrors according to the present invention, including examples of skew mirrors, broadband mirrors, and holographic mirrors, include holograms recorded in medium that is not slab-like in shape. In an example, in an embodiment, a recording layer is cast with a uniform thickness, but on a curved surface. In another example, a non-uniform recording layer (e.g., wedge-shaped) is utilized. In still another example, an arbitrary shape (e.g., spherical) is molded. In these non-slab-like mirror cases, whether the designation "skew mirror" is appropriate depends on the geometry of the relevant surface(s). Non-slab-like holographic mirrors typically exhibit broadband mirror-like properties.

Mirrors with Non-Planar Holographic Fringes

In some embodiments, it is desirable to introduce optical power or other deliberate aberrations into a reflection. This can be accomplished with an embodiment of a skew mirror by locally varying the direction of the reflective axis, for example so that a plane-wave incident beam is reflected to form a spherical-wave reflected beam, as occurs with a conventional parabolic mirror. Such a skew mirror can be fabricated, for instance, by using one converging and one diverging beam in the fabrication method of FIG. 13 and by recording while changing the wavelength instead of the angle of incidence. Such a mirror can also be fabricated by polishing dielectric layers deposited on a non-flat surface, or by using advanced atomically-precise manufacturing methods.

Other Fabrication Embodiments

Some holographic recording system embodiments incorporates mirrors, lenses and prisms to direct first and second recording beams into the grating medium in such a way that translation of the grating medium is not required to record multiple holograms at varying recording beam internal angles, at approximately the same location in the grating medium.

In some embodiments a prism in addition to the coupling prism may be used to fabricate the skew mirror. In some embodiments a variety of coupling prisms and flat pieces of glass may be used. In some embodiments multiple beams, $E_{r\_N}$ and $E_{s\_N}$, at multiple wavelengths, $\lambda_N$, may be used. In some embodiments multiple wavelengths may be used to fabricate multiple discrete line segment-like $\Delta n(\vec{k})$ distributions. In some embodiments multiple wavelengths may be used to fabricate a line segment-like $\Delta n(\vec{k})$ distribution that may be continuous or may include closely spaced sections. In some embodiments the incident angle of the signal and/or reference beam may be adjusted to compensate for shrinkage of the sample material. In some embodiments the sample may be rotated to compensate for shrinkage of the sample material. In some embodiments the wavelength may be changed to compensate for shrinkage of the sample material.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

References in the specification to "one embodiment," "an embodiment," "another embodiment," "a preferred embodiment," "an alternative embodiment," "one variation," "a variation," and similar phrases mean that a particular feature, structure, or characteristic described in connection with the embodiment or variation, is included in at least an embodiment or variation of the invention. The phrase "in one embodiment," "in one variation" or similar phrases, as used in various places in the specification, are not necessarily meant to refer to the same embodiment or the same variation.

The term "approximately," as used in this specification and appended claims, refers to plus or minus 10% of the value given.

The term "about," as used in this specification and appended claims, refers to plus or minus 20% of the value given.

The term "generally," as used in this specification and appended claims, mean mostly, or for the most part.

The term "principally," as used in this specification and appended claims with respect to reflected light, refers to light reflected by a grating structure. Light that is principally reflected at a recited angle includes more light than is reflected at any other angle (excluding surface reflections). Light that is principally reflected about a recited reflective axis includes more reflected light than is reflected about any other reflective axis (excluding surface reflections). Light reflected by a device surface is not included when considering principally reflected light.

The term "reflective axis," as used in this specification and appended claims, refers to an axis that bisects an angle of an incident light ray relative to its reflected light ray. The incident light ray, reflective axis, and reflected light ray all reside in one common plane, which can be referred to as a plane of incidence. The plane of incidence for a skew mirror need not be coincident with surface normal, although it can be. The magnitude of an angle of incidence of the incident light ray relative to the reflective axis is equal to the magnitude of an angle of reflection of the reflected light ray relative to the reflective axis. For purposes of the foregoing definition of "reflective axis," and angles are internal angles. For conventional dielectric and metal mirrors, the reflective axis is coincident with surface normal, i.e. the reflective axis is perpendicular to the mirror surface, as is the plane of incidence. Conversely, embodiments of skew mirrors according to the present invention may have a reflective axis that differs from surface normal, or may have a reflective axis that is coincident with surface normal. Whether or not a skew mirror's reflective axis is coincident with surface normal is independent of whether or not the skew mirror's plane of incidence is coincident with surface normal. Angles of incidence and angles of reflection are usually, but not necessarily, determined empirically, with multiple measurements (generally three or more) typically used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional dielectric mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The terms "angle interval" and "angle intervals," as used in this specification and appended claims, refer to angular spacing between multiple light beams incident upon a skew mirror within a recited range of angles of incidence.

The terms "hologram" and "holographic grating," as used in this specification and appended claims, refer to a recording of an interference pattern generated by interference between multiple intersecting light beams. A hologram or holographic grating is an example of a grating structure.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

We claim:

1. A skew mirror comprising:
a grating structure residing in a grating medium, wherein:
the grating structure is configured to reflect first incident light, the first incident light being incident upon the grating medium at a specific site and having a first wavelength and a first internal angle of incidence relative to grating medium surface normal;
the first incident light is principally reflected by the grating medium as first reflected light, the first reflected light having the first wavelength and a first internal angle of reflection relative to the surface normal;
the first incident light and the first reflected light are bisected by a first reflective axis having a first reflective axis angle relative to the surface normal;
the grating structure is further configured to reflect second incident light, the second incident light being incident on the grating medium at the specific site and having a second wavelength and a second internal angle of incidence relative to the surface normal;
the second incident light is principally reflected by the grating medium as second reflected light, the second reflected light having the second wavelength and a second internal angle of reflection relative to the surface normal;
the second incident light and the second reflected light are bisected by a second reflective axis having a second reflective axis angle relative to the surface normal;
the first internal angle of incidence is the same as the second internal angle of incidence;
the first reflective axis angle differs from the surface normal by at least 2.0 degrees;
the first wavelength differs from the second wavelength by a wave fraction of at least 0.030; and
the first reflective axis angle differs from the second reflective axis angle by 0.25 degree or less.

2. The skew mirror of claim 1, wherein the first reflective axis angle differs from the second reflective axis angle by 0.025 degree or less.

3. The skew mirror of claim 2, wherein the first wavelength differs from the second wavelength by a wave fraction of at least 0.036.

4. The skew mirror of claim 1, wherein the first incident light is offset from the first reflective axis by at least 1.0 degree.

5. The skew mirror of claim 4, wherein:
the grating structure comprises at least 9 volume holograms;
each of the at least 9 volume holograms at least partially spatially overlaps at least one other of the at least 9 volume holograms; and
the grating medium is at least 200 μm thick.

6. The skew mirror of claim 1, wherein:
the grating structure comprises multiple volume holograms;
each of the multiple volume holograms spatially overlaps at least one other of the multiple volume holograms; and
the grating medium is at least 70 μm thick.

7. The skew mirror of claim 6, wherein:
the multiple volume holograms includes at least 9 holograms; and
each of the multiple volume holograms at least partially spatially overlaps all others of the multiple volume holograms.

8. The skew mirror of claim 7, wherein adjacent $|\Delta K_G|$ for the at least 9 holograms has a mean value that resides between $1.0 \times 10^4$ and $1.0 \times 10^6$ radians per meter (rad/m).

9. A method of making the skew mirror of claim 1, the method comprising:
creating the grating structure by recording multiple volume holograms in the grating medium, wherein:
each of the multiple volume holograms is recorded using a first recording beam and a second recording beam, each of the first and second recording beams including a collimated, plane wave beam, and the first recording beam having the same wavelength as the second recording beam;
each of the multiple volume holograms is recorded with the first recording beam being incident upon the grating medium at a unique first recording beam internal angle relative to the surface normal and the second recording beam being incident upon the grating medium at a unique second recording beam internal angle relative to the surface normal;
each of the multiple volume holograms is recorded with the first recording beam and the second recording beam being symmetrical about a skew axis such that a first recording beam internal angle relative to the skew axis plus a second recording beam angle relative to the skew axis is equal to 180 degrees;

each of the multiple volume holograms at least partially spatially overlaps at least one other of the multiple holograms;

the skew axes of the multiple volume holograms have substantially constant skew angles relative to the surface normal; and the skew axes of the multiple volume holograms have a mean skew angle that is substantially identical to both the first reflective axis angle and the second reflective axis angle.

10. The method of claim 9, wherein each of the multiple volume holograms at least partially spatially overlaps all others of the multiple volume holograms.

11. A method of making the skew mirror of claim 1, the method comprising:

creating the grating structure by recording a volume hologram in the grating medium, wherein:

the volume hologram is recorded using a first recording beam and a second recording beam, each of the first and second recording beams including a collimated, plane wave beam, and the first recording beam having the same wavelength as the second recording beam;

the volume hologram is recorded with the first recording beam being incident upon the grating medium at a first recording beam internal angle relative to the surface normal and the second recording beam being incident upon the grating medium at a second recording beam internal angle relative to the surface normal;

the first recoding beam and the second recording beam are symmetrical about a skew axis such that an internal angle of the first recording beam relative to the skew axis plus an internal angle of the second recording beam relative to the skew axis is equal to 180 degrees; and the skew axis has a skew axis angle relative to the surface normal that is substantially identical to both the first reflective axis angle and the second reflective axis angle;

changing the first recording beam internal angle relative to the surface normal while recording the volume hologram; and changing the second recording beam internal angle relative to the surface normal while recording the volume hologram, wherein the symmetry of the first recording beam and the second recording beam about the skew axis is maintained during said changing the first and second recording beam internal angles.

12. A method of making the skew mirror of claim 1, the method comprising:

creating the grating structure by recording a volume hologram in the grating medium, wherein:

the volume hologram is recorded using a first recording beam and a second recording beam, each of the first and second recording beams including a collimated, plane wave beam, and the first recording beam having the same wavelength as the second recording beam;

the volume hologram is recorded with the first recording beam being incident upon the grating medium at a first recording beam internal angle relative to the surface normal and the second recording beam being incident upon the grating medium at a second recording beam internal angle relative to the surface normal;

the first recoding beam and the second recording beam are symmetrical about a skew axis such that an internal angle of the first recording beam relative to the skew axis plus an internal angle of the second recording beam relative to the skew axis is equal to 180 degrees; and the skew axis has a skew axis angle relative to the surface normal that is substantially identical to both the first reflective axis angle and the second reflective axis angle;

changing the first recording beam wavelength while recording the volume hologram; and changing the second recording beam wavelength while recording the volume hologram, wherein the first recording beam wavelength remains the same as the second recording beam wavelength during said changing of the first and second recording beam wavelengths.

13. A method of making a skew mirror comprising:

creating a grating structure in a grating medium by recording multiple volume holograms in the grating medium, wherein:

each of the multiple volume holograms is recorded using a first recording beam and a second recording beam, each of the first and second recording beams including a collimated, plane wave beam, and the first recording beam having a same wavelength as the second recording beam;

each of the multiple volume holograms is recorded with the first recording beam being incident upon the grating medium at a unique first recording beam internal angle relative to a surface normal of the grating medium and the second recording beam being incident upon the grating medium at a unique second recording beam internal angle relative to the surface normal;

each of the multiple volume holograms is recorded with the first recording beam and the second recording beam being symmetrical about a skew axis such that a first recording beam internal angle relative to the skew axis plus a second recording beam angle relative to the skew axis is equal to 180 degrees, the skew axis having a skew axis angle relative to surface normal;

each of the multiple volume holograms at least partially spatially overlaps at least one other of the multiple holograms; and the skew axis has a skew axis angle relative to the surface normal having a magnitude of at least 2.0 degrees.

14. The method of claim 13, wherein each of the multiple volume holograms at least partially spatially overlaps all others of the multiple volume holograms.

15. The method of claim 14, wherein:

the multiple volume holograms includes at least 9 holograms;

all of the unique first recording beam internal angles collectively span a range of at least 4.0 degrees; and all of the unique second recording beam internal angles collectively span a range of at least 4.0 degrees.

16. The method of claim 13, wherein:

adjacent $|\Delta K_G|$ for the at least 9 holograms has a mean value that resides between $1.0 \times 10^4$ and $1.0 \times 10^6$ rad/m.

17. The method of claim 13, wherein:

the grating structure is configured to reflect first incident light, the first incident light being incident upon the grating medium at a specific site and having a first wavelength and a first internal angle of incidence relative to grating medium surface normal;

the first incident light is principally reflected by the grating medium as first reflected light, the first reflected light having the first wavelength and a first internal angle of reflection relative to the surface normal;

the first incident light and the first reflected light are bisected by a first reflective axis having a first reflective axis angle relative to the surface normal;

the grating structure is further configured to reflect second incident light, the second incident light being incident on the grating medium at the specific site and having a second wavelength and a second internal angle of incidence relative to the surface normal;

the second incident light is principally reflected by the grating medium as second reflected light, the second reflected light having the second wavelength and a second internal angle of reflection relative to the surface normal;

the second incident light and the second reflected light are bisected by a second reflective axis having a second reflective axis angle relative to the surface normal;

the first internal angle of incidence is the same as the second internal angle of incidence;

both the first reflective axis angle and the second reflective axis angle are substantially identical to the skew axis angle; and the first wavelength differs from the second wavelength by a wave fraction of at least 0.010.

18. The method of claim 17, wherein:
the first wavelength differs from the second wavelength by a wave fraction of at least 0.030.

19. A skew mirror comprising:
a grating structure residing in a grating medium, wherein:
the grating structure is configured to reflect first incident light, the first incident light being incident upon the grating medium at a specific site and having a first internal angle of incidence relative to grating medium surface normal;

the first incident light is principally reflected by the grating medium as first reflected light, the first reflected light having a first internal angle of reflection relative to the surface normal;

the first incident light and the first reflected light are bisected by a first reflective axis having a first reflective axis angle relative to the surface normal;

the grating structure is further configured to reflect second incident light, the second incident light being incident on the grating medium at the specific site and having a second internal angle of incidence relative to the surface normal;

the second incident light is principally reflected by the grating medium as second reflected light, the second reflected light having a second internal angle of reflection relative to the surface normal;

the second incident light and the second reflected light are bisected by a second reflective axis having a second reflective axis angle relative to the surface normal;

the first incident light, the first reflected light, the second incident light, and the second reflected light have the same wavelength as each other;

the first internal angle of incidence differs from the second internal angle of incidence by 20 times $\Delta\theta B$;

the first reflective axis angle differs from the surface normal by at least 2.0 degrees; and the first reflective axis angle differs from the second reflective axis angle by 0.25 degree or less.

20. The skew mirror of claim 19, wherein:
the first reflective axis angle differs from the second reflective axis angle by 0.10 degree or less.

21. The skew mirror of claim 20, wherein:
the first reflective axis angle differs from the second reflective axis angle by 0.025 degree or less.

22. The skew mirror of claim 21, wherein:
each of the first incident light and the second incident light are offset from the first reflective axis by at least 5.0 degrees.

23. The skew mirror of claim 19, wherein:
each of the first incident light and the second incident light are offset from the first reflective axis by at least 5.0 degrees.

24. The skew mirror of claim 19, wherein:
each of the first incident light and the second incident light are offset from the first reflective axis by at least 9.0 degrees.

25. A skew mirror comprising:
a grating structure residing in a grating medium, wherein:
the grating structure includes a first hologram set, a second hologram set, and a third hologram set, each of which comprises multiple volume holograms;

the first hologram set is configured to reflect blue incident light about a substantially constant first reflective axis having a first mean reflective axis angle relative to surface normal;

the second hologram set is configured to reflect green incident light about a second reflective axis having a mean second reflective axis angle relative to surface normal;

the third hologram set is configured to reflect red incident light about a third reflective axis having a third mean reflective axis angle relative to surface normal;

each of the first, second, and third mean reflective axes angles (i) differs from surface normal of the grating medium by at least 2.0 degrees, and (ii) is within 1.0 degree of others of the first, second, and third mean reflective axis angles;

within each of the first, second, and third hologram sets, each of the multiple volume holograms at least partially spatially overlaps at least one other of the multiple volume holograms.

26. The skew mirror of claim 25, wherein the grating medium is at least 200 μm thick.

27. The skew mirror of claim 25, wherein the grating medium is at least 500 μm thick.

28. The skew mirror of claim 25, wherein:
each of the blue, green, and red incident light is incident upon the grating medium at multiple internal angles of incidence that span a range of at least 4.0 degrees.

29. The skew mirror of claim 28, wherein:
within each of the first, second, and third hologram sets, each of the multiple holograms at least partially spatially overlaps all others of the multiple volume holograms.

30. The skew mirror of claim 28, wherein:
each of the blue, green, and red incident light is incident upon the grating medium at multiple internal angles of incidence that span a range of at least 8.0 degrees.

31. The skew mirror of claim 30, wherein adjacent $|\Delta K_G|$ for each of the first, second, and third hologram sets has a mean value that resides between $1.0 \times 10^4$ and $1.0 \times 10^6$ rad/m.

32. The skew mirror of claim 31, wherein the adjacent $|\Delta K_G|$ for each of the first, second, and third hologram sets has a mean value greater than $8.0 \times 10^4$ rad/m.

33. The skew mirror of claim 32, wherein each of the first, second, and third hologram sets includes at least 5 holograms.

34. A method of using a skew mirror comprising:
projecting light at a skew mirror, wherein:
the skew mirror comprises a grating medium within which resides a grating structure;
the grating medium is at least 70 µm thick;
the light includes first incident light, the first incident light being incident upon the grating medium at a specific site and having a first wavelength and a first internal angle of incidence relative to grating medium surface normal;
the first incident light is principally reflected by the grating medium as first reflected light, the first reflected light having the first wavelength and a first internal angle of reflection relative to the surface normal;
the first incident light and the first reflected light are bisected by a first reflective axis having a first reflective axis angle relative to the surface normal;
the light further includes second incident light, the second incident light being incident on the grating medium at the specific site and having a second wavelength and a second internal angle of incidence relative to the surface normal;
the second incident light is principally reflected by the grating medium as second reflected light, the second reflected light having the second wavelength and a second internal angle of reflection relative to the surface normal;
the second incident light and the second reflected light are bisected by a second reflective axis having a second reflective axis angle relative to the surface normal;
the first internal angle of incidence is the same as the second internal angle of incidence;
the first reflective axis angle differs from the surface normal by at least 2.0 degrees;
the first wavelength differs from the second wavelength by a wave fraction of at least 0.030; and
the first reflective axis angle differs from the second reflective axis angle by 0.10 degree or less.

35. The method of claim 34, wherein the first reflective axis angle differs from the surface normal by at least 4.0 degrees.

36. The method of claim 35, wherein the first incident light is offset from the first reflective axis by at least 1.0 degree.

37. The method of claim 36, wherein: the multiple volume holograms includes at least 9 holograms; and each of the multiple volume holograms at least partially spatially overlaps all others of the multiple volume holograms.

38. The method of claim 34, wherein: the grating medium is at least 200 µm thick; the grating structure comprises multiple volume holograms; and each of the multiple volume holograms spatially overlaps at least one other of the multiple volume holograms.

39. The method of claim 34, wherein the grating structure comprises at least 9 volume holograms; each of the at least 9 volume holograms spatially overlaps at least one other of the at least 9 volume holograms; and adjacent $|\Delta K_G|$ for the at least 9 holograms has a mean value that resides between $1.0 \times 10^4$ and $1.0 \times 10^6$ radians per meter (rad/m).

* * * * *

UNITED STATES PATENT AND TRADEMARK OFFICE
CERTIFICATE OF CORRECTION

PATENT NO. : 9,891,363 B2
APPLICATION NO. : 15/517159
DATED : February 13, 2018
INVENTOR(S) : Mark R. Ayres et al.

It is certified that error appears in the above-identified patent and that said Letters Patent is hereby corrected as shown below:

In Line 59 of Column 3, "$\mathrm{E}_r(\vec{r})$," should read -- $E_r(\vec{r})$ --

In Line 60 of Column 3, "$\vec{r} = \{x,y,z\}$," should read -- $\vec{r} = \{x, y, z\}$ --

In Line 61 of Column 3, "$\mathrm{E}_r(\vec{k})$," should read -- $E_r(\vec{k})$ --

In Line 63 of Column 3, "$\vec{k}$" should read -- $\vec{k}_r$ --

In Line 1 of Column 4, "$|\vec{k}|=k_n$" should read -- $|\vec{k}_r| = k_n$ --

In Line 13 of Column 4, "$\Delta\mathrm{n}(\vec{r})$," should read -- $\Delta n(\vec{r})$ --

In Lines 20-23 of Column 4, equation (2)

"$\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r})$," should read -- $\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r})$ --

Signed and Sealed this
Tenth Day of July, 2018

Andrei Iancu
*Director of the United States Patent and Trademark Office*

CERTIFICATE OF CORRECTION (continued)
U.S. Pat. No. 9,891,363 B2

In Line 23 of Column 4, "$E_1(\vec{r})$" should read -- $E_1(\vec{r})$ --

In Line 24 of Column 4, "$E_2(\vec{r})$" should read -- $E_2(\vec{r})$ --

In Line 28 of Column 4, "$E_1(\vec{r})E_2^*(\vec{r})$" should read -- $E_1(\vec{r})E_2^*(\vec{r})$ --

In Line 66 of Column 4, "$\vec{r} = \{x,y,z\}$" should read -- $\vec{r} = \{x,y,z\}$ --

In Line 2 of Column 5, "$E_2(\vec{r})$ and $E_1(\vec{r})$" should read -- $E_2(\vec{r})$ and $E_1(\vec{r})$ --

In Line 6 of Column 5, "$\Delta n(\vec{r})$" should read -- $\Delta n(\vec{r})$ --

In Line 17 of Column 5, "$E_2(\vec{k})$" should read -- $E_2(\vec{k})$ --

In Line 31 of Column 5, "$\Delta n(\vec{k})$" should read -- $\Delta n(\vec{k})$ --

In Lines 49-50 of Column 5, "$\vec{k}_{G+} = \vec{k}_1 - \vec{k}_2$" should read -- $\vec{K}_{G+} = \vec{k}_1 - \vec{k}_2$ --

In Line 51 of Column 5, "$\vec{k}_{G-} = \vec{k}_2 - \vec{k}_1$" should read -- $\vec{K}_{G-} = \vec{k}_2 - \vec{k}_1$ --

In Line 51 of Column 5, "$\vec{k}_{G+}$" should read -- $\vec{K}_{G+}$ --

In Line 51 of Column 5, "$\vec{k}_{G-}$" should read -- $\vec{K}_{G-}$ --

In Line 54 of Column 5, "$\vec{k}_G$" should read -- $\vec{K}_G$ --

In Line 54 of Column 5, "$\vec{k}_{G+}$" should read -- $\vec{K}_{G+}$ --

CERTIFICATE OF CORRECTION (continued)
U.S. Pat. No. 9,891,363 B2

In Line 55 of Column 5, "$\vec{k}\, G$—" should read -- $\vec{K}_G$ --

In Line 22 of Column 6, "$|\vec{K}|=\vec{k}_n$" should read -- $|\vec{K}|=k_n$ --

In Line 27 of Column 6, "$E_p(\vec{k})$" should read -- $E_p(\vec{k})$ --

In Line 64 of Column 6, "$\vec{k}_d=\vec{k}_p+\vec{K}_{G+}$" should read -- $\vec{k}_d=\vec{k}_p+\vec{K}_{G+}$ --

In Line 8 of Column 7, "$\Delta n(\vec{k})*E_p(\vec{k})$" should read -- $\Delta n(\vec{k})*E_p(\vec{k})$ --

In Line 14 of Column 9, "$\Delta n(\vec{k})$" should read -- $\Delta n(\vec{k})$ --

In Line 21 of Column 9, "$\Delta n(\vec{k})$" should read -- $\Delta n(\vec{k})$ --

In Line 26 of Column 9, "$\Delta n(\vec{k})$" should read -- $\Delta n(\vec{k})$ --

In Line 30 of Column 9, "$\Delta n(\vec{r})$" should read -- $\Delta n(\vec{r})$ --

In Line 43 of Column 9, "$E_p(\vec{k})$" should read -- $E_p(\vec{k})$ --

In Line 45 of Column 9, "$\Delta n(\vec{k})*E_p(\vec{k})$" should read -- $\Delta n(\vec{k})*E_p(\vec{k})$ --

In Line 53 of Column 9, "$E_p(\vec{k})$" should read -- $E_p(\vec{k})$ --

In Line 54 of Column 9, "$E_d(\vec{k})$" should read -- $E_d(\vec{k})$ --

CERTIFICATE OF CORRECTION (continued)
U.S. Pat. No. 9,891,363 B2

In Line 64 of Column 9, "$\Delta n(\vec{k}) * E_p(\vec{k})$" should read --$\Delta n(\vec{k}) * E_p(\vec{k})$--

In Line 4 of Column 10, "$\Delta n(\vec{k})$" should read --$\Delta n(\vec{k})$--

In Line 8 of Column 10, "$\Delta n(\vec{k})$" should read --$\Delta n(\vec{k})$--

In Line 48 of Column 10, "$\Delta n(\vec{k})$" should read --$\Delta n(\vec{k})$--

In Line 50 of Column 10, "$\Delta n(\vec{k})$" should read --$\Delta n(\vec{k})$--

In Line 6 of Column 11, "$\Delta n(\vec{k})$" should read --$\Delta n(\vec{k})$--

In Line 46 of Column 11, "$\Delta n(\vec{k})$" should read --$\Delta n(\vec{k})$--

In Line 61 of Column 11, "$\Delta n(\vec{k})$" should read --$\Delta n(\vec{k})$--

In Line 38 of Column 13, "$\Delta n(\vec{k})$" should read --$\Delta n(\vec{k})$--

In Line 66 of Column 42, "$\vec{k}_G$" should read --$\vec{K}_G$--

In Line 67 of Column 42, "$\vec{k}_{G+}$" should read --$\vec{K}_{G+}$--

In Line 67 of Column 42, "$\vec{k}_{G-}$" should read --$\vec{K}_{G-}$--

In Line 12 of Column 43, "$\vec{k}_G$" should read --$\vec{K}_G$--

CERTIFICATE OF CORRECTION (continued)
U.S. Pat. No. 9,891,363 B2

In Line 40 of Column 60, "$\Delta\text{n}(\vec{k})$," should read --$\Delta n(\vec{k})$--

In Line 45 of Column 60, "$\Delta\text{n}(\vec{k})$," should read --$\Delta n(\vec{k})$--

In Line 47 of Column 60, "$\Delta\text{n}(\vec{k})$," should read --$\Delta n(\vec{k})$--

In Line 53 of Column 60, "$\Delta\text{n}(\vec{k})$," should read --$\Delta n(\vec{k})$--

In Line 66 of Column 60, "$\Delta\text{n}(\vec{k})$," should read --$\Delta n(\vec{k})$--

In Line 10 of Column 61, "$\Delta\text{n}(\vec{k})$," should read --$\Delta n(\vec{k})$--

In Line 41 of Column 61, "$\Delta\text{n}(\vec{k})$," should read --$\Delta n(\vec{k})$--

In Line 52 of Column 61, "$\Delta\text{n}(\vec{k})$," should read --$\Delta n(\vec{k})$--

In Line 53 of Column 62, "$\Delta\text{n}(\vec{k})$," should read --$\Delta n(\vec{k})$--